United States Patent
Ye et al.

(10) Patent No.: US 11,515,790 B2
(45) Date of Patent: Nov. 29, 2022

(54) CONVERSION CIRCUIT TOPOLOGY

(71) Applicant: Delta Electronics (Shanghai) Co., Ltd., Shanghai (CN)

(72) Inventors: Yiqing Ye, Shanghai (CN); Yuan Zhou, Shanghai (CN); Haoyi Ye, Shanghai (CN); Xiaoni Xin, Shanghai (CN); Zhiheng Fu, Shanghai (CN); Huayao Bao, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/372,496

(22) Filed: Jul. 11, 2021

(65) Prior Publication Data

US 2022/0014109 A1      Jan. 13, 2022

(30) Foreign Application Priority Data

Jul. 13, 2020   (CN) .......................... 202010669580.9
Jul. 2, 2021    (CN) .......................... 202110747546.3

(51) Int. Cl.
*H02M 3/158*       (2006.01)
*H02M 1/00*        (2006.01)
(Continued)

(52) U.S. Cl.
CPC ......... *H02M 3/158* (2013.01); *H02M 1/0064* (2021.05); *H02M 3/01* (2021.05); *H02M 3/07* (2013.01)

(58) Field of Classification Search
CPC .......... H02M 3/01; H02M 3/07; H02M 3/158; H02M 1/0064
See application file for complete search history.

(56) References Cited

U.S. PATENT DOCUMENTS 6,757,184 B2   6/2004   Wei et al.
9,917,517 B1   3/2018   Jiang et al.
(Continued)

OTHER PUBLICATIONS

D. Huang, X. Wu and F. C. Lee, "Novel non isolated LLC resonant converters," 2012 Twenty-Seventh Annual IEEE Applied Power Electronics Conference and Exposition (APEC), 2012, pp. 1373-1380, doi: 10.1109/APEC.2012.6165999.
(Continued)

*Primary Examiner* — Jue Zhang
(74) *Attorney, Agent, or Firm* — CKC & Partners Co., LLC

(57) ABSTRACT

The invention provides a conversion circuit for converting input voltage into output voltage, including: a full-bridge rectifier circuit including first and second bridge arms connected in parallel and electrically connected between first and second ends of the output voltage; a first switch branch electrically connected between the first end of the input voltage and the first end of the output voltage, and including first and second switches connected in series to form a first connection node; a first resonant unit electrically connected between the first connection point and midpoint of the first bridge arm; and a first transformer including a first primary winding connected in series with the first resonant unit; and a first secondary winding connected between midpoint of the first bridge arm and midpoint of the second bridge arm. The conversion circuit of the invention improves conversion efficiency while maintaining smaller voltage stress on switches.

22 Claims, 26 Drawing Sheets

(51) Int. Cl.
*H02M 3/00* (2006.01)
*H02M 3/07* (2006.01)

(56) References Cited

U.S. PATENT DOCUMENTS

| | | | |
|---|---|---|---|
| 10,601,324 B1 * | 3/2020 | Kudva | H02M 3/1588 |
| 10,651,731 B1 * | 5/2020 | Rainer | H02M 3/1588 |
| 10,804,798 B1 | 10/2020 | Rizzolatti et al. | |
| 2019/0028025 A1 * | 1/2019 | Babazadeh | H02M 1/36 |
| 2020/0186039 A1 * | 6/2020 | Cheng | H02M 1/083 |
| 2020/0220468 A1 * | 7/2020 | Rainer | H02M 3/33507 |
| 2020/0358352 A1 | 11/2020 | Rizzolatti et al. | |

OTHER PUBLICATIONS

Li, Yanchao et al., "Multilevel Modular Switched-Capacitor Resonant Converter with Voltage Regulation", 2017 IEEE Applied Power Electronics Conference and Exposition (APEC), IEEE, Mar. 26, 2017(Mar. 26, 2017), pp. 88-93, XP033098224, d01: 10.1109/APEC.2017.7930677.

Li, Yanchao et al., "A 98.55% Efficiency Switched—Tank Converter for Data Center Application", IEEE Transactions on Industry Applications, IEEE Service Center, Piscataway, NJ, US, vol. 54, No. 6, Nov. 1, 2018, pp. 6205-6222, XP011691359, ISSN: 0093-9994.

* cited by examiner

CONVERSION CIRCUIT TOPOLOGY

CROSS-REFERENCE TO RELATED APPLICATIONS

This non-provisional application claims priority under 35 U.S.C. § 119(a) on Patent Application No. 202010669580.9, filed in P.R. China on Jul. 13, 2020 and Patent Application No. 202110747546.3, filed in P.R. China on Jul. 2, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to a conversion circuit for powering a load after converting a voltage of a power supply.

BACKGROUND

It is shown in research data of the China Green Data Center Technology Committee that a total power consumption of the China Data Center in 2016 exceeds 120 billion Kwh. Although the power consumption of the Data Center is quite huge, as service supported by the Data Center is increasing, operational load and scale of the Data Center still sustain a high growth. In order to promote operational density of the Data Center, power of a single rack is increased. The number of processor chips in the traditional rack is small, so the power of the single rack is generally less than 15 Kw. As for the traditional rack, an alternating current (AC) UPS for powering the rack is located outside the rack, and an internal direct current (DC) distribution bus voltage is 12V, which is stable. However, with increasing of the number of processor chips in the single rack, the power of the single rack is increased, and when the power of the single rack exceeds 15 Kw, a current through the 12V DC distribution bus is remarkably increased. As a result, efficiency is largely reduced, and heat dissipation cost and costs of cable and connector are increased. Therefore, a novel electric energy transmission architecture is provided, in which the internal DC distribution bus voltage of the rack rises to 48V, and meanwhile, a DC UPS is mounted inside the rack to replace the AC UPS, and directly connected to the 48V DC distribution bus. The novel 48V distribution bus structure significantly reduces a current through the distribution bus, improves power efficiency of the Data Center, and reduces power consumption cost, heat dissipation cost and distribution bus cost, thereby reducing a total cost of ownership of the Data Center. In addition, the DC UPS is directly connected to the 48V distribution bus to further improve power reliability of the rack, such that a range of the bus voltage is between 40V and 59.5V, and the bus voltage is always within a range of a safety extra-low voltage (SELV), thereby ensuring safety of maintenance operations.

A high requirement of efficiency for Voltage Regulation Modules (VRMs) between the DC bus and the processor chip is raised. For example, when a core voltage of the processor chip is less than 1V, and a load of 48V-VRM varies between 30% to 90%, an electric energy conversion efficiency is desired to be always higher than 92%. However, in the novel electric energy transmission architecture, a challenge faced by the 48V-VRM is remarkably greater than the case of the 12V distribution bus. At one side of the DC distribution bus, 12V distribution bus voltage is stable, and has a small range of modification. However, the 48V distribution bus is directly connected to the DC UPS, and has a voltage range from 40V to 59.5V directly affected by the DC UPS. In order to reduce power consumption of the processor chip, the core voltage of the processor chip is further reduced. In addition, in order to provide chip acceleration performance for short duration, the processor chip requires the 48V-VRM to supply remarkably improved voltage and current. Taking GPU for example, a range of the core voltage is from 0.6V to 1.1V. In an energy saving mode, the core voltage is 0.6V, and a rated current is 400 A. In a rated working condition, the core voltage is 0.8V, and a rated current is 600 A. However, in an acceleration mode of the GPU, the 48V-VRM shall supply the core voltage of 1.1V and an output current of 1200 A to the GPU within 200 µs.

As can be seen, in the novel electric energy transmission architecture, a voltage conversion ratio between the bus and the processor chip is significantly increased. In such case, the 48V-VRM faces a huge challenge satisfying the requirement for electric energy conversion efficiency while sustaining a high power density.

Generally, the 48V-VRM is a two-stage cascaded conversion structure, and its voltage is regulated after being reduced. For example, a first stage converter can use a high efficient DC transformer to reduce an input 48V bus voltage (Uin) to a lower middle bus voltage (Uib), such as, 4V. A second stage uses a BUCK converter with multiple phases alternatively connected in parallel, and output voltage Uo is controlled by a closed loop to ensure powering the load (such as, the processor chip).

A typical topology generally utilized by the first stage converter of the 48V-VRM is a LLC series resonant circuit, and the circuit can charge and discharge parasitic capacitance of switches at a primary side within a dead time of the switches at the primary side by adjusting an excitation current through the transformer, thereby realizing ZVS operation of the switches at the primary side, and tiny turn-on loss of switches. Meanwhile, resonance manner enables the switches on the primary side to have a smaller turn-off current, thereby reducing turn-off loss. As for switches on a secondary side (such as, a diode), due to none output inductance, voltage stress of the switches on the secondary side is lower. When synchronous rectifier is used at the secondary side, switches with a lower withstand voltage and better performance can be selected to realize lower on-state loss. In addition, due to soft switching characteristics, high power density in a high frequency condition is easily realized. Since transformer is used, a high conversion ratio can be realized quite easily. Assuming that a turn ratio of the transformer is N:1:1, when a switching frequency fs is equal to a resonant frequency fr, a conversion ratio is N (full-bridge LLC) or 2N (half-bridge LLC).

However, the LLC circuit also has some defects. Due to use of the transformer, all energy conversion must pass through the transformer. The switches at the primary side of the transformer are responsible for producing excitation for the primary winding, while the secondary side induces excitation at the primary side outputted to the final load through a rectifier. During this process, the switches at the primary side only produce excitation, while the excitation current itself does not flow to a load terminal, but reflows to an input terminal. Load current is completely supplied by secondary circuit, and current stresses of the secondary winding and the switches are relatively large.

The LLC circuit can realize a high voltage conversion ratio and ZVS, but all energy is delivered through the transformer. When isolation is not required in the actual system, a non-isolated LLC circuit also can be used. The non-isolated LLC circuit realizes soft switching, and a large voltage conversion ratio, and the primary excitation current flows to the load, while reusing an idle secondary side of the transformer, and reduces the number of turns and a resistance of the primary winding. Although the non-isolated LLC reduces the number of turns of the transformer, this type of transformer at most has only two additional primary currents flowing to a load terminal. Therefore, a ratio of an additional increased conversion ratio to an entire conversion ratio is reduced when the conversion ratio of the non-isolated LLC is large, such that the benifit is reduced, and the efficiency approaches an efficiency of the isolated LLC.

Another implementation of the converter is Switching Tank Converter (STC). As compared to LLC, such converter does not use the transformer, but converts power by directly transmitting the current to the load terminal. FIG. 1 illustrates a circuit example of the STC 100. In the case that duty cycles of switches S1-S4 are 0.5, the DC voltage across capacitor C1 is 0.5Vin. In a first half period, the switches S1, S3, SR1 and SR4 are turned on, and in a second half period, the switches S2, S4, SR2 and SR3 are turned on, such that a conversion ratio (Vin/Vo) equal to 4:1 can be realized. A voltage conversion ratio of the circuit can be changed by adjusting the number of resonant circuits and switches connected in series. Advantage of the circuit lies in that no transformer is used. All energy directly flows to the load without passing through a transformer, while reducing voltage stresses of the switches S1-S4. Disadvantage lies in that the conversion ratio is low. When a high conversion ratio is required, more stages should be needed, which increases complexity of circuit. Meanwhile, only ZCS can be realized. Moreover, the requirement for control accuracy is high in the ZCS process. Therefore, an efficiency is high when the STC has a low conversion ratio, but with increased voltage conversion ratio, due to a high complexity of circuit, the efficiency is lower than that of the LLC topology.

SUMMARY

An object of the invention is to solve the problem that the STC has a complex circuit and a low efficiency in terms of conversion ratio, and the invention provides a conversion circuit which reduces switch loss, and can realize the requirement for different voltage conversion ratios.

According to one aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a full-bridge circuit comprising a first bridge arm and a second bridge arm connected in parallel and electrically connected between the first end and the second end of the output voltage;

a first switch branch electrically connected between the first end of the input voltage and the first end of the output voltage, and comprising a first switch and a second switch connected in series to form a first connection node;

a first resonant unit electrically connected between the first connection point and a midpoint of the first bridge arm; and a first transformer, comprising: a first primary winding connected in series with the first resonant unit; and a first secondary winding connected between the midpoint of the first bridge arm and a midpoint of the second bridge arm.

According to another aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a full-wave rectifier circuit comprising a first branch and a second branch connected in parallel between the first end and the second end of the output voltage, the first branch comprising a first secondary winding of a transformer and a first rectifier switch connected in series to form a first midpoint, and the second branch comprising a second secondary winding of the transformer and a second rectifier switch connected in series to form a second midpoint;

a first switch branch connected between the first end of the input voltage and the first midpoint, and comprising a first switch, a second switch, a third switch and a fourth switch connected in series, wherein the first switch and the second switch are connected to form a first connection node, the second switch and the third switch are connected to form a second connection node, and the third switch and the fourth switch are connected to form a third connection node;

a first resonant unit electrically connected between the first connection node and a second midpoint;

a second resonant unit electrically connected between the third connection node and the second midpoint;

a first primary winding of the transformer connected in series to the first resonant unit; and a first capacitor connected between the second connection node and the first midpoint.

According to another aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a full-wave rectifier circuit comprising a first branch, a second branch, a third branch and a fourth branch connected in parallel between the first end and the second end of the output voltage, the first branch comprising a first secondary winding of a first transformer and a first rectifier switch connected in series to form a first midpoint, the second branch comprising a second secondary winding of the first transformer and a second rectifier switch connected in series to form a second midpoint, the third branch comprising a first secondary winding of a second transformer and a third rectifier switch connected in series to form a third midpoint, and the fourth branch comprising a second secondary winding of the second transformer and a fourth rectifier switch connected in series to form a fourth midpoint;

a first switch branch connected between the first end of the input voltage and the first midpoint, and comprising a first switch, a second switch, a third switch and a fourth switch connected in series, wherein the first switch and the second switch are connected to form a first connection node, the second switch and the third switch are connected to form a second connection node, and the third switch and the fourth switch are connected to form a third connection node;

a first resonant unit connected between the first connection node and the second midpoint;

a second resonant unit connected between the third connection node and the fourth midpoint;

a primary winding of the first transformer connected in series to the first resonant unit;

a primary winding of the second transformer connected in series to the second resonant unit; and a capacitor connected between the second connection node and the third midpoint.

According to another aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a full-wave rectifier circuit comprising a first branch and a second branch connected in parallel between the first end and the second end of the output voltage, the first branch comprising a first secondary winding of a transformer and a first rectifier switch connected in series to form a first midpoint, and the second branch comprising a second secondary winding of the transformer and a second rectifier switch connected in series to form a second midpoint;

a first switch branch connected between the first end of the input voltage and the first midpoint, and comprising a first switch, a second switch, a third switch and a fourth switch connected in series, wherein the first switch and the second switch are connected to form a first connection node, the second switch and the third switch are connected to form a second connection node, and the third switch and the fourth switch are connected to form a third connection node;

a first resonant unit;

a plurality of primary windings of the transformer, comprising a first primary winding and a second primary winding, the first primary winding and the first resonant unit electrically connected between the first connection node and the second midpoint in series, and the second primary winding electrically connected between the third connection node and the second midpoint; and a first capacitor connected between the second connection node and the first midpoint.

According to another aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a full-wave rectifier circuit comprising n branches connected in parallel between the first end and the second end of the output voltage, each of the n branches comprising a secondary winding of a transformer and a rectifier switch connected in series to form a midpoint, the n branches comprising at least one first type branch and at least one second type branch, wherein dotted terminals of the secondary windings of the first type branches are connected, and undotted terminals of the secondary windings of the first type branches and the secondary windings of the second type branches are connected;

a first switch branch comprising m switches connected in series, wherein adjacent switches in the m switches are connected to form connection nodes; and (m−1) conversion branches, each comprising a capacitor, the (2y−1)th conversion branch of the (m−1) conversion branches connected between the connection node of the (2y−1)th switch and the 2y-th switch in the m switches and a midpoint of one of the at least one second type branch, and the 2z-th conversion branch of the (m−1) conversion branches connected between the connection node of the 2z-th switch and the (2z+1)th switch in the m switches and a midpoint of one of the at least one first type branch; and a first primary winding of the transformer connected in series to one of the (m−1) conversion branches, where m, n, y and z are integers, m≥n≥2, m≥3, 1≤y≤m/2, and 1≤z≤(m−1)/2.

According to another aspect of the invention, a conversion circuit for supplying an output voltage after converting an input voltage, wherein the input voltage and the output voltage both comprise a first end and a second end, and the second end of the input voltage is connected to the second end of the output voltage, the conversion circuit comprising:

a first full-wave rectifier circuit comprising a first branch and a second branch connected in parallel between the first end and the second end of the output voltage, the first branch comprising a first winding of a transformer and a first rectifier switch connected in series to form a first midpoint, and the second branch comprising a second winding of the transformer and a second rectifier switch connected in series to form a second midpoint;

a first switch branch connected between the first end of the input voltage and the first midpoint, and comprising a first switch and a second switch connected in series to form a first connection node; and a first resonant unit connected between the first connection node and the second midpoint, wherein the first resonant unit is not connected in series to any winding of the transformer.

According to another aspect of the invention, a conversion circuit for powering an output voltage after converting an input voltage, wherein the input voltage and the output voltage both comprise a first end and a second end, and the second end of the input voltage is connected to the second end of the output voltage, the conversion circuit comprising:

a full-wave rectifier circuit comprising n branches connected in parallel between the first end and the second end of the output voltage, each of the n branches comprising a winding of a transformer and a rectifier switch connected in series to form a midpoint, the n branches comprising at least one first type branch and at least one second type branch, wherein dotted terminals of the windings of the transformer of the first type branches are connected, and undotted terminals of the windings of the transformer of the first type branches and the windings of the transformer of the second type branches are connected;

a first switch branch comprising m switches connected in series, wherein adjacent switches in the m switches are connected to form connection nodes; and (m−1) conversion branches, each comprising a capacitor, the (2y−1)th conversion branch of the (m−1) conversion branches connected between the connection node of the (2y−1)th switch and the 2y-th switch in the m switches and the midpoint of one of the at least one second type branch, and the 2z-th conversion branch of the (m−1) conversion branches connected between the connection node of the 2z-th switch and the (2z+1)th switch in the m switches and the midpoint of one of the at least one first type branch, wherein when the i-th conversion branch of the (m−1) conversion branches is a non-resonant unit, the (i−1)th conversion branch and the (i+1)th conversion branch of the (m−1) conversion branches are both resonant units, where m, n, y, i and z are integers, m≥n≥2, 1≤y≤m/2, m≥4, i≤m−2 and 1≤z≤(m−1)/2.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure, and are described as follows.

DETAILED DESCRIPTION

Figure 1:
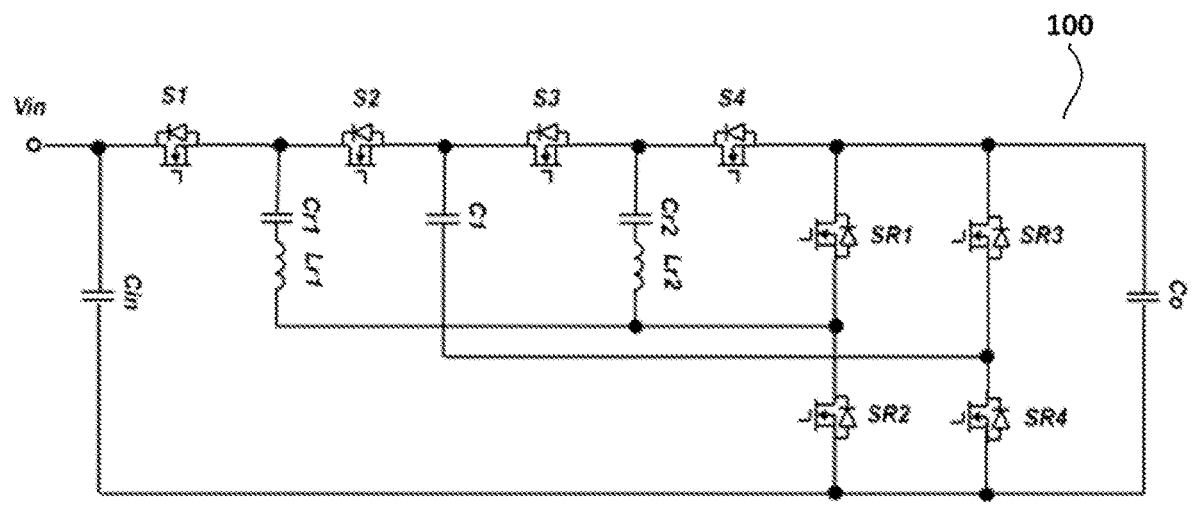
FIG. 1 illustrates a circuit example of a conventional STC.

Now the embodiments of the invention are explicitly described with reference to the accompanying drawings in following sequences:
[First Embodiment]
[Modifications of the First Embodiment]
[Second Embodiment]
[Modifications of the Second Embodiment]
[Third Embodiment]
[Modifications of the Third Embodiment]

One or more examples of the embodiments of the invention are illustrated in the drawings. In the following description of the drawings, the same reference sign indicates the same or similar parts. Hereinafter only differences of the individual embodiment are described. Each example is provided to explain the technical solutions, rather than limiting the subject matter claimed by the invention. In addition, the feature explained or described as a part of one embodiment may be applied to other embodiments, or combined with other embodiments to produce a further example. Hereinafter such modifications and modifications included in the intent are explained in details.

First Embodiment

Figure 2:
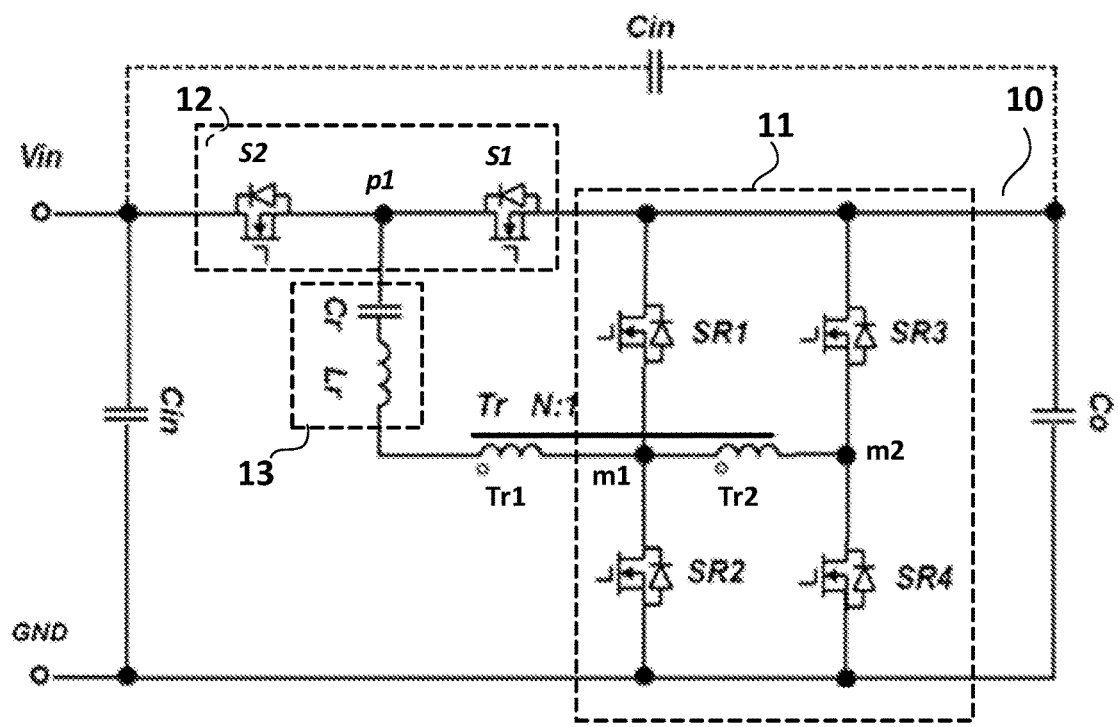
FIG. 2 illustrates an exemplary circuit of a conversion circuit according to a first embodiment of the invention.

FIG. 2 illustrates an exemplary circuit of a conversion circuit 10 according to a first embodiment of the invention. The circuit 10 receives an input voltage Vin, converts the input voltage Vin, and outputs the converted voltage.

The circuit 10 includes a full-bridge rectifier circuit 11 having rectifiers SR1, SR2, SR3 and SR4, a switch branch 12 having switches S1 and S2, a resonant unit 13 having a resonant capacitor Cr and a resonant inductor Lr, and a transformer Tr having a primary winding Tr1 and a secondary winding Tr2.

Each of the input voltage and the output voltage has a first end and a second end, and the second end of the input voltage is connected to the second end of the output voltage, such as, a ground terminal GND in FIG. 2. The switch branch 12 is connected between the first end of the input voltage and the first end of the output voltage, and includes the switches S1 and S2 connected in series to form a connection node p1. The full-bridge rectifier circuit 11 is connected between the first end and the second end of the output voltage. In the full-bridge rectifier circuit 11, the rectifiers SR1 and SR2 are connected in series to form a first bridge arm, and the rectifiers SR3 and SR4 are connected in series to form a second bridge arm.

In one example of the circuit 10, the circuit may include an output capacitor Co for filtering, and the output capacitor Co is connected between the first end and the second end of the output voltage, and connected in parallel to the first bridge arm and the second bridge arm of the full-bridge rectifier circuit 11. Additionally, the circuit 10 may further include an input capacitor Cin for filtering, and the input capacitor Cin may be connected between the first end and the second end of the input voltage, or may be connected between the first end of the input voltage and the first end of the output voltage, such as the input capacitor Cin connected by a dashed line in FIG. 2.

In the circuit 10, the resonant unit 13 includes the resonant capacitor Cr and the resonant inductor Lr connected in series, and has one end connected to the connection node p1, and the other end connected to one end of the primary winding Tr1. The other end of the primary winding Tr1 is connected to a midpoint m1 of the first bridge arm of the full-bridge rectifier circuit 11. The secondary winding Tr2 is connected between the midpoint m1 of the first bridge arm and a midpoint m2 of the second bridge arm. In some embodiments, positions of the resonant unit 13 and the primary winding Tr1 are exchangable, only if the resonant unit 13 and the primary winding Tr1 are connected in series.

Hereinafter a working state of the circuit 10 is described. In one operating period of the circuit 10, during the first half of one operating period, the switch S2 and the rectifiers SR1, SR4 are turned on, and the switch S1 and the rectifiers SR2, SR3 are turned off. During the second half of one operating period, the switch S1 and the rectifiers SR2, SR3 are turned on, and the switch S2 and the rectifiers SR1, SR4 are turned off. Therefore, a duty cycle of the switches S1 and S2 to the rectifiers SR1, SR2, SR3 and SR4 is 0.5.

In the first half of one operating period, current flows from an input terminal to an output terminal via a first path consisting of the switch S2, the resonant capacitor Cr, the resonant inductor Lr, the primary winding Tr1 and the rectifier SR1. At this time, a resonant frequency is $fr=1/(2\pi \times \sqrt{Lr \times Cr})$, so the input terminal directly supplies energy to the output terminal through the first path. Meanwhile, the secondary winding Tr2 induces a resonant current in the primary winding Tr1, and supplies energy to the output terminal through a second path formed of SR1 and SR4. When the first half period is converted to the second half period, parasitic capacitance of S2, SR1 and SR4 are charged and parasitic capacitance of S1, SR2 and SR3 are discharged by excitation inductance current, thereby realizing soft switching of the device. In the second half of one operating period, similarly with the first half period, current supplies energy to the output terminal through a third path consisting of the rectifier SR2, the primary winding Tr1, the resonant capacitor Cr, the resonant inductor Lr and the switch S1. Meanwhile, the secondary winding Tr2 induces a resonant current in the primary winding Tr1, and supplies energy to the output terminal through a fourth path formed of SR2 and SR3.

Assuming that a current of the input terminal is i, in one operating period, an equivalent current of the resonant unit 13 is 2i, so a primary current of the transformer $Tr_1$ is also 2i, and such current directly flows to an output terminal. Meanwhile, when a turn ratio of the transformer $Tr_1$ is N:1, an induced current at the secondary side of the transformer Tr is 2Ni. Therefore, a total current flowing to the output terminal is (2N+2)i. For the input terminal, since current only flows through S1 for half resonance period, a current through an input side is half of the equivalent current of the resonant unit 13, i.e., i. Therefore, a voltage conversion ratio of the circuit (i.e., a ratio of an input voltage to an output voltage of the circuit) of FIG. 2 is (2N+2):1, where 2N is a conversion ratio contributed by the turn ratio of the transformer, and 2 is contributed by the current that flows through the primary winding of the transformer directly flowing to the output terminal in the circuit.

In the traditional STC with only two switches, a voltage conversion ratio is only 2. For the circuit 10, the voltage conversion ratio is (2N+2):1, so the voltage conversion ratio of the circuit is increased, and in the case of the same voltage conversion ratio, the number of turns of a primary side of the transformer can be reduced, thereby improving utilization efficiency of the transformer. Meanwhile, since the current that flows through the primary winding of the transformer directly flowing to the output terminal in the circuit is 2, this part of current is produced without induction of the transformer, thereby further reducing loss and volume of the transformer.

Although the resonant unit 13 in the circuit 10 is formed of the resonant capacitor Cr and the resonant inductor Lr connected in series, the invention is not limited thereto. For example, the resonant unit 13 also can be formed of the resonant capacitor Cr and the resonant inductor Lr connected in parallel.

Modifications of the First Embodiment

The example of the conversion circuit according to the first embodiment of the invention is described above. However, the conversion circuit according to the first embodiment of the invention can have various modifications. Hereinafter various modifications of the full-bridge rectifier conversion circuit 10 are described, and only differences between the various modifications and the conversion circuit 10 are described, so the same parts are not described here.

Figure 3A:
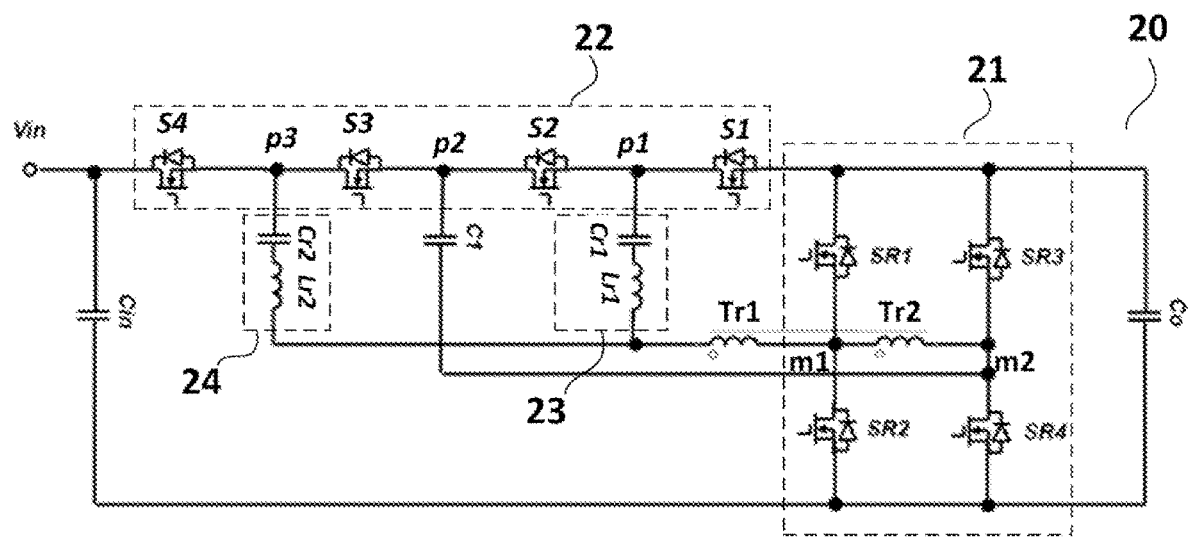
FIG. 3A illustrates a modification of the circuit of FIG. 1.

FIG. 3A illustrates a schematic diagram of a modified conversion circuit 20 according to the first embodiment of the invention.

As shown in FIG. 3A, the circuit 20 includes a full-bridge rectifier circuit 21 including rectifiers SR1, SR2, SR3 and SR4, a switch branch 22 consiting of switches S1, S2, S3 and S4, a resonant unit 23 including a resonant capacitor Cr1 and a resonant inductor Lr1, a resonant unit 24 including a resonant capacitor Cr2 and a resonant inductor Lr2, a transformer including a primary winding Tr1 and a secondary winding Tr2, and a capacitor C1.

Each of the input voltage and the output voltage has a first end and a second end, and the second end of the input voltage is connected to the second end of the output voltage. The switch branch 22 is connected between the first end of the input voltage and the first end of the output voltage, and includes the switches S1, S2, S3 and S4 connected in series. The full-bridge rectifier circuit 21 is connected between the first end and the second end of the output voltage. In the full-bridge rectifier circuit 21, the rectifiers SR1 and SR2 form a first bridge arm, and the rectifiers SR3 and SR4 form a second bridge arm.

The resonant unit 23 includes the resonant capacitor Cr1 and the resonant inductor Lr1 connected in series, and is connected in series with the primary winding Tr1, and the resonant unit 24 includes the resonant capacitor Cr2 and the resonant inductor Lr2 connected in series, and is also connected in series with the primary winding Tr1. It shall be noticed, "connected in series" used in the invention indicates the general case where currents flowing through the electronic elements in series connection are equal, and also refers to the case where the two electronic elements are connected to form a common connection node. For example, as for the case where the resonant unit 23 of FIG. 3A has one end connected to a connection node p1 between the switches S1 and S2, and the other end connected to one end of the primary winding Tr1, it is considered that the resonant unit 23 and the primary winding Tr1 are connected in series. Similarly, as for the case where the resonant unit 24 of FIG. 3A has one end connected to a connection node p3 between the switches S3 and S4, and the other end connected to one end of the primary winding Tr1, it is also considered that the resonant unit 24 and the primary winding Tr1 are connected in series. Although the currents flowing through the resonant units 23, 24 and the primary winding Tr1 in the resonant units 23, 24 and the primary winding Tr1 in such connection are not equal, the invention still describes that the resonant unit 23 and the primary winding Tr1 are connected in series, and the resonant unit 24 and the primary winding Tr1 are connected in series. The other end of the primary winding Tr1 is connected to a midpoint m1 of the first bridge arm of the full-bridge rectifier circuit 21. The secondary winding Tr2 is connected between the midpoint m1 of the first bridge arm and a midpoint m2 of the second bridge arm. The capacitor C1 has one end connected to a connection node p2 between the switches S2 and S3, and the other end connected to the midpoint m2 of the second bridge arm.

Figure 3B:
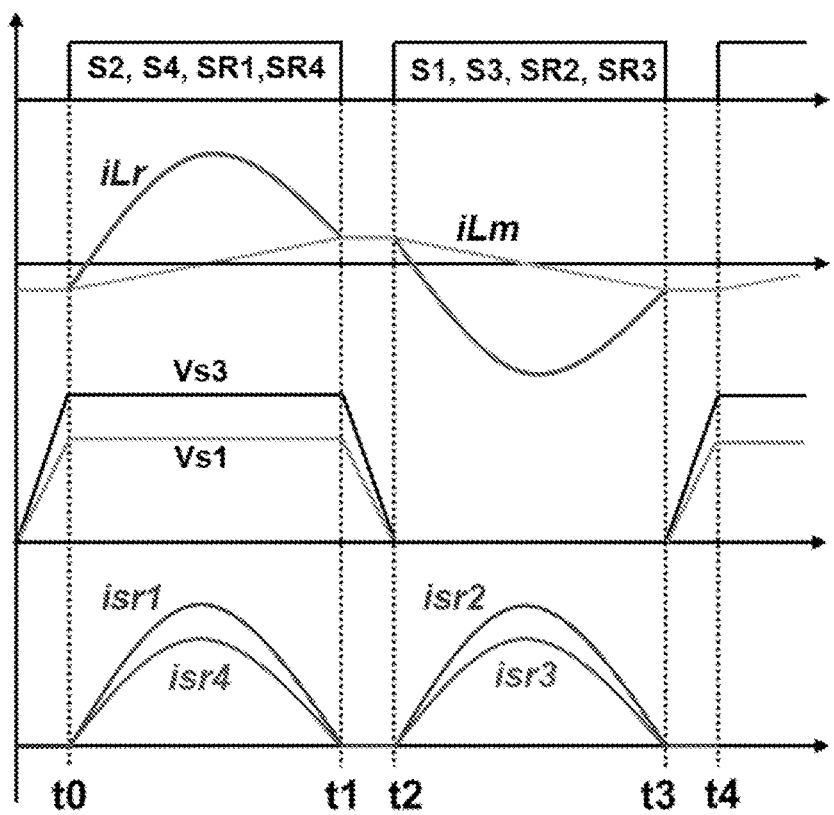
FIG. 3B illustrates a waveform diagram of electric signals in the circuit of FIG. 3A.
Figure 3C:
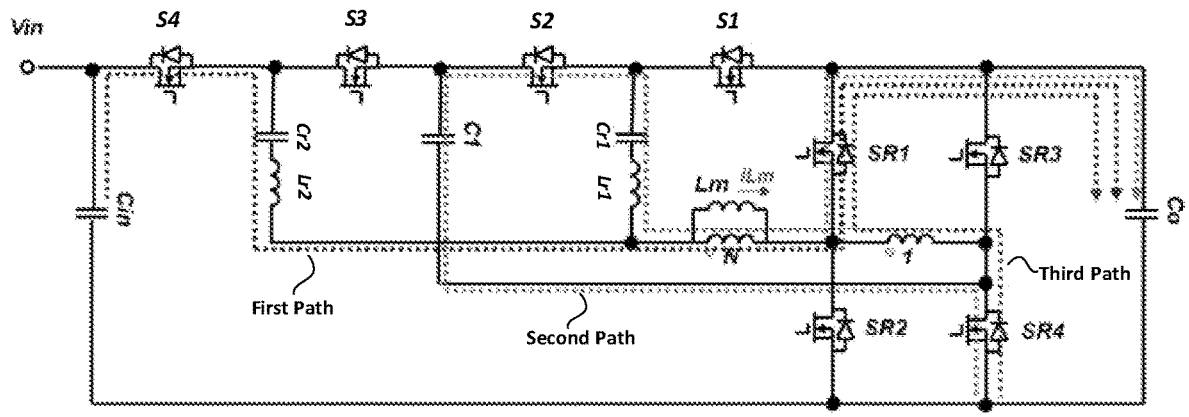
FIG. 3C illustrates a current flow diagram of the circuit of FIG. 3A in a half operating period.

Referring to FIGS. 3B and 3C, a working state of the circuit 20 is described. FIG. 3B illustrates current or voltage change of the respective elements in one operating period of the circuit 20, wherein iLr represents a current of each of the resonant units 23 and 24, iLm represents a current of an excitation inductance on the transformer, Vs1 and Vs3 represent voltages at both sides of the switches S1 and S3, and isr1, isr2, isr3 and isr4 represent currents in the rectifiers SR1, SR2, SR3 and SR4. FIG. 3C illustrates an example of current flow directions of the circuit in the first half of one operating period.

Duration t0-t4 represents one operating period of the circuit 20. In the circuit 20, the switches S4, S2 and the rectifiers SR1, SR4 are turned on, with which the switches S3, S1 and the rectifiers SR2, SR3 are complementarily turned on, and thus a duty cycle is approximately 0.5. Herein "complementarily turned on" refers to that, in the circuit, a turned on time period of the switches in a positive half period is substantially the same as a turned on time period of the switches in a negative half period. Taking the circuit of FIG. 3A for example, the duration t0-t2 is the first half of the operating period, the duration t2-t4 is the second half of the operating period, wherein t0-t1 and t2-t3 are turned on tine periods of the switches in the positive and negative half periods, and the two turned on tine periods are substantially the same, i.e., symmetrically turned on, which means (t1−t0)=(t3−t2). In the duration t0-t1, the switches S4, S2 and the rectifiers SR1, SR4 are turned on, while the switches S3, S1 and the rectifiers SR2, SR3 are turned off. At this time, current flows through a first path formed of the switch S4, the resonant capacitor Cr2, the resonant inductor Lr2, the primary winding Tr1 of the transformer and the rectifier SR1, and the resonant frequency is fr2=1/(2π×√(Lr2×Cr2)), and the input terminal supplies energy to the output terminal through the first path. A voltage on a blocking capacitor C1 is 0.5Vin. The rectifier SR4, the switch S2, the resonant capacitor Cr1, the resonant inductor Lr1, the primary winding Tr1 of the transformer and the rectifier SR1 form a resonant second path, the resonant frequency is fr1=1/(2π×√(Lr1×Cr1)), and the capacitor C1 supplies energy to the output terminal. Meanwhile, the secondary winding Tr2 of the transformer further induces a resonant current in the primary winding Tr1, and supplies energy to the output terminal through a third path formed of the rectifiers SR4 and SR1. The resonant capacitors Cr1 and Cr2 function as resonant elements, and also function as blocking capacitors. A DC voltage on the resonant capacitor Cr1 is 0.75 Vin, a voltage on the resonant capacitor Cr2 is 0.25Vin, excitation voltages across the resonant units 23 and 24 are the same, and the resonant frequencies are consistent (i.e., fr1=fr2). At this time, currents of the two resonant units are consistent and flow together to a primary side of the transformer. In the duration t1-t2, parasitic capacitance of the switches S4, S2 and the rectifiers SR1 and SR4 are charged by excitation induced current, and parasitic capacitance of the switches S3, S1 and the rectifiers SR2 and SR3 are discharged, thereby realizing soft switching. The duration t2-t4 is the second half of the operating period, in the duration t2-t3, the switches S3, S1 and the rectifiers SR2 and SR3 are turned on, and the switches S4, S2 and the rectifiers SR1 and SR4 are turned off. At this time, a first path is formed by the rectifier SR2, the primary winding Tr1 of the transformer, the resonant inductor Lr2, the resonant capacitor Cr2, the switch S3, the capacitor C1 and the rectifier SR3 to supply energy to the output terminal. A second path is formed by the rectifier SR2, the primary winding Tr1 of the transformer, the resonant inductor Lr1, the resonant capacitor Cr1 and the switch S1 to supply energy to the output terminal. Finally, the secondary winding Tr2 of the transformer induces a current of the primary side, and a third path is formed by the rectifiers SR2 and SR3 to supply energy to the output terminal. In the duration t3-t4, parasitic capacitance of the switches S3, S1 and the rectifiers SR2 and SR3 are charged by excitation induced current, and parasitic capacitance of the switches S4, S2 and the rectifiers SR1 and SR4 are discharged, thereby realizing soft switching.

Assuming that a current of the input terminal is i, in one operating period of the circuit 20, equivalent currents of the resonant units 23 and 24 are 2i, an equivalent current of the primary side of the transformer is 4i, and such current directly flows to the output terminal. Meanwhile, when a turn ratio of the transformer is N:1, an induced current of a secondary side of the transformer is 4Ni, so a total current flowing to the output end is (4N+4)i. For the input terminal, since current only flows through the switch S4 for a half resonance period, a current through an input side is half of the current of the resonant units, i.e., i. Therefore, a voltage conversion ratio of the circuit 20 is (4N+4):1, where 4N is a conversion ratio contributed by the turn ratio of the transformer, and 4 is contributed by the current that flows through the primary winding of the transformer directly flowing to the output terminal in the circuit. Therefore, the conversion ratio of the circuit is high, and in the case of the same voltage conversion ratio, the number of turns of a primary side of the transformer can be reduced, thereby improving utilization efficiency of the transformer. Meanwhile, since the current that flows through the primary winding of the transformer directly flowing to the output terminal in the circuit is 4, this part of current is produced without induction of the transformer, thereby further reducing loss and volume of the transformer.

The resonant capacitor Cr1 and the resonant inductor Lr1 in the resonant unit 23 and the resonant capacitor Cr2 and the resonant inductor Lr2 in the resonant unit 24 have two groups of resonance parameters having the same resonant frequency, and the two groups of parameters can be the same or different. Each of the switches S1-S4 connected in series can be formed by a plurality of switching elements connected in series to reduce voltage stress of the single switch, and also can be formed by a plurality of switching elements connected in parallel to increase through-current capability of the switching units.

Figure 4:
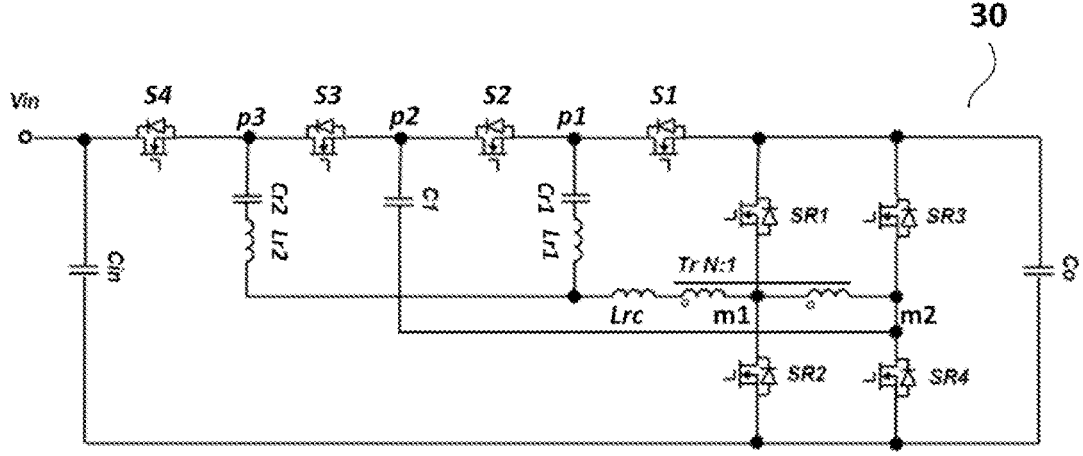
FIG. 4 illustrates a modification of the circuit of FIG. 1.

A circuit 30 in FIG. 4 is a further modification of the circuit 20 of FIG. 3A. In the circuit 30, a part of each of the resonant inductors Lr1 and Lr2 is combined to a common inductor Lrc shared by two resonant units, and the common inductor Lrc is connected in series with the primary side of the transformer. At this time, a resonant frequency is:

$$fr=1/(2\pi \times \sqrt{((Lr_1+2\times Lr_c)\times Cr_1)})=1/(2\pi \times \sqrt{((Lr_2+2\times Lr_c)\times Cr_2)}).$$

The benefit is to reduce a desired inductance of the resonant inductor using leakage inductance of the transformer, thereby achieving the effect of reducing use of devices, and volume of the transformer.

Figure 5:
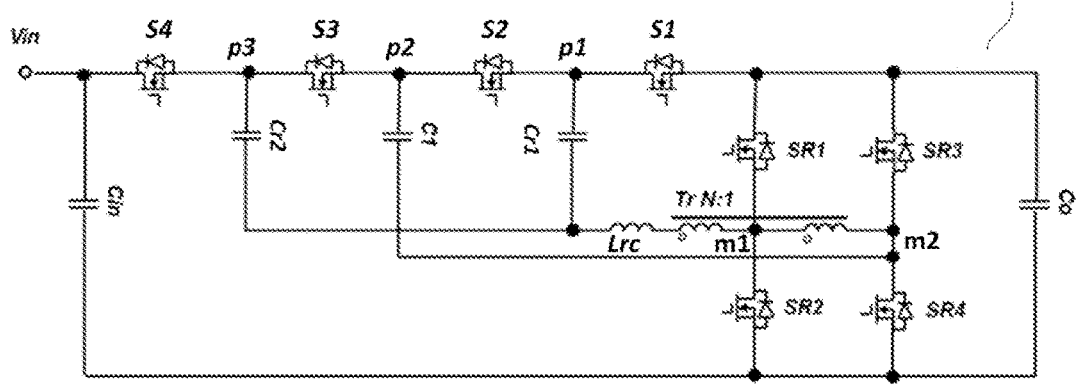
FIG. 5 illustrates a modification of the circuit of FIG. 1.

A circuit 40 in FIG. 5 is a further modification of the circuit 20 of FIG. 3A. In the circuit 40, when parameters of the two resonant units are the same, the resonant inductors of the two resonant units may be combined to a common inductor Lrc shared by the two resonant units, the common inductor Lrc is connected in series with the primary side of the transformer, and capacitances of the resonant capacitors Cr1 and Cr2 are the same. At this time, a resonant frequency is fr=$1/(2\pi \times \sqrt{(2 \times Lr_c \times Cr_1)})$. The circuit 40 works in a DC transformer mode, and is operated in a fixed operating frequency, so a required value of leakage inductance is quite small, and the leakage inductance of the transformer can be directly used as the common resonant inductor Lrc, thereby reducing use number and volume of devices.

Figure 6A:
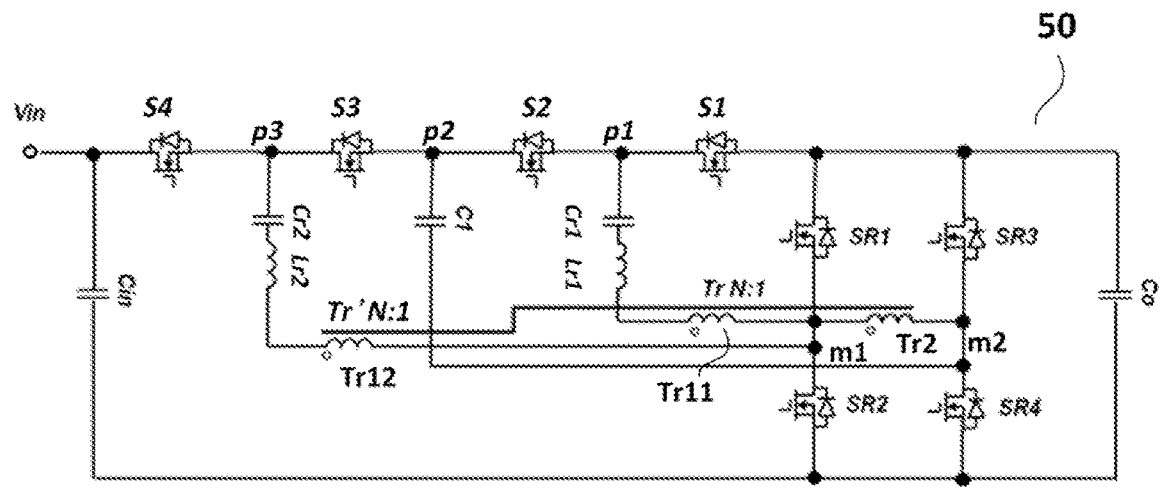
FIGS. 6A and 6B illustrate a modification of the circuit of FIG. 1.

A circuit 50 in FIG. 6A is a further modification of the circuit 20 of FIG. 3A. As compared to the case where the resonant units 23 and 24 share one primary winding Tr1 in the circuit 20 of FIG. 3A, in the circuit 50, the transformer has two primary windings Tr11 and Tr12 respectively for the resonant units, and one secondary winding Tr2. A turn ratio of Tr11, Tr12 and Tr2, for example, can be N:N:1. As shown in FIG. 6A, the primary winding Tr11 has one end connected to a resonant unit including the resonant capacitor Cr1 and the resonant inductor Lr1, and the other end connected to a midpoint m1 of the first bridge arm, and the primary winding Tr12 has one end connected to another resonant unit including the resonant capacitor Cr2 and the resonant inductor Lr2, and the other end connected to the midpoint m1 of the first bridge arm. The secondary winding Tr2 of the transformer Tr is connected between the midpoint m1 of the first bridge arm and a midpoint m2 of the second bridge arm. In some embodiments, positions of the resonant unit including the resonant capacitor Cr1 and the resonant inductor Lr1 and the primary winding Tr11 are exchangeable, only if the resonant unit including the resonant capacitor Cr1 and the resonant inductor Lr1 and the primary winding Tr11 are connected in series. Similarly, positions of the resonant unit including the resonant capacitor Cr2 and the resonant inductor Lr2 and the primary winding Tr12 are exchangeable, only if the resonant unit including the resonant capacitor Cr2 and the resonant inductor Lr2 and the primary winding Tr12 are connected in series.

Figure 6B:
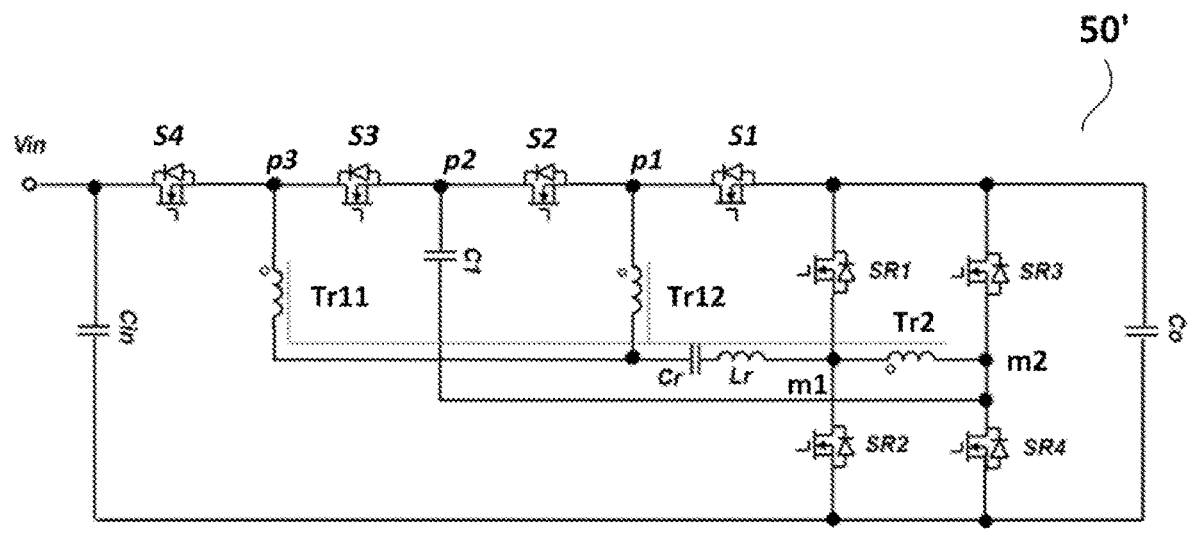

A circuit 50' in FIG. 6B is a further modification of the circuit 20 of FIG. 3A. As compared to the case where the resonant units 23 and 24 share one primary winding Tr1 in the circuit 20 of FIG. 3A, it is also possible that two primary windings Tr11 and Tr12 share one resonant unit, as shown in FIG. 6B. In the circuit 50', the transformer has two primary windings Tr11 and Tr12, and one secondary winding Tr2. A turn ratio of Tr11, Tr12 and Tr2, for example, can be N:N:1. One end of the primary winding Tr11 is connected to a connection node p3, one end of the primary winding Tr12 is connected to a connection node p1, the other end of the primary windings Tr11 and Tr12 is connected together to one end of a resonant unit including the resonant capacitor Cr and the resonant inductor Lr, and the other end of the resonant unit is connected to a midpoint m1 of the first bridge arm.

In the circuits of FIGS. 6A and 6B, leakage inductance of the transformer also can function as a part or whole of the resonant inductors of the resonant units, thereby reducing elements of the circuits.

Figure 7:
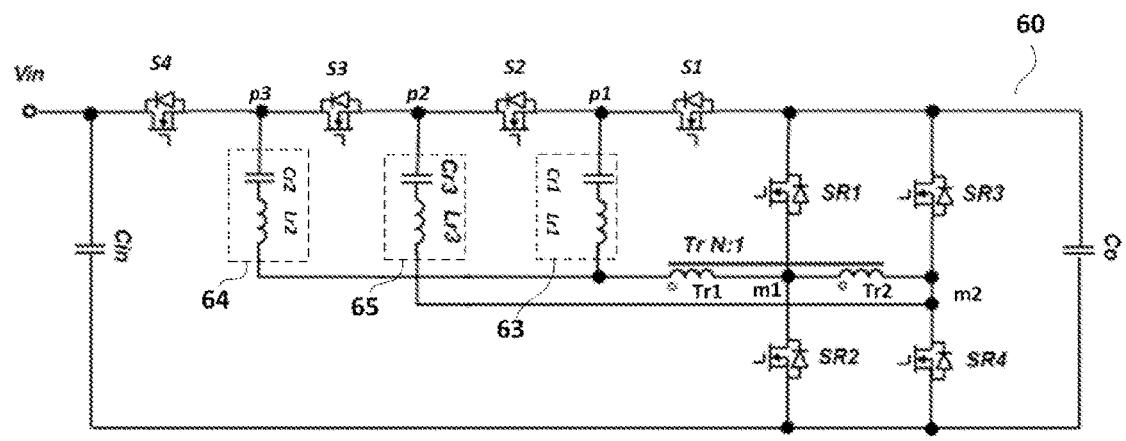
FIG. 7 illustrates a modification of the circuit of FIG. 1.

A circuit 60 in FIG. 7 is a further modification of the circuit 20 of FIG. 3A. In the circuit 60, when the resonant capacitor Cr1 and the resonant inductor Lr1 in a resonant unit 63 and the resonant capacitor Cr2 and the resonant inductor Lr2 in a resonant unit 64 have the same parameters, a resonant capacitor Cr3 and a resonant inductor Lr3 having the same parameters as the resonant units 63 and 64 can replace the original single blocking capacitor connected to a connection node p2 between the switches S2 and S3, thereby forming a resonant unit 65. The resonant capacitor Cr3 functions as the blocking capacitor, and also participates together with the resonant inductor Lr3 in circuit resonance.

Figure 8:
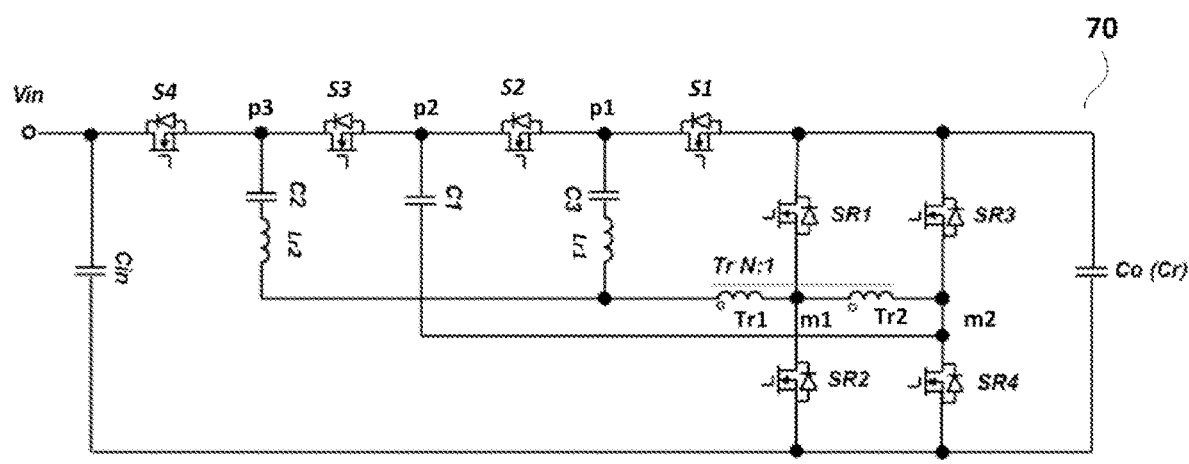
FIG. 8 illustrates a modification of the circuit of FIG. 1.

A circuit 70 in FIG. 8 is a further modification of the circuit 20 of FIG. 3A. In the circuit 70, an output capacitor Co connected in parallel to the first bridge arm and the second bridge arm of the full-bridge rectifier circuit in the circuit 70 can function as a resonant capacitor Cr shared by the two resonant units. At this time, the resonant unit connected between the connection node of the switch branch and the midpoint m1 of the first bridge arm can only include resonant inductors.

Therefore, in the circuit 70, the resonant capacitor Cr is shared by the resonant inductors Lr1 and Lr2, the resonant capacitor Cr and the resonant inductor Lr1 resonate as one resonant unit, and the resonant capacitor Cr and the resonant inductor Lr2 resonate as another resonant unit. The circuit 70 can achieve the same circuit effect, and simplifies circuit configuration. Although the resonant inductor Lr2 is connected in series with a capacitor C2, and the resonant inductor Lr1 is connected in series with a capacitor C3 in the circuit 70, as shown in FIG. 8, the capacitors C2 and C3 mainly function as blocking capacitors, and the capacitors C2 and C3 can be omitted.

Figure 9:
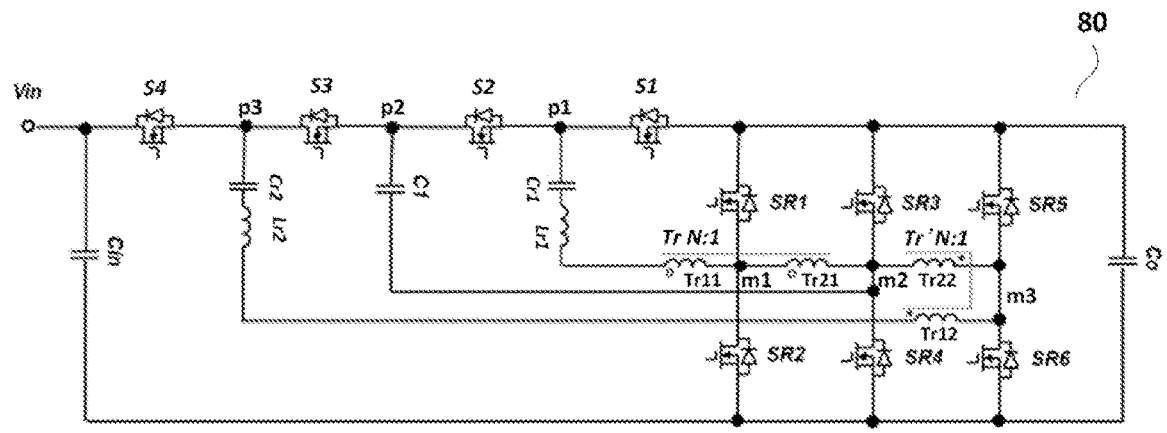
FIG. 9 illustrates a modification of the circuit of FIG. 1.

The transformer in the circuit also may be further divided into two individual transformers. A circuit 80 in FIG. 9 is a further modification of the circuit 20 of FIG. 3A. In the circuit 80, the full-bridge rectifier circuit may further include a third bridge arm including rectifiers SR5 and SR6. The third bridge arm is connected in parallel to the first bridge arm including the rectifiers SR1 and SR2 and the second bridge arm including the rectifiers SR3 and SR4. The circuit 80 includes a first transformer Tr and a second transformer Tr', and a turn ratio of the primary winding and the secondary winding is N:1. The primary winding Tr11 of the first transformer Tr has one end connected to one end of a resonant unit including the resonant capacitor Cr1 and the resonant inductor Lr1, and the other end connected to a midpoint m1 of the first bridge arm, and the secondary winding Tr21 of the first transformer Tr is connected between the midpoint m1 of the first bridge arm and a midpoint m2 of the second bridge arm. The primary winding Tr12 of the second transformer Tr' has one end connected to one end of another resonant unit including the resonant capacitor Cr2 and the resonant inductor Lr2, and the other end connected to a midpoint m3 of the third bridge arm, and the secondary winding Tr22 of the second transformer Tr' is connected between the midpoint m2 of the second bridge arm and the midpoint m3 of the third bridge arm. In some embodiments, positions of the resonant unit including the resonant capacitor Cr1 and the resonant inductor Lr1 and the primary winding Tr11 are exchangeable, only if the resonant unit including the resonant capacitor Cr1 and the resonant inductor Lr1 and the primary winding Tr11 are connected in series.

The benefit of the circuit 80 can reduce current stresses of the single transformer and the single rectifier, or increase through-current capability of the transformer and SR when using the same elements, thereby increasing an output power of the converter.

Figure 10A:
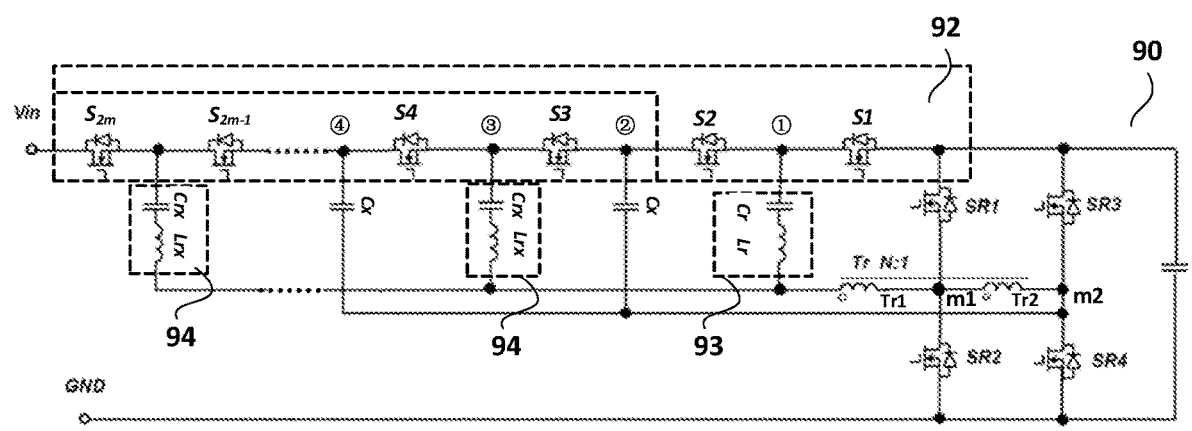
FIGS. 10A and 10B illustrate a modification of the circuit of FIG. 1.

The conversion circuit of the invention can be further expanded to change the voltage conversion ratio. FIG. 10A illustrates one expansion form of the conversion circuit of the invention. A circuit 90 in FIG. 10A is an expansion of the circuit 10 of FIG. 2. In the circuit 90, a switch branch 92 includes the original two switches S1-S2, and is further expanded with (2m−2) switches (S3, S4, . . . $S_{2m-1}$ and $S_{2m}$). The expanded (2m−2) switches (S3, S4, . . . $S_{2m-1}$ and $S_{2m}$) are connected in series with the original two switches S1 and S2, such that the switch branch 92 includes 2m switches, i.e., even-numbered switches, connected in series, where m is an integer, and m≥2.

The circuit 90 further includes (m−1) blocking capacitors Cx and (m−1) resonant units 94. The (m−1) resonant units 94 and an original resonant unit 93 allow the circuit 90 to have m resonant units. The m resonant units are all connected in series with the primary winding Tr1. The resonant units 94 each includes a resonant capacitor Crx and a resonant inductor Lrx.

Therefore, the conversion circuit like the circuit 90 of FIG. 10A can be described as follows: the switch branch 92 has 2m switches connected in series, where m is an integer, and m≥2. Adjacent two switches of the 2m switches are connected to form connection nodes, so the switch branch 92 has (2m−1) connection nodes.

A connection node close to the output terminal of the circuit 90 is referred as the first connection node, so the switch branch 92 has the first, second, third . . . , (2m−2)th, and (2m−1)th connection nodes from the output terminal to the input terminal. For example, as shown in FIG. 10A, the connection node between the switches S1 and S2 is closest to the output terminal, so the connection node between the switches S1 and S2 is the first connection node (sign "①" in FIG. 10A), the connection node between the switch S2 and the next switch S3 adjacent to the switch S2 is the second connection node, and so on. The connection node between the switches $S_{2m-1}$ and $S_{2m}$ is the (2m−1)th connection node.

Each of the m resonant units is connected between the odd-numbered connection node and the primary winding Tr1 of the transformer, and each of the (m−1) blocking capacitors Cx is connected between the even-numbered connection node and the midpoint m2 of the second bridge arm.

Of the m resonant units, one end of the x-th resonant unit is connected to the connection node between the (2x−1)th switch and the 2x-th switch of the 2m switches, where x is an integer, and 1≤x≤m.

For example, when x=1, as for the first (i.e., x) resonant unit (the resonant unit 93 in FIG. 10A) of the m resonant units, one end is connected to the connection node between the first (i.e., 2x−1) switch (the switch S1 in FIG. 10A) and the second (i.e., 2x) switch (the switch S2 in FIG. 10A), and the other end is connected to the primary winding Tr1 of the transformer. For another example, when x=m, as for the m-th (i.e., x) resonant unit (the resonant unit 94 in FIG. 10A) of the m resonant units, one end is connected to the connection node between the (2m−1)th (i.e., 2x−1) switch (the switch $S_{2m-1}$ in FIG. 10A) and the 2m-th (i.e., 2x) switch (the switch $S_{2m}$ in FIG. 10A), and the other end is connected to the primary winding Tr1 of the transformer.

Of the (m−1) blocking capacitors Cx, one end of the k-th blocking capacitor is connected to the connection node between the 2k-th switch and the (2k+1)th switch of the 2m switches, and the other end is connected to the midpoint m2 of the second bridge arm, where m is an integer, and 1≤k≤m−1.

For example, when k=1, one end of the first (i.e., k) blocking capacitor (the blocking capacitor Cx in FIG. 10A) is connected to the connection node between the second (i.e., 2k) switch (the switch S2 in FIG. 10A) and the third switch (the switch S3 in FIG. 10A), and the other end is connected to the midpoint m2 of the second bridge arm. For another example, when k=(m−1), one end of the (m−1)th (i.e., k) blocking capacitor (not shown in FIG. 10A) is connected to the connection node between the (2m−2)th (i.e., 2k) switch (the previous switch adjacent to the switch $S_{2m-1}$ in FIG. 10A, not shown) and the (2m−1)th (i.e., 2k+1) switch (the switch $S_{2m-1}$ in FIG. 10A), and the other end is connected to the midpoint m2 of the second bridge arm. Therefore, as for the circuit 90 of FIG. 10A, a conversion ratio is (2 mN+2m):1, where N is a turn ratio of the primary winding and the secondary winding of the transformer Tr, thereby expanding the conversion ratio of the conversion circuit.

Although the circuit 90 of FIG. 10A illustrates the case where the m resonant units are all connected in series with the single primary winding Tr1, as is described in FIG. 6A, the primary winding Tr1 also may be formed of a plurality of sub-windings, and each sub-winding is connected in series with the corresponding resonant unit of the m resonant units, respectively.

As can be seen, as for the circuit 20 of FIG. 3A, it can be referred as a circuit after expanding the circuit 10 of FIG. 2 with a pair of switches, one blocking capacitor and one resonant unit.

Figure 10B:
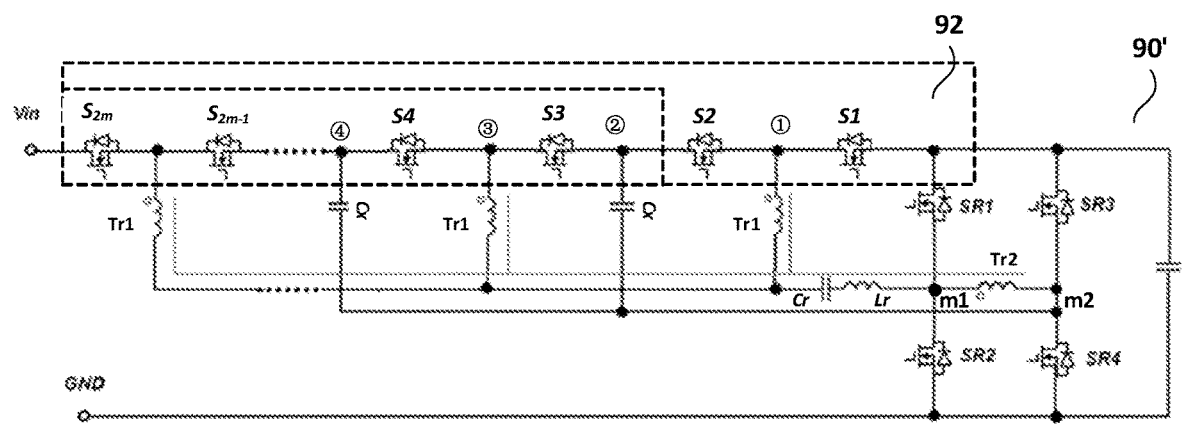

Similarly with those described in FIG. 6B, as compared to the case where the m resonant units in FIG. 10A is connected together in series with the common primary winding Tr1, the case where a plurality of primary windings share one resonant unit is also possible, as shown in a circuit 90' of FIG. 10B.

In the circuit 90', the switch branch 92 includes the original two switches S1 and S2, and is further expanded with (2m−2) switches (S3, S4, . . . $S_{2m-1}$ and $S_{2m}$). The expanded (2m−2) switches (S3, S4, . . . $S_{2m-1}$ and $S_{2m}$) are connected in series with the original two switches S1 and S2, such that the switch branch 92 includes 2m switches, i.e., even-numbered switches, connected in series, where m is an integer, and m≥2. The circuit 90' further includes (m−1) blocking capacitors Cx and m primary windings Tr1. The m primary windings Tr1 are all connected in series with a resonant unit including the resonant inductor Lr and the resonant capacitor Cr.

In the circuit 90', adjacent two switches of the 2m switches of the switch branch 92 are connected to form connection nodes, so the switch branch 92 has (2m−1) connection nodes. A connection node close to the output terminal of the circuit 90' is referred as the first connection node, so the switch branch 92 has the first, second, third . . . , (2m−2)th, and (2m−1)th connection nodes from the output voltage terminal to the input terminal. For example, as shown in FIG. 10B, the connection node between the switches S1 and S2 is closest to the output terminal, so the connection node between the switches S1 and S2 is the first connection node (sign "①" in FIG. 10B), the connection node between the switch S2 and the next switch S3 adjacent to the switch S2 is the second connection node, and so on. The connection node between the switches $S_{2m-1}$ and $S_{2m}$ is the (2m−1)th connection node.

Each of the m primary windings Tr1 is connected between the odd-numbered connection node and the resonant unit, and each of the (m−1) blocking capacitors Cx is connected between the even-numbered connection node and the midpoint m2 of the second bridge arm.

Of the m primary windings Tr1, one end of the x-th primary winding is connected to the connection node between the (2x−1)th switch and the 2x-th switch of the 2m switches, where x is an integer, and 1≤x≤m.

Of the (m−1) blocking capacitors Cx, one end of the k-th blocking capacitor is connected to the connection node between the 2k-th switch and the (2k+1)th switch of the 2m switches, and the other end is connected to the midpoint m2 of the second bridge arm, where k is an integer, and 1≤k≤m−1.

Figure 11A:
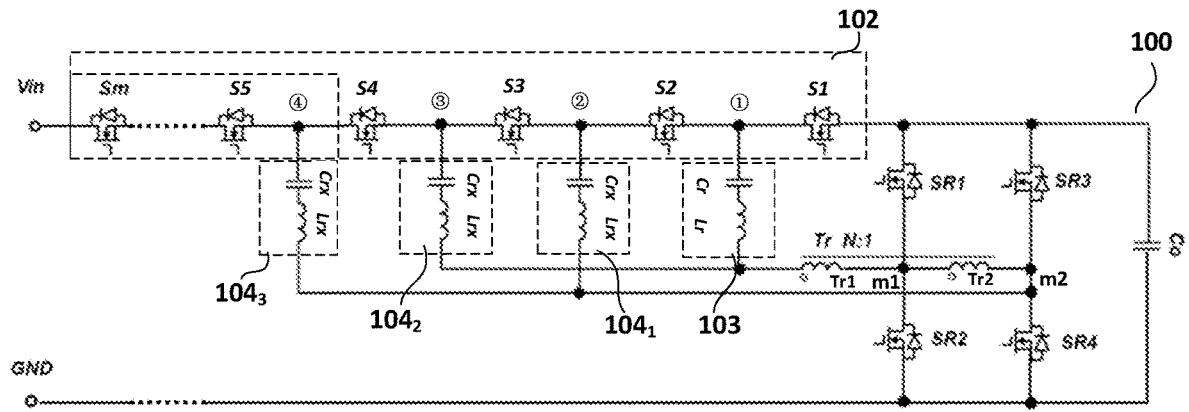
FIGS. 11A-11C illustrate a modification of the circuit of FIG. 1.

FIG. 11A illustrates another expansion form of the conversion circuit of the application. A circuit 100 of FIG. 11A is another expansion of the circuit 10 of FIG. 2. A switch branch 102 of the circuit 100 includes the original two switches S1-S2, and is further expanded with (m−2) switches (S3, . . . , $S_m$). The expanded (m−2) switches (S3, . . . , $S_m$) are connected in series with the original two switches S1-S2, such that the switch branch 102 includes m switches connected in series, where m is an integer, and m≥3. The circuit 100 further includes (m−2) resonant units. Therefore, the (m−2) resonant units 104 and a resonant unit 103 together form (m−1) resonant units. The resonant units 104 include resonant capacitors Crx and resonant inductors Lrx. The respective resonant units (the resonant unit 103 and the resonant units 104) in the circuit 100 have the same resonance parameters.

Specifically, the conversion circuit like the circuit 100 of FIG. 11A can be described as follows: the switch branch 102 has m switches connected in series, where m is an integer, and m≥3. Adjacent two switches of the m switches are connected to form connection nodes, so the switch branch 102 has (m−1) connection nodes. A connection node close to the output terminal of the circuit 100 is referred as the first connection node, so the switch branch 102 has the first, second, third, . . . , and (m−1)th connection nodes from the output terminal to the input terminal. For example, as shown in FIG. 11A, the connection node between the switches S1 and S2 is closest to the output terminal, so the connection node between the switches S1 and S2 is the first connection node (sign "①" in FIG. 11A), the connection node between the switches S2 and S3 is the second connection node (sign "②" in FIG. 11A), the connection node between the switch S3 and the switch S4 is the third connection node (sign "③" in FIG. 11A), and so on. The connection node between the switch $S_m$ and one switch before the switch $S_m$ is the (m−1)th connection node.

Each of the (m−1) resonant units (103, 104) in the circuit 100 has one end connected to the corresponding connection node, and the other end connected to the primary winding Tr1 of the transformer or the midpoint m2 of the second bridge arm of the full-bridge rectifier circuit. As for the resonant unit having one end connected to the odd-numbered connection node, the other end is connected to the primary winding Tr1 of the transformer. As for the resonant unit having one end connected to the even-numbered connection node, the other end is connected to the midpoint m2 of the second bridge arm of the full-bridge rectifier circuit.

Of the (m−1) resonant units, one end of the (2y−1)th resonant unit is connected to the connection node between the (2y−1)th switch and the 2y-th switch of the m switches, and the other end is connected to the primary winding Tr1 of the transformer, where y is an integer, and 1≤y≤m/2.

For example, when y=1, of the (m−1) resonant units, one end of the first (i.e., 2y−1) resonant unit (the resonant unit 103 in FIG. 11A) is connected to the connection node between the first (i.e., 2y−1) switch (the switch S1 in FIG. 11A) and the second (i.e., 2y) switch (the switch S2 in FIG. 11A), and the other end is connected to the primary winding Tr1 of the transformer.

Of the (m−1) resonant units, one end of the 2z-th resonant unit is connected to the connection node between the 2z-th switch and the (2z+1)th switch of the m switches, and the other end is connected to the midpoint m2 of the second bridge arm of the full-bridge rectifier circuit, where z is an integer, and 1≤z≤(m−1)/2.

For example, when z=1, of the (m−1) resonant units, one end of the second (i.e., 2z) resonant unit (the resonant unit $104_1$ in FIG. 11A) is connected to the connection node between the second (i.e., 2z) switch (the switch S2 in FIG. 11A) and the third (i.e., 2z+1) switch (the switch S3 in FIG. 11A), and the other end is connected to the midpoint m2 of the second bridge arm of the full-bridge rectifier circuit.

Figure 11B:
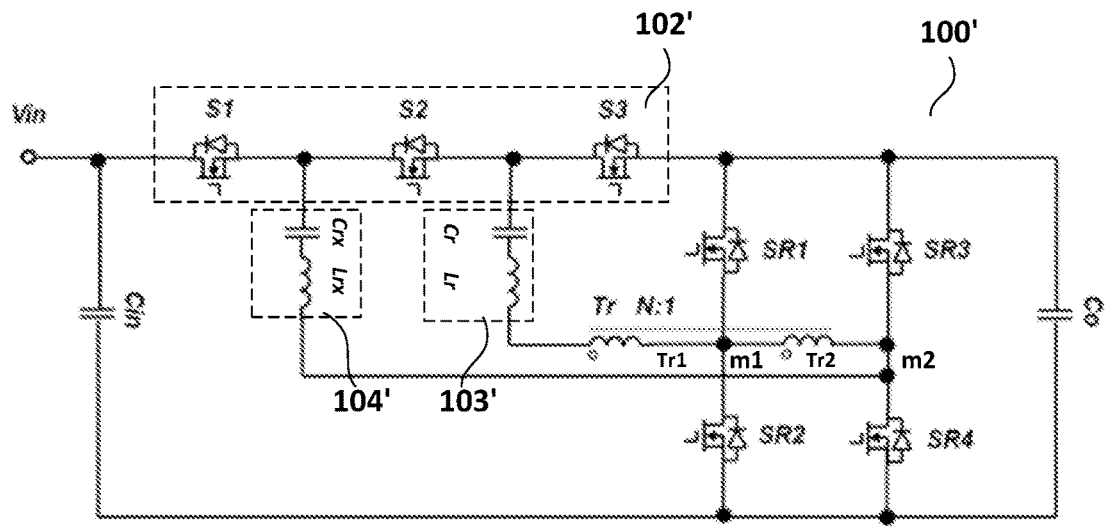

Hereinafter a conversion ratio of the expanded circuit 100 is described. When m is an even number, the conversion ratio of the circuit 100 is (mN+m):1, where N is a turn ratio of the primary winding and the secondary winding of the transformer Tr. As can be seen, the circuit 60 of FIG. 7 is actually an example circuit in which the switch branch has even-numbered switches after expanding two switches on the basis of the circuit 10 of FIG. 2. Therefore, the conversion ratio of the circuit 60 of FIG. 7 is (4N+4):1 (i.e., (mN+m):1, m=4) as discussed, thereby expanding the conversion ratio of the conversion circuit. When m is an odd number, the conversion ratio of the circuit 100 is ((m−1)N+m):1, where N is a turn ratio of the primary winding and the secondary winding of the transformer Tr, thereby expanding the conversion ratio of the conversion circuit. FIG. 11B illustrates a circuit 100' of a switch branch 102' having three switches after expanding one switch S3 on the basis of the circuit 10 of FIG. 2. A resonant unit 103' has one end connected to the connection node between the switches S1 and S2, and the other end connected to the primary winding Tr1 of the transformer. A resonant unit 104' has one end connected to the connection node between the switches S2 and S3, and the other end connected to the midpoint m2 of the second bridge arm of the full-bridge rectifier circuit. A conversion ratio of the circuit 100' is (2N+3):1 (i.e., ((m−1)N+m):1, m=3).

Although FIGS. 11A and 11B illustrate the case where the resonant units connected to the odd-numbered connection nodes of the (m−1) resonant units are all connected in series with the single primary winding Tr1, as is described in FIG. 6A, the primary winding Tr1 also may be formed of a plurality of sub-windings, and each sub-winding is connected in series with the corresponding resonant unit connected to the odd-numbered connection node of the (m−1) resonant units, respectively.

Figure 11C:
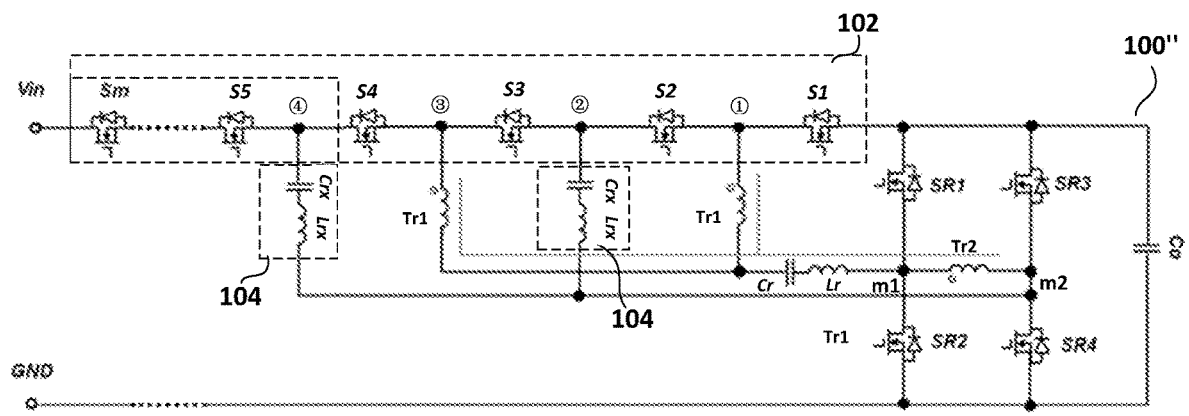

Similarly with those described in FIG. 6B, as compared to the case where the plurality of resonant units in FIGS. 11A and 11B are connected together in series with the common primary winding Tr1, the case where a plurality of primary windings share one resonant unit is also possible, as shown by a circuit 100" of FIG. 11C.

The switch branch 102 of the circuit 100" includes the original two switches S1 and S2, and is further expanded with (m−2) switches (S3, . . . , and $S_m$). The expanded (m−2) switches (S3, . . . , and $S_m$) are connected in series with the original two switches S1 and S2, such that the switch branch 102 includes m switches connected in series, where m is an integer, and m≥3. The circuit 100" further includes a plurality of resonant units 104 and a plurality of primary windings Tr1. Each of the plurality of resonant units 104 includes a resonant capacitor Crx and a resonant inductor Lrx. Each of the plurality of resonant units 104 has the same resonance parameter.

In the circuit 100", the switch branch 102 has m switches connected in series, wherein m is an integer, and m≥3. Adjacent two switches of the m switches are connected to form connection nodes, so the switch branch 102 has (m−1) connection nodes. A connection node close to the output terminal of the circuit 100" is referred as the first connection node, so the switch branch 102 has the first, second, third . . . , and (m−1)th connection nodes from the output terminal to the input terminal. For example, as shown in FIG. 11C, the connection node between the switches S1 and S2 is closest to the output terminal, so the connection node between the switches S1 and S2 is the first connection node (sign "①" in FIG. 11C), the connection node between the switches S2 and S3 is the second connection node (sign "②" in FIG. 11C), the connection node between the switch S3 and S4 is the third connection node (sign "③" in FIG. 11C), and so on. The connection node between the switch $S_m$ and one switch before the switch $S_m$ is the (m−1)th connection node.

Each of the plurality of primary windings Tr1 in the circuit 100" has one end connected to an odd-numbered connection node, and the other end connected to a resonant unit including the resonant capacitor Cr and the resonant inductor Lr. Each of the plurality of resonant units 104 in the circuit 100" has one end connected to an even-numbered connection node, and the other end connected to the midpoint m2 of the second bridge arm of the full-bridge rectifier circuit.

Each of the plurality of primary windings Tr1 has one end connected to the connection node between the (2y−1)th switch and the 2y-th switch of the m switches, and the other end connected to the resonant unit including the resonant capacitor Cr and the resonant inductor Lr, where y is an integer, and 1≤y≤m/2.

Each of the plurality of resonant units 104 has one end connected to the connection node between the 2z-th switch and the (2z+1)th switch of the m switches, and the other end connected to the midpoint m2 of the second bridge arm of the full-bridge rectifier circuit, where z is an integer, and 1≤z≤(m−1)/2.

Figure 12:
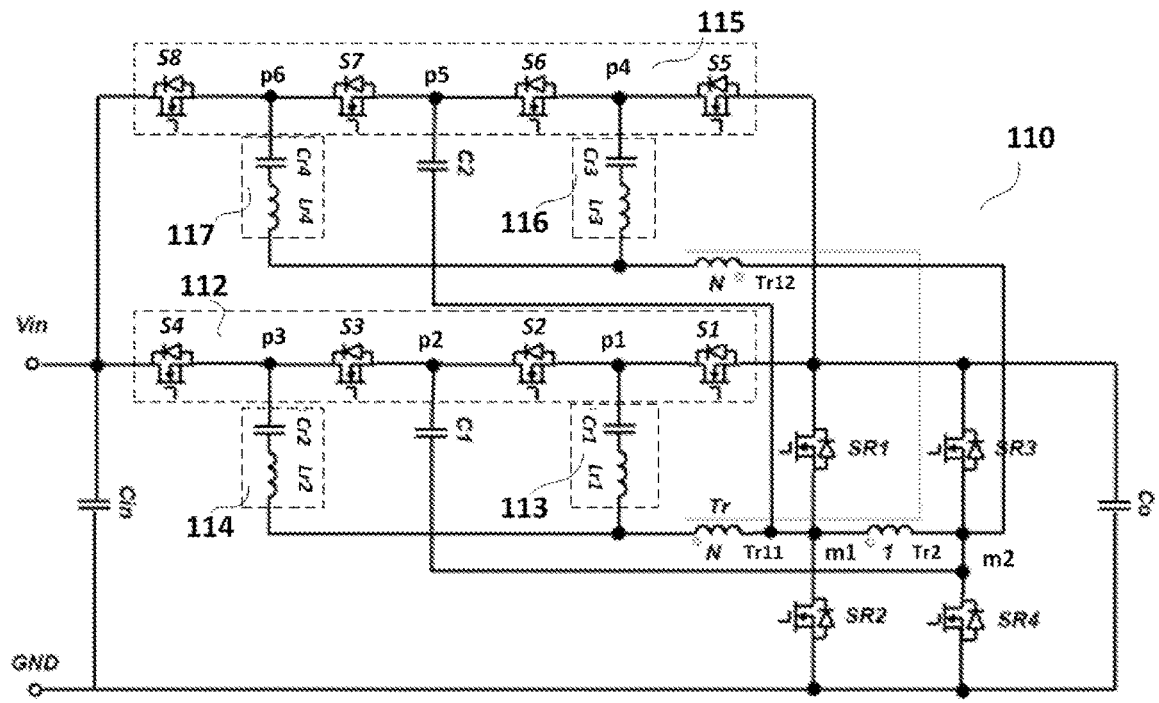
FIG. 12 illustrates a modification of the circuit of FIG. 1.

FIG. 12 illustrates a modification of the circuit 20 of FIG. 3A. In a circuit 110 of FIG. 12, the circuit 110 has two switch branches 112 and 115 connected in parallel, and each of the switch branches 112 and 115 is connected between the first end of the input voltage and the first end of the output voltage. The switch branch 112 has four switches S1-S4 connected in series, and the switch branch 115 has four switches S5-S8 connected in series. The full-bridge rectifier circuit of the circuit 110 is connected to the first end and the second end of the output voltage, and has a first bridge arm including rectifiers SR1 and SR2 connected in series, and a second bridge arm including rectifiers SR3 and SR4 connected in series. The circuit 110 has four resonant units 113, 114, 116 and 117, two blocking capacitors C1 and C2, and a transformer Tr. The transformer Tr has two primary windings Tr11 and Tr12, and one secondary winding Tr2. A turn ratio of Tr11, Tr12 and Tr2 is N:N:1.

The resonant unit 113 is connected between a connection node p1 of the switches S1, S2 and the primary winding Tr11. The resonant unit 114 is connected between a connection node p3 of the switches S3, S4 and the primary winding Tr11. The resonant unit 116 is connected between a connection node p4 of the switches S5, S6 and the primary winding Tr12. The resonant unit 117 is connected between a connection node p6 of the switches S7, S8 and the primary winding Tr12. The blocking capacitor C1 is connected between a connection node p2 of the switches S2, S3 and a midpoint m2 of the second bridge arm. The blocking capacitor C2 is connected between a connection node p6 of the switches S6, S7 and a midpoint m1 of the first bridge arm.

In one operating period of the circuit 110, during the first half period, the switches S4, S2, S7, S5 and the rectifiers SR1, SR4 are turned on, while the switches S3, S1, S8, S6 and the rectifiers SR2, SR3 are turned off; during the second half period, the switches S4, S2, S7, S5 and the rectifiers SR1, SR4 are turned off, while the switches S3, S1, S8, S6 and the rectifiers SR2, SR3 are turned on. The circuit 110 also realizes a conversion ratio of (4N+4):1. As compared to the circuit 20 of FIG. 3A, current stress of the switches S1-S8 of the switch branch in the circuit 110 may be reduced by half, and currents of the rectifiers SR1-SR4 are more balanced.

Second Embodiment

The case where the rectifier circuit in the conversion circuit is a full-bridge rectifier circuit is described with reference to FIGS. 2-12. However, the invention is not limited thereto. For example, the rectifier circuit in the conversion circuit also can be a full-wave rectifier circuit.

Figure 13A:
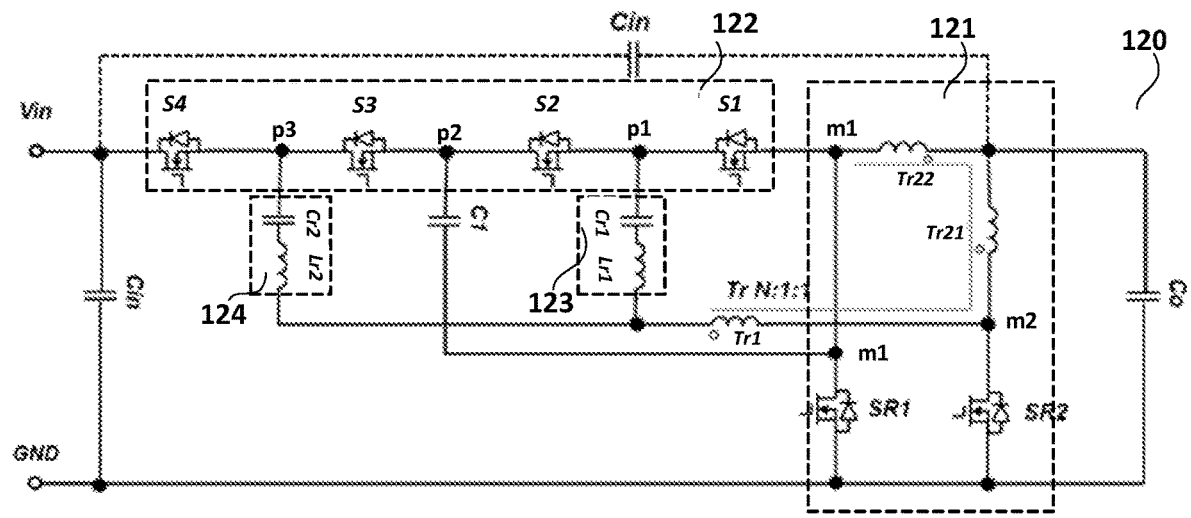
FIG. 13A illustrates an exemplary circuit of a conversion circuit according to a second embodiment of the invention.

FIG. 13A illustrates a schematic diagram of a conversion circuit 120 according to a second embodiment of the invention. The circuit 120 receives an input voltage Vin, converts the input voltage Vin, and outputs the converted voltage.

The circuit 120 includes a full-wave rectifier circuit 121, a switch branch 122, resonant units 123 and 124, and a primary winding Tr1 of the transformer.

Each of the input voltage and the output voltage has a first end and a second end, and the second end of the input voltage is connected to the second end of the output voltage. The full-wave rectifier circuit 121 has a first branch including a switch SR1 and a secondary winding Tr22 of the transformer, and a second branch including a switch SR2 and a secondary winding Tr21 of the transformer. The switch SR1 and the secondary winding Tr22 of the transformer are connected in series to form a connection node, which is a first midpoint m1. The switch SR2 and the secondary winding Tr21 of the transformer are connected in series to form a connection node, which is a second midpoint m2.

In one example of the circuit 120, the circuit 120 may include an output capacitor Co for filtering, and the output capacitor Co is connected between the first end and the second end of the output voltage, and connected in parallel to the first branch and the second branch of the full-bridge rectifier circuit 121. Additionally, the circuit 120 may further include an input capacitor Cin for filtering, and the input capacitor Cin may be connected between the first end and the second end of the input voltage, or may be connected between the first end of the input voltage and the first end of the output voltage, such as the input capacitor Cin connected by a dashed line in FIG. 13A.

The switch branch 122 is connected between the first end of the input voltage and the first midpoint m1 of the full-wave rectifier circuit 121, and includes four switches S1, S2, S3 and S4 connected in series. The switches S1 and S2 are connected to form a connection node p1, the switches S2 and S3 are connected to form a connection node p2, and the switches S3 and S4 are connected to form a connection node p3.

The resonant units 123 and 124 each has resonant capacitors Cr1, Cr2 and resonant inductors Lr1, Lr2, respectively. Although FIG. 13A illustrates resonant units including resonant capacitors and resonant inductors connected in series, the invention is not limited thereto, and the resonant units also can be formed of resonant capacitors and resonant inductors connected in parallel.

One end of the resonant unit 123 is connected to the connection node p1, and one end of the resonant unit 124 is connected to the connection node p3. Moreover, the other end of the resonant units 123 and 124 is connected to the second midpoint m2 via the primary winding Tr1 of the transformer.

The primary winding Tr1, the secondary winding Tr21 and the secondary winding Tr22 of the transformer form a transformer Tr having a turn ratio of N:1:1.

The blocking capacitor C1 is connected between the connection node p2 and the first midpoint m1.

Figure 13B:
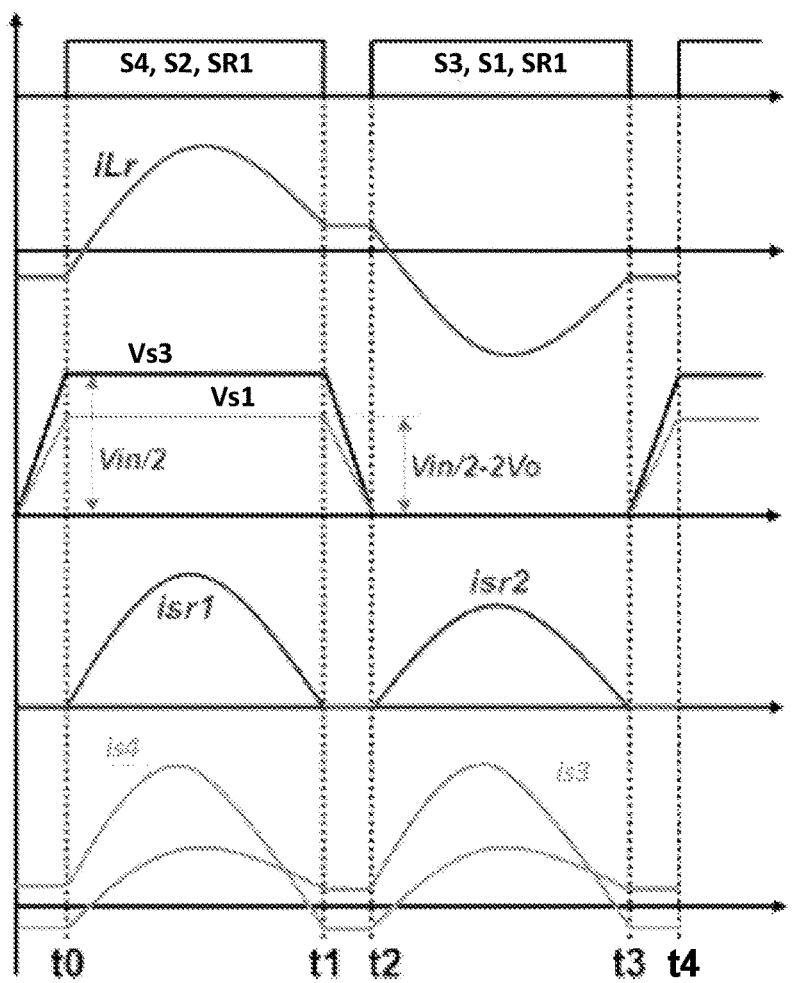
FIG. 13B illustrates a waveform diagram of electric signals in the circuit of FIG. 13A.
Figure 13C:
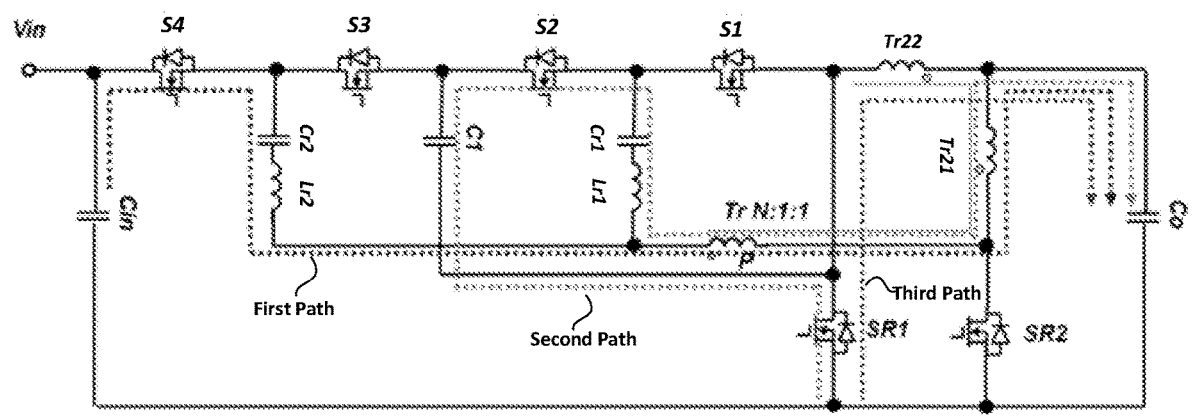
FIG. 13C illustrates a current flow diagram of the circuit of FIG. 13A in a half operating period.

Referring to FIGS. 13B and 13C, the circuit 120 works in one operating period. FIG. 13B illustrates currents or voltages changes of the respective elements in one operating period (t0-t4) of the circuit 120 in the case that a switch frequency is equal to a resonant frequency, wherein iLr represents a current of each of the resonant units 123 and 124, Vs3 and Vs1 represent voltages across the switches S3 and S1, and isr1, isr2, isr3 and isr4 represent currents in the switches SR1, SR2, S4 and S3. FIG. 13C illustrates an example of current flow directions of the circuit 120 in the first half of one operating period.

In one operating period of the circuit 120, the switches S4, S2, SR1 and the switches S3, S1, SR2 are complementarily turned on, and thus a duty cycle is approximately 0.5. Duration t0-t2 is the first half of operating period of the circuit. In the duration t0-t1, the switches S4, S2 and SR1 are turned on, while the switches S3, S1 and SR2 are turned off. At this time, current supplies energy from an input terminal to an output terminal through a first resonant path formed of the switch S4, the resonant capacitor Cr2, the resonant inductor Lr2, the primary winding Tr1 and the secondary winding Tr21, and a resonant frequency is $fr2=1/(2\pi\times\sqrt{Lr_2\times Cr_2})$. Meanwhile, a voltage on the blocking capacitor C1 is 0.5Vin, energy on the blocking capacitor C1 is supplied to the output terminal through a second resonant path formed of the switch SR1, the switch S2, the resonant capacitor Cr1, the resonant inductor Lr1, the primary winding Tr1 and the secondary winding Tr21, and a resonant frequency is $fr1=1/(2\pi\times\sqrt{Lr_1\times Cr_1})$. At this time, since the primary winding Tr1 and the secondary winding Tr21 of the transformer actually form a series connection relation, and the secondary winding Tr22 of the transformer Tr induces resonant currents of the primary winding Tr1 and the secondary winding Tr21, and supplies energy to the output terminal through a third path formed of the switch SR1 and the secondary winding Tr22. In the duration t1-t2, the switches S4, S2 and SR1 are turned off. At this time, parasitic capacitance of the switches S4, S2 and SR1 are charged by excitation induced current, and parasitic capacitance of the switches S3, S1 and SR2 are discharged, thereby realizing soft switching. t2-t4 is the second half of operating period of the circuit, and in the duration t2-t3, the switches S3, S1 and SR2 are turned on, and the switches S4, S2 and SR1 are turned off. As compared to the first half period, current flows to the output terminal through a resonant path formed of the switch SR2, the primary winding Tr1, the resonant inductor Lr2, the resonant capacitor Cr2, the switch S3, the blocking capacitor C1 and the secondary winding Tr22, and flows to the output terminal through another resonant path formed of the switch SR2, the primary winding Tr1, the resonant inductor Lr1, the resonant capacitor Cr1, the switch S1 and the secondary winding Tr22, and finally, the secondary winding Tr21 induces currents of the primary winding Tr1 and the secondary winding Tr22 flowing to the output terminal through a resonant path formed of the switch SR2 and the secondary winding Tr21. In the duration t3-t4, the switches S3, S1 and SR2 are turned off. At this time, parasitic capacitance of the switches S3, S1 and SR2 are charged by excitation induced current, and parasitic capacitance of the switches S4, S2 and SR1 are discharged, thereby realizing soft switching.

Assuming that a current of the input terminal is i, in one operating period of the circuit 120, currents of the two resonant units are 2i, respectively, and a current of the primary side of the transformer Tr is 4i. Moreover, the current directly flows to an output terminal via one secondary winding, and an induced current of another secondary side of the transformer Tr is 4(N+1)i, so a total current flowing to the output end is 4(N+2)i. For the input terminal, since only current of a half resonance period flows through the switch S4, a current on an input side is half of the current of the resonant unit 124, i.e., i. Therefore, a voltage conversion ratio of the circuit is (4N+8):1.

As compared to the conversion circuit using the full-bridge rectifier circuit in FIG. 3A, the voltage conversion ratio of the circuit 120 of FIG. 13A is further increased by 4 in the case of the same number of turns of the transformer, for the main reason that the full-wave rectifier circuit has two secondary windings Tr21 and Tr22. During work, the secondary windings Tr21 and Tr22 in turn form a series relationship with the primary winding Tr1 of the transformer, and an actual equivalent turn ratio is changed to (N+1). Advantage of the conversion circuit using the full-wave rectifier circuit lies in that source electrodes of the switches SR1 and SR2 are grounded, such that driving of the switches SR1 and SR2 is simpler than the full-bridge rectification. Meanwhile, when the switches S1-S4 connected in series are driven to supply power using a boost-strap manner, since each bridge arm of the full-bridge rectifier circuit has two switches, while each branch in the full-wave rectifier circuit only includes one switch, power stages can be reduced by one stage relative to the case of the full-bridge rectifier circuit. Therefore, the full-wave rectifier conversion circuit is relatively advantageous in terms of the number of elements, an occupied area and costs of the driving circuit. Voltage stress of the switches SR1 and SR2 in the full-wave rectifier conversion circuit is 2Vo, where Vo is an output voltage, but in the state of one switch, only one switch is turned on. Here assuming that an on resistance of the MOSFET is Ron_2Vo, voltage stress of the switch SR of the full-bridge rectifier conversion circuit is Vo, but a rectified current flows through the two switches. Here assuming that an on resistance of the MOSFET is Ron_Vo, and when Ron_2Vo<2×Ron_Vo, the full-wave rectifier conversion circuit has advantage of efficiency.

Similarly, the resonant units 123 and 124 have two groups of resonance parameters having the same resonant frequency, and the two groups of parameters can be the same or different. The switches S1-S4 connected in series can be formed by a plurality of switching elements connected in series to reduce voltage stress of the single switch, and also can be formed by a plurality of switching elements connected in parallel to increase through-current capability of the switching units.

Modifications of Second Embodiment

Similarly with the full-bridge rectifier conversion circuit, the full-wave rectifier conversion circuit also has various modifications. Hereinafter various modifications of the full-wave rectifier conversion circuit 120 are described, and only differences between the various modifications and the conversion circuit 120 are described, so the same parts are not described here.

Figure 14:
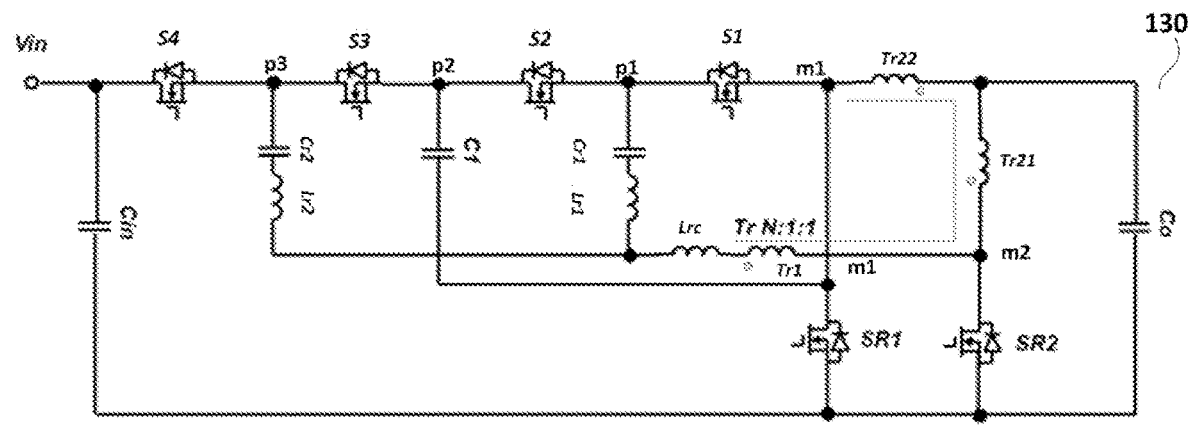
FIG. 14 illustrates a modification of the circuit of FIG. 13A.

A circuit 130 in FIG. 14 is a further modification of the circuit 120 of FIG. 13A. In the circuit 130, a part of each of the resonant inductors Lr1 and Lr2 is combined to a common inductor Lrc shared by two resonant units, and the common inductor Lrc is connected in series with a primary side of the transformer. At this time, a resonant frequency is:

$$fr=1/(2\pi \times \sqrt{((Lr_1+2 \times Lr_c) \times Cr_1)})=1/(2\pi \times \sqrt{((Lr_2+2 \times Lr_c) \times Cr_2)}).$$

The benefit is to reduce a desired inductance of the resonant inductor using leakage inductance of the transformer, thereby achieving the effect of reducing use of devices, and volume of the transformer.

Figure 15:
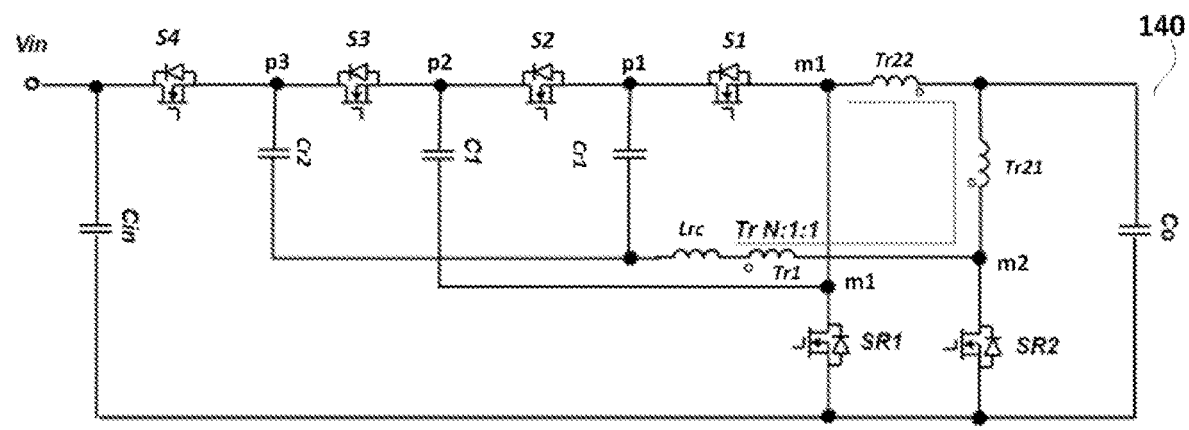
FIG. 15 illustrates a modification of the circuit of FIG. 13A.

A circuit 140 in FIG. 15 is a further modification of the circuit 120 of FIG. 13A. In the circuit 140, when parameters of the two resonant units are the same, the resonant inductors of the two resonant units are combined to a common inductor Lrc shared by the two resonant units, and then the common inductor Lrc is connected in series with the primary side of the transformer. At this time, a resonant frequency is $fr=1/(2\pi \times \sqrt{(2 \times Lr_c \times Cr_1)})$. Capacitances of the resonant capacitors Cr1 and Cr2 are the same. The circuit 140 works in a DC transformer mode, and is operated in a fixed operating frequency, so a required value of a leakage inductance is quite small, and the leakage inductance of the transformer can directly function as the common resonant inductor Lrc, thereby reducing use number and volume of devices.

Figure 16A:
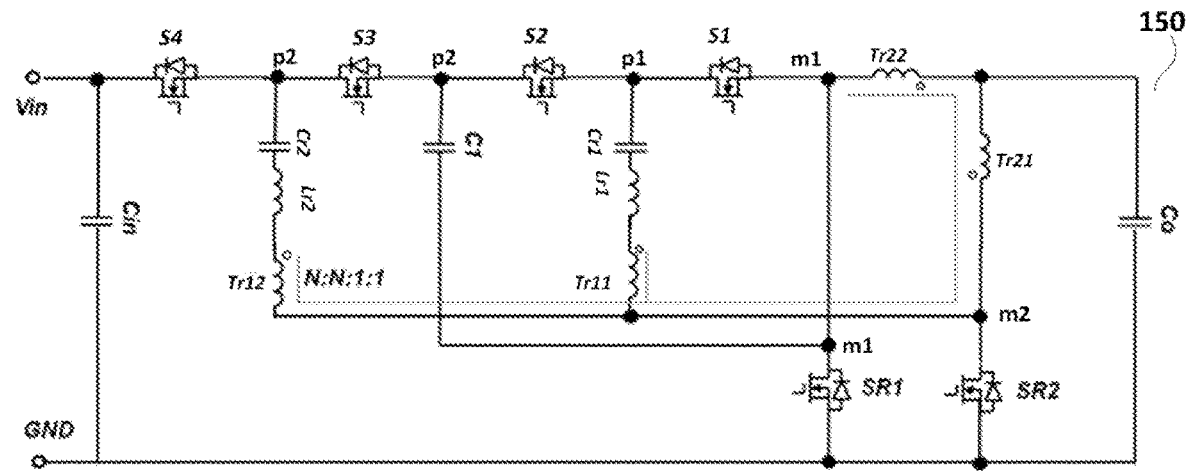
FIGS. 16A and 16B illustrate a modification of the circuit of FIG. 13A.

A circuit 150 in FIG. 16A is a further modification of the circuit 120 of FIG. 13A. As compared to the case where a plurality of resonant units in FIG. 13A share one primary winding, in the circuit 150 of FIG. 16A, the transformer has two primary windings Tr11 and Tr12 connected in series with two resonant units (i.e., a resonant unit including the resonant inductor Lr1 and the resonant capacitor Cr1, and a resonant unit including the resonant inductor Lr2 and the resonant capacitor Cr2), respectively, and two secondary windings Tr21 and Tr22. A turn ratio of the primary winding Tr11, the primary winding Tr12, the secondary winding Tr21 and the secondary winding Tr22 is N:N:1:1. The primary winding Tr11 has one end connected to a second midpoint m2, and the other end connected to a resonant unit including the resonant capacitor Cr1 and the resonant inductor Lr1. The primary winding Tr12 has one end connected to the second midpoint m2, and the other end connected to a resonant unit including the resonant capacitor Cr2 and the resonant inductor Lr2. In some embodiments, positions of the resonant unit including the resonant capacitor Cr1 and the resonant inductor Lr1 and the primary winding Tr11 are exchangeable, only if the resonant unit including the resonant capacitor Cr1 and the resonant inductor Lr1 and the primary winding Tr11 are connected in series. Similarly, positions of the resonant unit including the resonant capacitor Cr2 and the resonant inductor Lr2 and the primary winding Tr12 are exchangeable, only if the resonant unit including the resonant capacitor Cr2 and the resonant inductor Lr2 and the primary winding Tr12 are connected in series.

Figure 16B:
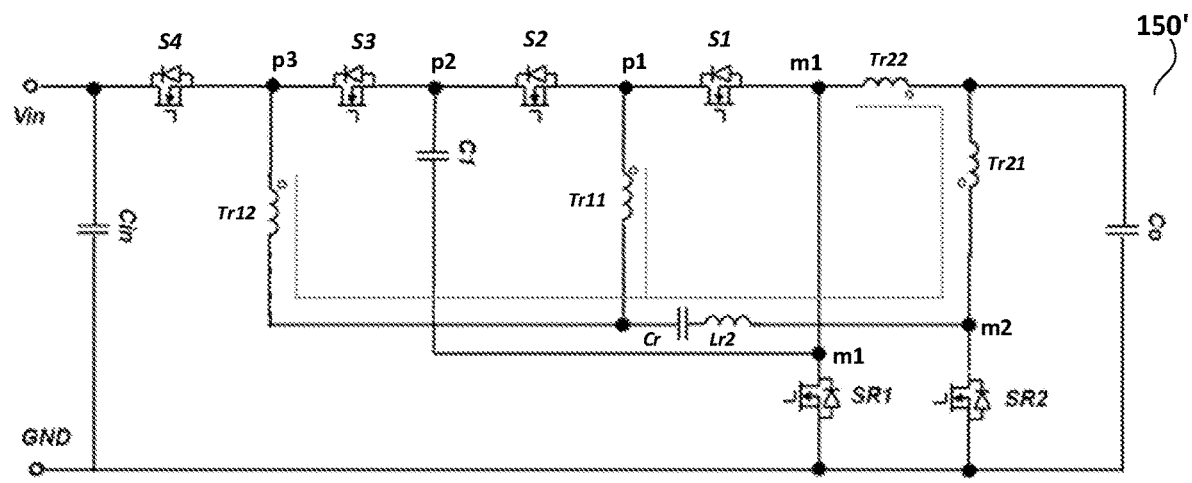

A circuit 150' in FIG. 16B is a further modification of the circuit 120 of FIG. 13A. As compared to the case where the resonant units 123 and 124 share one primary winding Tr1 in the circuit 120 of FIG. 13A, it is also possible that two primary windings Tr11 and Tr12 share one resonant unit, as shown in FIG. 16B. In the circuit 150', the transformer has two primary windings Tr11 and Tr12. One end of the primary winding Tr11 is connected to a connection node p1, one end of the primary winding Tr12 is connected together to a connection node p3, the other end of the primary windings Tr11 and Tr12 is connected together to one end of a resonant unit including the resonant capacitor Cr and the resonant inductor Lr, and the other end of the resonant unit is connected to a midpoint m2 of the second branch.

In the circuits of FIGS. 16A and 16B, leakage inductance of the transformer also can function as a part or whole of the resonant inductors of the resonant units, thereby reducing elements of the circuits.

Figure 17:
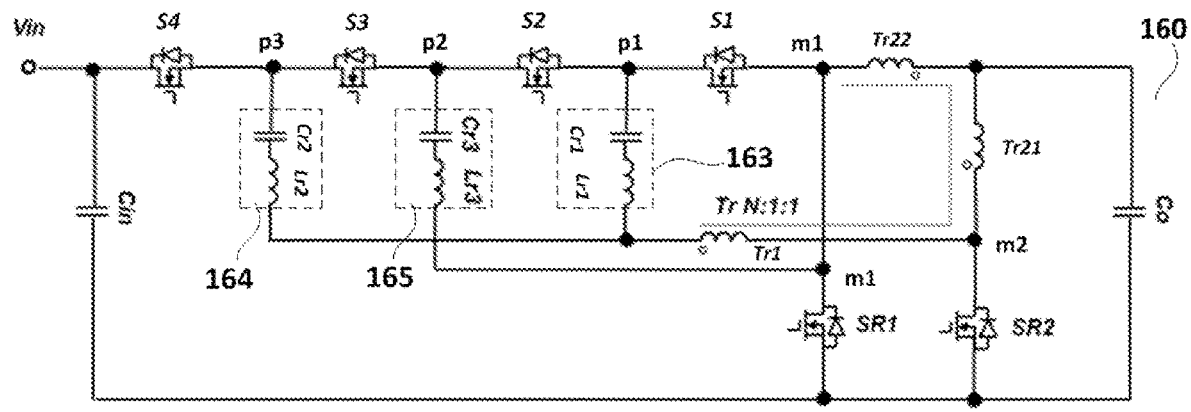
FIG. 17 illustrates a modification of the circuit of FIG. 13A.

A circuit 160 in FIG. 17 is a further modification of the circuit 120 of FIG. 13A. In the circuit 160, when the resonant capacitor Cr1 and the resonant inductor Lr1 in a resonant unit 163 and the resonant capacitor Cr2 and the resonant inductor Lr2 in a resonant unit 164 have the same parameters, a resonant capacitor Cr3 and a resonant inductor Lr3 having the same parameters as the resonant units 163 and 164 can replace the original single blocking capacitor connected to a connection node p2 between the switches S2 and S3, thereby forming a resonant unit 165. The resonant capacitor Cr3 functions as the blocking capacitor, and also participates together with the resonant inductor Lr3 in circuit resonance.

Figure 18:
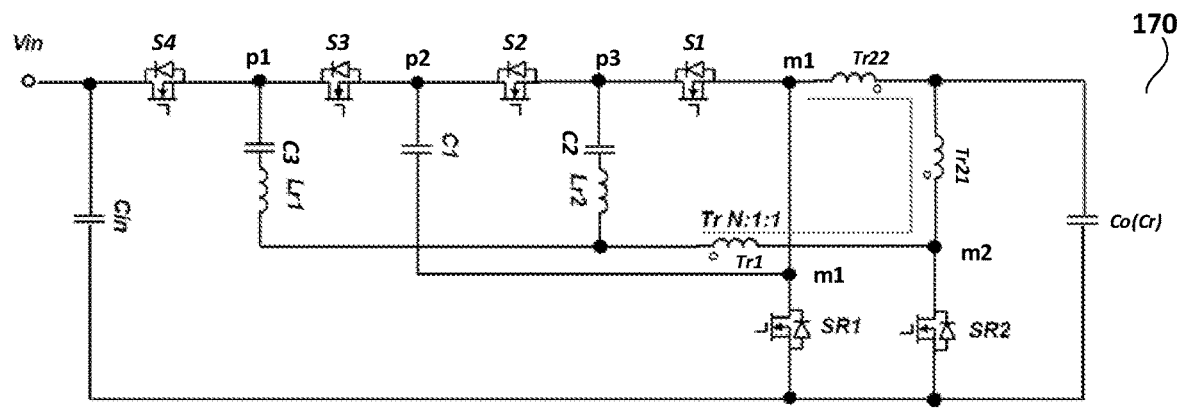
FIG. 18 illustrates a modification of the circuit of FIG. 13A.

A circuit 170 in FIG. 18 is a further modification of the circuit 120 of FIG. 13A. In the circuit 170, an output capacitor Co connected in parallel to the first branch and the second branch of the full-bridge rectifier circuit in the circuit 170 can function as a resonant capacitor Cr shared by the two resonant units. At this time, the resonant unit connected between the connection node of the switch branch and a midpoint m2 of the first branch can only include resonant inductors. In the circuit 170, the resonant capacitor Cr is shared by the resonant inductors Lr1 and Lr2, the resonant capacitor Cr and the resonant inductor Lr1 resonate as one resonant unit, and the resonant capacitor Cr and the resonant inductor Lr2 resonate as another resonant unit. The circuit 170 simplifies circuit configuration. Although the resonant inductor Lr2 is connected in series with a capacitor C2, and the resonant inductor Lr1 is connected in series with a capacitor C3 in the circuit 170, the capacitors C2 and C3 mainly function as blocking capacitors, and the capacitors C2 and C3 can be omitted.

Figure 19:
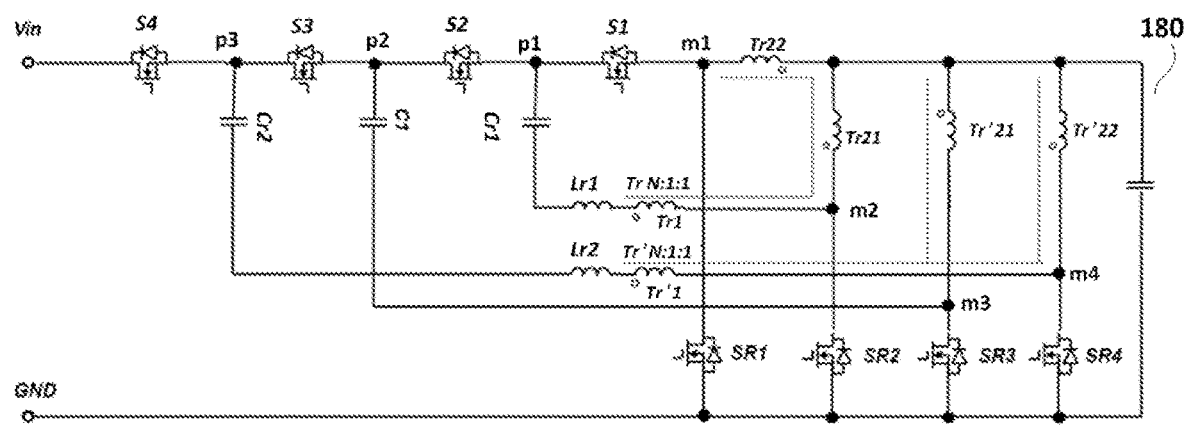
FIG. 19 illustrates a modification of the circuit of FIG. 13A.

The transformer in the circuit also may be further divided into two individual transformers. A circuit 180 in FIG. 19 is a further modification of the circuit 120 of FIG. 13A. In the circuit 180, the full-wave rectifier circuit may further include a third branch and a fourth branch connected in parallel to the first branch and the second branch. The third branch includes a switch SR3 and a secondary winding Tr'21 of a transformer Tr' connected in series to form a connection node, which is a third midpoint m3. The fourth branch includes a switch SR4 and a secondary winding Tr'22 of a transformer Tr' connected in series to form a connection node, which is a fourth midpoint m4.

One end of the resonant unit including the resonant capacitor Cr1 and the resonant inductor Lr1 is connected to a connection node p1 of the switches S1 and S2. One end of another resonant unit including the resonant capacitor Cr2 and the resonant inductor Lr2 is connected to a connection node p3 of the switches S3 and S4. The primary winding Tr1 of the transformer Tr has one end connected to a second midpoint m2, and the other end connected to the resonant unit including the resonant capacitor Cr1 and the resonant inductor Lr1. A turn ratio of the primary winding Tr1, the secondary winding Tr21 and the secondary winding Tr22 of the transformer Tr is N:1:1. A primary winding Tr'1 of the transformer Tr' has one end connected to the fourth midpoint m4, and the other end connected to the resonant unit including the resonant capacitor Cr2 and the resonant inductor Lr2. A turn ratio of the primary winding Tr'1, the secondary winding Tr'21 and the secondary winding Tr'22 of the transformer Tr' is N:1:1. In some embodiments, positions of the resonant unit including the resonant capacitor Cr1 and the resonant inductor Lr1 and the primary winding Tr1 are exchangeable, only if the resonant unit including the resonant capacitor Cr1 and the resonant inductor Lr1 and the primary winding Tr1 are connected in series. Similarly, positions of the resonant unit including the resonant capacitor Cr2 and the resonant inductor Lr2 and the primary winding Tr'1 are exchangeable, only if the resonant unit including the resonant capacitor Cr2 and the resonant inductor Lr2 and the primary winding Tr'1 are connected in series.

The blocking capacitor C1 has one end connected to a connection node p2 of the switches S2 and S3, and the other end connected to the third midpoint m3.

The benefit of the circuit 180 can reduce current stresses of the single transformer and the single rectifier, or increase through-current capability of the transformer and the switch SR when using the same elements, thereby increasing an output power of the converter.

Figure 20A:
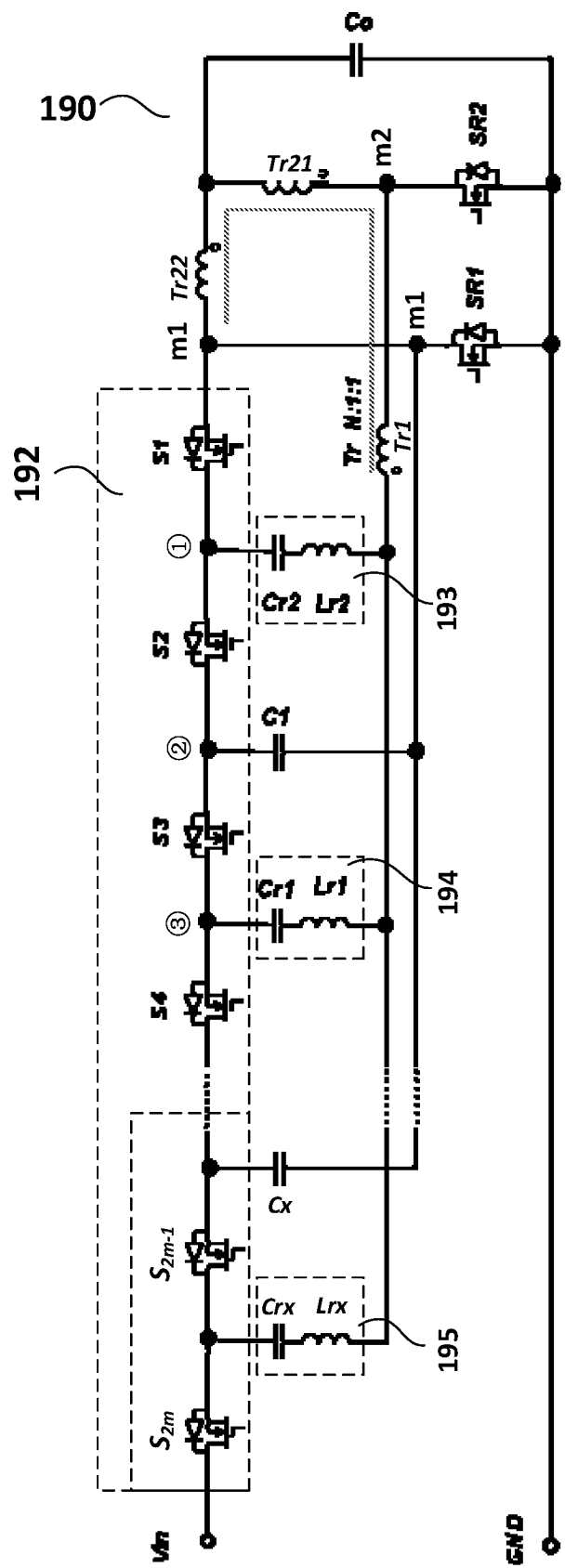
FIGS. 20A and 20B illustrate a modification of the circuit of FIG. 13A.

The conversion circuit of the invention can be further expanded to change the voltage conversion ratio. FIG. 20A illustrates an expansion form of the conversion circuit 120 of FIG. 13A. As compared to the circuit 120 in FIG. 13A, a switch branch 192 in the circuit 190 in FIG. 20A includes the original four switches S1-S4, and is further expanded with (2m−4) switches (S5, S6, ... $S_{2m-1}$ and $S_{2m}$). The expanded (2m−4) switches (S5, S6, ... $S_{2m-1}$ and $S_{2m}$) are connected in series with the original four switches S1-S4, such that the switch branch 192 includes 2m switches connected in series, where m is an integer, and m≥3.

The circuit 190 further includes (m−2) blocking capacitors Cx and (m−2) resonant units 195. Therefore, in the circuit 190, the (m−2) Cx and the blocking capacitor C1 together form (m−1) blocking capacitors, and (m−2) resonant units 195 and resonant units 193, 194 together form m resonant units. The resonant units 195 each includes a resonant capacitor Crx and a resonant inductor Lrx.

Therefore, the conversion circuit like the circuit 190 of FIG. 20A can be described as follows: the switch branch 192 has 2m switches connected in series, where m is an integer, and m≥3. Adjacent two switches of the 2m switches are connected to form connection nodes, so the switch branch 192 has (2m−1) connection nodes.

A connection node close to the output terminal of the circuit 190 is referred as the first connection node, so the switch branch 192 has the first, second, third, ..., (2m−2)th, and (2m−1)th connection nodes from the output terminal to the input terminal. For example, as shown in FIG. 20A, the connection node between the switches S1 and S2 is closest to the output terminal, so the connection node between the switches S1 and S2 is the first connection node (sign "①" in FIG. 20A), the connection node between the switches S2 and S3 is the second connection node (sign "②" in FIG. 20A), the connection node between the switches S3 and S4 is the third connection node (sign "③" in FIG. 20A), and so on. The connection node between the switches $S_{2m-1}$ and $S_{2m}$ is the (2m−1)th connection node.

Each of the m resonant units (i.e., the resonant units 193, 194 and the (m−2) resonant units 195) is connected between the odd-numbered connection node and the primary winding Tr1, and each of the (m−1) blocking capacitors (i.e., the blocking capacitor C1 and the (m−2) blocking capacitors Cx) is connected between the even-numbered connection node and the first midpoint m1.

Of the m resonant units, one end of the x-th resonant unit is connected to the connection node between the (2x−1)th switch and the 2x-th switch of the 2m switches, where m and x are integers, m≥3, and 1≤x≤m. For example, when x=1, as for the first (i.e., x) resonant unit (the resonant unit 193 in FIG. 20A) of the m resonant units, one end is connected to the connection node between the first (i.e., 2x−1) switch (the switch S1 in FIG. 20A) and the second (i.e., 2x) switch (the switch S2 in FIG. 20A), and the other end is connected to the primary winding Tr1 of the transformer. For another example, when x=2, as for the second (i.e., x) resonant unit (the resonant unit 194 in FIG. 20A) of the m resonant units, one end is connected to the connection node between the third (i.e., 2x−1) switch (the switch S3 in FIG. 20A) and the fourth (i.e., 2x) switch (the switch S4 in FIG. 20A), and the other end is connected to the primary winding Tr1 of the transformer.

Of the (m−1) blocking capacitors Cx, one end of the k-th blocking capacitor is connected to the connection node between the 2k-th switch and the (2k+1)th switch of the 2m switches, and the other end is connected to the first midpoint m1, where m and k are integers, m≥3, and 1≤k≤m−1. For example, when k=1, one end of the first (i.e., k) blocking capacitor (the blocking capacitor C1 in FIG. 20A) is connected to the connection node between the second (i.e., 2k) switch (the switch S2 in FIG. 20A) and the third (i.e., 2k+1) switch (the switch S3 in FIG. 20A), and the other end is connected to the first midpoint m1. For another example, when k=(m−1), one end of the (m−1)th (i.e., k) blocking capacitor is connected to the connection node between the (2m−2)th (i.e., 2k) switch (the previous switch adjacent to the switch $S_{2m-1}$ in FIG. 20A, not shown) and the (2m−1)th (i.e., 2k+1) switch (the switch $S_{2m-1}$ in FIG. 20A), and the other end is connected to the first midpoint m1.

Therefore, as for the circuit 190 of FIG. 20A, when a turn ratio of the primary winding Tr1, the secondary winding Tr21 and the secondary winding Tr22 of the transformer is N:1:1, a conversion ratio of the circuit 190 is (mN+2m):1, thereby expanding the conversion ratio of the conversion circuit.

Referring to FIG. 17, when resonance parameters of the respective resonant units in the conversion circuit are the same, the blocking capacitors can be replaced by the resonant units having the same resonance parameters.

Although the circuit 190 of FIG. 20A illustrates the case where the m resonant units are all connected in series with the single primary winding Tr1, as is described in FIG. 16A, the primary winding Tr1 also may be formed of a plurality of sub-windings, and each sub-winding is connected in series with the corresponding resonant unit of the m resonant units, respectively.

Figure 20B:
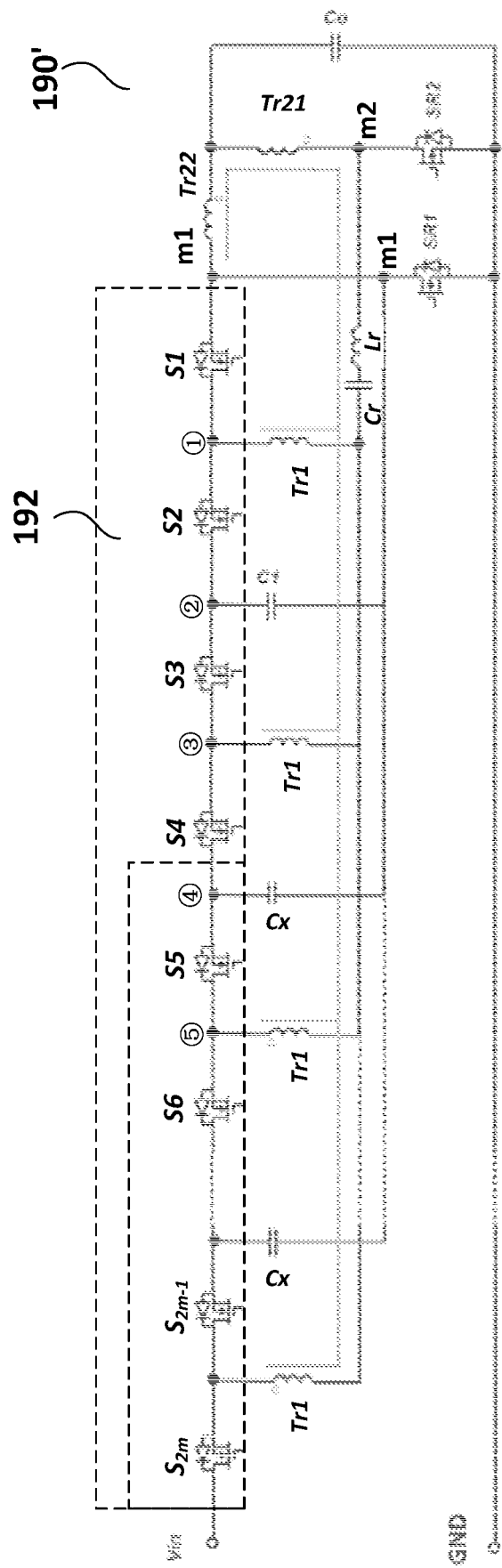

Similarly with those described in FIG. 16B, as compared to the case where the m resonant units in FIG. 20A is connected together in series with the common primary winding Tr1, the case where a plurality of primary windings share one resonant unit is also possible, as shown by a circuit 190' of FIG. 20B.

In the circuit 190', the switch branch 192 includes the original two switches S1 and S2, and is further expanded with (2m−2) switches (S3, S4, . . . $S_{2m-1}$ and $S_{2m}$). The expanded (2m−2) switches (S3, S4, . . . $S_{2m-1}$ and $S_{2m}$) are connected in series with the original two switches S1 and S2, such that the switch branch 192 includes 2m switches, i.e., even-numbered switches, connected in series, where m is an integer, and m≥2. The circuit 190' further includes (m−1) blocking capacitors Cx and m primary windings Tr1. The m primary windings Tr1 are all connected in series with a resonant unit including the resonant inductor Lr and the resonant capacitor Cr.

In the circuit 190', adjacent two switches of the 2m switches of the switch branch 192 are connected to form connection nodes, so the switch branch 192 has (2m−1) connection nodes. A connection node close to the output terminal of the circuit 190' is referred as the first connection node, so the switch branch 192 has the first, second, third . . . , (2m−2)th, and (2m−1)th connection nodes from the output voltage terminal to the input terminal. For example, as shown in FIG. 20B, the connection node between the switches S1 and S2 is closest to the output terminal, so the connection node between the switches S1 and S2 is the first connection node (sign "①" in FIG. 20B), the connection node between the switch S2 and the next switch S3 adjacent to the switch S2 is the second connection node (sign "②" in FIG. 20B), and so on. The connection node between the switches $S_{2m-1}$ and $S_{2m}$ is the (2m−1)th connection node.

Each of the m primary windings Tr1 is connected between the odd-numbered connection node and the resonant unit including the resonant inductor Lr and the resonant capacitor Cr, and each of the (m−1) blocking capacitors Cx is connected between the even-numbered connection node and a midpoint m1 of the first branch.

Of the m primary windings Tr1, one end of the x-th primary winding is connected to the connection node between the (2x−1)th switch and the 2x-th switch of the 2m switches, where x is an integer, and 1≤x≤m.

Of the (m−1) blocking capacitors Cx, one end of the k-th blocking capacitor is connected to the connection node between the 2k-th switch and the (2k+1)th switch of the 2m switches, and the other end is connected to the midpoint m1 of the first branch, where k is an integer, and 1≤k≤m−1.

Figure 21A:
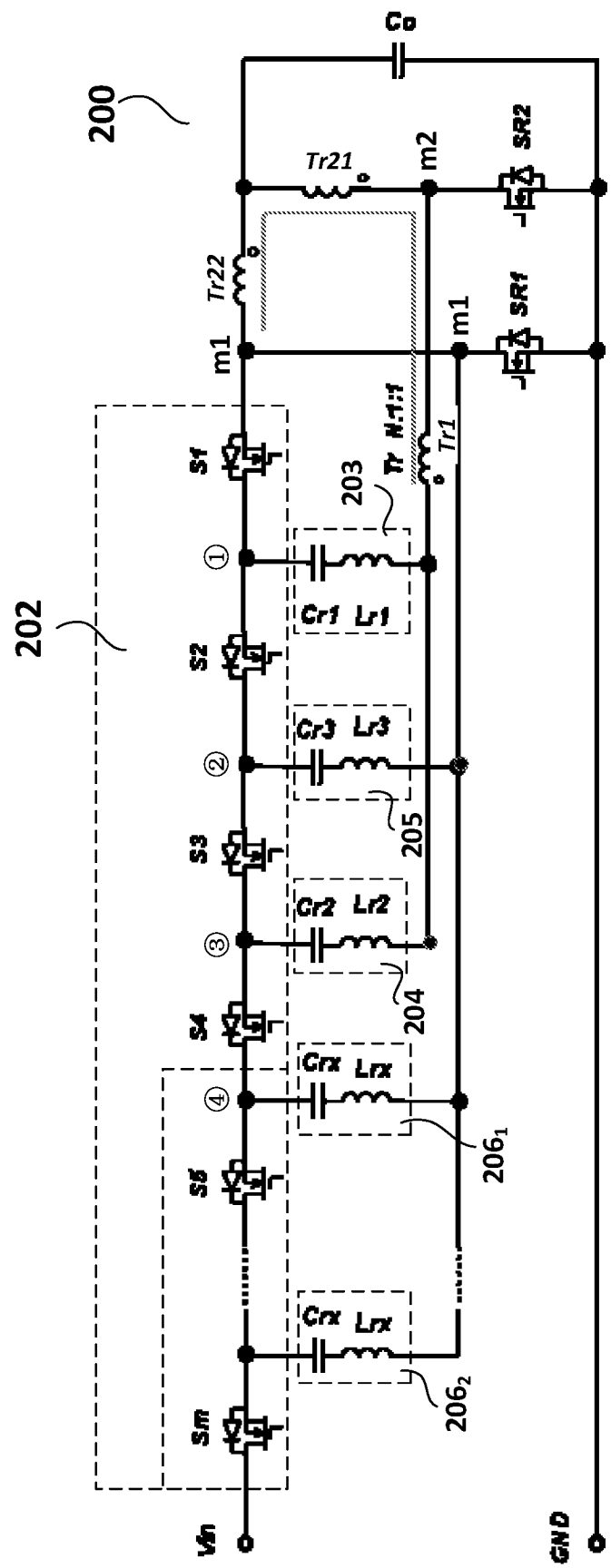
FIGS. 21A-21D illustrate a modification of the circuit of FIG. 13A.

FIG. 21A illustrates another expansion form of the conversion circuit of the invention. A circuit 200 of FIG. 21A is an expansion of the circuit 160 of FIG. 17. A switch branch 202 of the circuit 200 of FIG. 21A includes the original four switches S1-S4, and is further expanded with (m−4) switches (S5, . . . , $S_m$). The expanded (m−4) switches (S5, . . . , $S_m$) are connected in series with the original four switches S1-S4, such that the switch branch 202 includes m switches, where m is an integer, and m≥5. The circuit 200 further includes (m−4) additional resonant units 206. The (m−4) additional resonant units 206 and resonant units 203-205 together form (m−1) resonant units. The (m−4) additional resonant units 206 include resonant capacitors Crx and additional resonant inductors Lrx. The respective resonant units in the circuit 200 have the same resonance parameters.

Specifically, the conversion circuit like the circuit 200 of FIG. 21A can be described as follows: the switch branch 202 has m switches connected in series, where m is an integer, and m≥5. Adjacent two switches of the m switches are connected to form connection nodes, so the switch branch 202 has (m−1) connection nodes. A connection node close to the output terminal of the circuit 200 is referred as the first connection node, so the switch branch 202 has the first, second, third, . . . , and (m−1)th connection nodes from the output terminal to the input terminal. For example, as shown in FIG. 21A, the connection node between the switches S1 and S2 is closest to the output terminal, so the connection node between the switches S1 and S2 is the first connection node (sign "①" in FIG. 21A), the connection node between the switches S2 and S3 is the second connection node (sign "②" in FIG. 21A), the connection node between the switches S3 and S4 is the third connection node (sign "③" in FIG. 21A), the connection node between the switches S4 and S5 is the fourth connection node (sign "④" in FIG. 21A), and so on. The connection node between the switch $S_m$ and one switch before the switch $S_m$ (not shown) is the (m−1)th connection node.

The (m−1) resonant units (203-206) in the circuit 200 have one end connected to the corresponding connection node, and the other end connected to the primary winding Tr1 or the first midpoint m1. As for the resonant unit having one end connected to the odd-numbered connection node, the other end is connected to the primary winding Tr1 of the transformer. As for the resonant unit having one end connected to the even-numbered connection node, the other end is connected to the first midpoint m1.

Of the (m−1) resonant units, one end of the (2y−1)th resonant unit is connected to the connection node between the (2y−1)th switch and the 2y-th switch of the m switches, and the other end is connected to the primary winding Tr1 of the transformer, where y is an integer, and 1≤y≤m/2. For example, when y=1, of the (m−1) resonant units, one end of the first (i.e., 2y−1) resonant unit (the resonant unit 203 in FIG. 21A) is connected to the connection node between the first (i.e., 2y−1) switch (the switch S1 in FIG. 21A) and the second (i.e., 2y) switch (the switch S2 in FIG. 21A), and the other end is connected to the primary winding Tr1 of the transformer. For another example, when y=2, of the (m−1) resonant units, one end of the third (i.e., 2y−1) resonant unit (the resonant unit 204 in FIG. 21A) is connected to the connection node between the third (i.e., 2y−1) switch (the switch S3 in FIG. 21A) and the fourth (i.e., 2y) switch (the switch S4 in FIG. 21A), and the other end is connected to the primary winding Tr1 of the transformer.

Further, of the (m−1) resonant units, one end of the 2y-th resonant unit is connected to the connection node between the 2y-th switch and the (2y+1)th switch of the m switches, and the other end is connected to the first midpoint m1. For example, when y=1, of the (m−1) resonant units, one end of the second (i.e., 2y) resonant unit (the resonant unit 205 in FIG. 21A) is connected to the connection node between the second (i.e., 2y) switch (the switch S2 in FIG. 21A) and the third (i.e., 2y+1) switch (the switch S3 in FIG. 21A), and the other end is connected to the first midpoint m1. For another example, when y=2, of the (m−1) resonant units, one end of the fourth (i.e., 2y) resonant unit (the resonant unit $206_1$ in FIG. 21A) is connected to the connection node between the fourth (i.e., 2y) switch (the switch S4 in FIG. 21A) and the fifth (i.e., 2y+1) switch (the switch S5 in FIG. 21A), and the other end is connected to the first midpoint m1.

In the circuit 200 of FIG. 21A, a turn ratio of the primary winding Tr1, the secondary winding Tr21 and the secondary winding Tr22 of the transformer is N:1:1. When m is an odd number, the conversion ratio of the circuit 200 is ((m−1)N+2m):1, and when m is an even number, the conversion ratio of the circuit 200 is (mN+2m):1, where N is a turn ratio of the transformer Tr, thereby expanding the conversion ratio of the conversion circuit.

Although FIG. 21A illustrate the case where the resonant units connected to the odd-numbered connection nodes of the (m−1) resonant units are all connected in series with the single primary winding Tr1, as is described in FIG. 16A, the primary winding Tr1 also may be formed of a plurality of sub-windings, and each sub-winding is connected in series with the corresponding resonant unit connected to the odd-numbered connection node of the (m−1) resonant units, respectively.

Figure 21B:
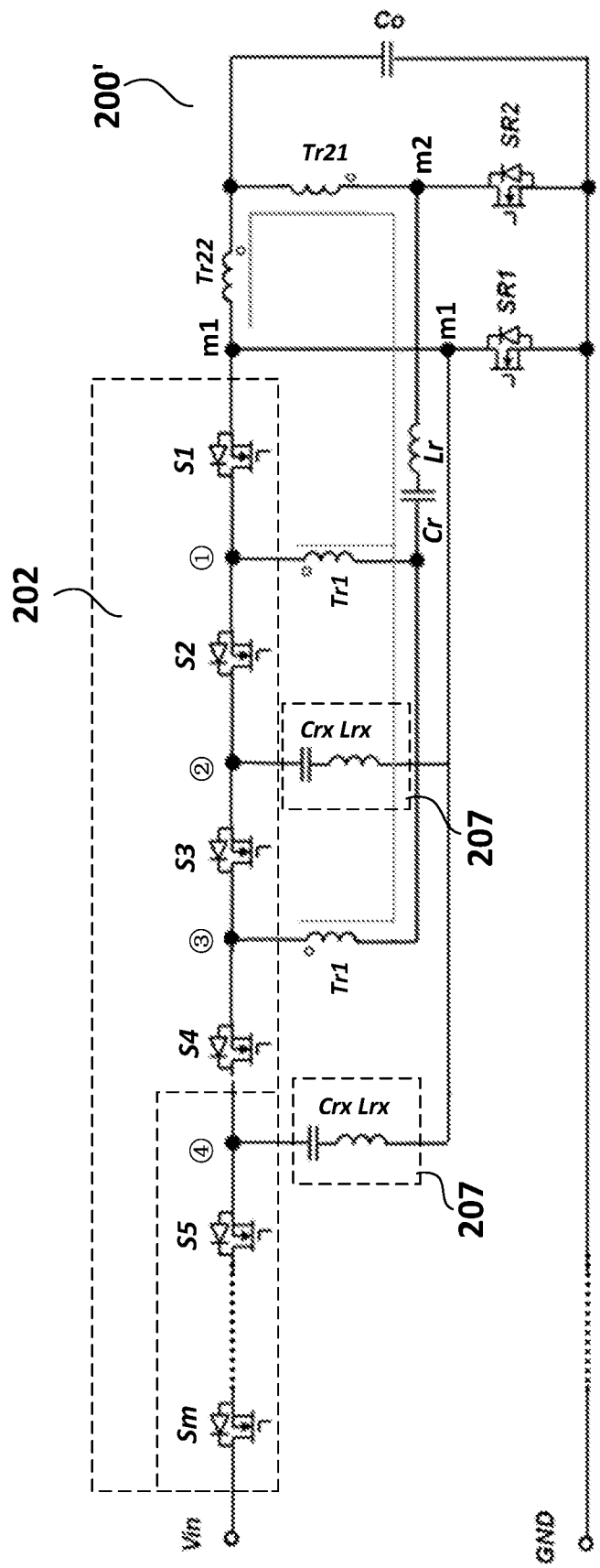

Similarly with those described in FIG. 16B, as compared to the case where the plurality of resonant units in FIG. 21A are connected together in series with the common primary winding Tr1, the case where a plurality of primary windings share one resonant unit is also possible, as shown by a circuit 200' of FIG. 21B.

The switch branch 202 of the circuit 200' includes the original two switches S1 and S2, and is further expanded with (m−2) switches (S3, ..., and $S_m$). The expanded (m−2) switches (S3, ..., and $S_m$) are connected in series with the original two switches S1 and S2, such that the switch branch 202 includes m switches connected in series, where m is an integer, and m≥5. The circuit 200' further includes a plurality of resonant units 207 and a plurality of primary windings Tr1. Each of the plurality of resonant units 207 includes a resonant capacitor Crx and a resonant inductor Lrx. Each of the plurality of resonant units 207 has the same resonance parameter.

In the circuit 200', the switch branch 202 has m switches connected in series, wherein m is an integer, and m≥5. Adjacent two switches of the m switches are connected to form connection nodes, so the switch branch 202 has (m−1) connection nodes. A connection node close to the output terminal of the circuit 200' is referred as the first connection node, so the switch branch 202 has the first, second, third ..., and (m−1)th connection nodes from the output terminal to the input terminal. For example, as shown in FIG. 21B, the connection node between the switches S1 and S2 is closest to the output terminal, so the connection node between the switches S1 and S2 is the first connection node (sign "①" in FIG. 21B), the connection node between the switches S2 and S3 is the second connection node (sign "②" in FIG. 21B), the connection node between the switches S3 and S4 is the third connection node (sign "③" in FIG. 21B), and so on. The connection node between the switch $S_m$ and one switch before the switch $S_m$ is the (m−1)th connection node.

Each of the plurality of primary windings Tr1 in the circuit 200' has one end connected to an odd-numbered connection node, and the other end connected to a resonant unit including the resonant capacitor Cr and the resonant inductor Lr. Each of the plurality of resonant units 207 in the circuit 200' has one end connected to an even-numbered connection node, and the other end connected to a midpoint m1 of the first branch of the full-bridge rectifier circuit.

Each of the plurality of primary windings Tr1 has one end connected to the connection node between the (2y−1)th switch and the 2y-th switch of the m switches, and the other end connected to the resonant unit including the resonant capacitor Cr and the resonant inductor Lr, where y is an integer, and 1≤y≤m/2.

Each of the plurality of resonant units 207 has one end connected to the connection node between the 2z-th switch and the (2z+1)th switch of the m switches, and the other end connected to the midpoint m1 of the first branch of the full-bridge rectifier circuit, where z is an integer, and 1≤z≤(m−1)/2.

Figure 21C:
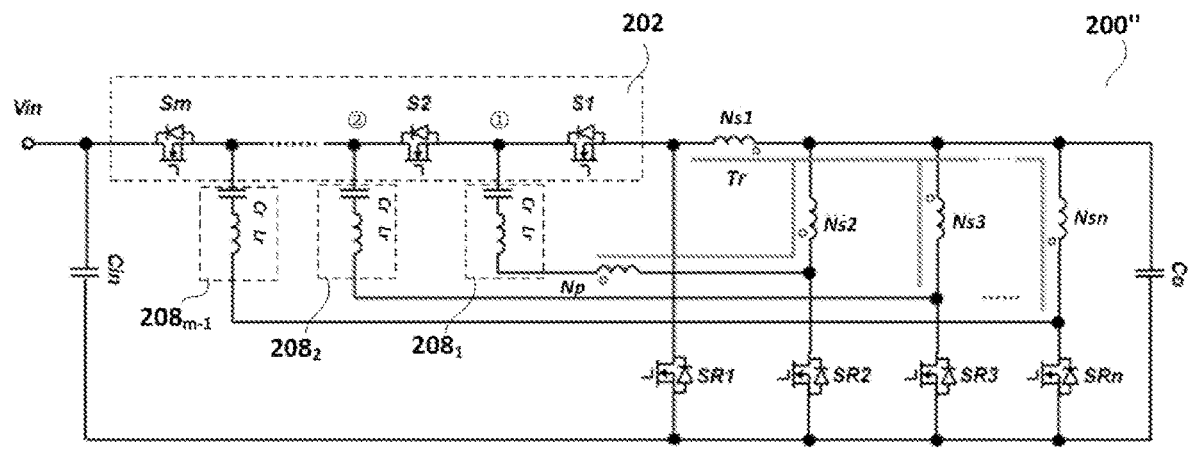

A circuit 200" in FIG. 21C illustrates another expansion form of the conversion circuit of the invention. The switch branch 202 of the circuit 200" in FIG. 21C includes m switches, where m is an integer, and m≥3. The circuit 200" further includes (m−1) conversion branches 208 ($208_1$, $208_2$, ..., and $208_{m-1}$), and for example, each conversion branch 208 can be a resonant unit including the resonant capacitor Cr and the resonant inductor Lr. In addition, the full-wave rectifier circuit of the circuit 200" includes n branches. For example, the full-wave rectifier circuit in FIG. 21C includes a first branch including a switch SR1 and a secondary winding $N_{s1}$ of the transformer Tr, a second branch including a switch SR2 and a secondary winding $N_{s2}$ of the transformer Tr, a third branch including a switch SR3 and a secondary winding $N_{s3}$ of the transformer Tr, and a n-th branch including a switch SRn and a secondary winding $N_{sn}$ of the transformer Tr. The switch and the secondary winding in each of the n branches are connected in series to form a midpoint of the corresponding branch. In this embodiment, the number n of branches of the full-wave rectifier circuit is no more than the number m of switches in the switch branch 202, and the number n of branches is at least 2, i.e., in addition to satisfy m≥3, m≥n≥2 also shall be satisfied.

The n branches of the full-wave rectifier circuit include at least one first type branch and at least one second type branch. Dotted terminals of the secondary windings of the first type branches are connected, and undotted terminals of the secondary windings of the first type branches and the secondary windings of the second type branches are connected. For example, as shown in FIG. 21C, the first branch including the switch SR1 and the secondary winding $N_{s1}$ of the transformer Tr and the third branch including the switch SR3 and the secondary winding $N_{s3}$ of the transformer Tr are first type branches, and the second branch including the switch SR2 and the secondary winding $N_{s2}$ of the transformer Tr and the n-th branch including the switch SRn and the secondary winding $N_{sn}$ of the transformer Tr are the second type branches. Additionally, in the n branches of the full-wave rectifier circuit, the switches in the first type branches are turned on and turned off simultaneously, and the switches in the first type branches and the switches in the second type branches are complementarily turned on.

The switch branch 202 of the circuit 200" in FIG. 21C has m switches connected in series, where m is an integer, and m≥3. Adjacent two switches of the m switches are connected to form connection nodes, so the switch branch 202 has (m−1) connection nodes. A connection node close to the output terminal of the circuit 200" is referred as the first connection node, so the switch branch 202 has the first, second, third ..., and (m−1)th connection nodes from the output terminal to the input terminal. For example, as shown in FIG. 21C, the connection node between the switches S1 and S2 is closest to the output terminal, so the connection node between the switches S1 and S2 is the first connection node (sign "①" in FIG. 21C), the connection node between the switch S2 and the next switch (not shown) adjacent to the switch S2 is the second connection node (sign "②" in FIG. 21C), and so on. The connection node between the switch S. and one switch (not shown) before the switch $S_m$ is the (m−1)th connection node.

Of the (m−1) conversion branches 208 of the circuit 200", as for the conversion branch having one end connected to an odd-numbered connection node of the switch branch 202, the conversion branch is connected between the odd-numbered connection node of the switch branch 202 and a midpoint of one of the second class of the n branches, and as for the conversion branch having one end connected to an even-numbered connection node of the switch branch 202, the conversion branch is connected between the even-numbered connection node of the switch branch 202 and a midpoint of one of the first class of the n branches.

Of the (m−1) conversion branches 208, the (2y−1)th conversion branch has one end connected to the connection node between the (2y−1)th switch and the 2y-th switch of the m switches, and the other end connected to the midpoint of one of the second class of then branches, where y is an integer, and 1≤y≤m/2. For example, when y=1, of the (m−1) conversion branches 208, the first (i.e., 2y−1) conversion branch (the conversion branch $208_1$ in FIG. 21C) has one end connected to the connection node between the first (i.e., 2y−1) switch (the switch S1 in FIG. 21C) and the second (i.e., 2y) switch (the switch S2 in FIG. 21C), and the other end connected to the midpoint of one of the second class of the n branches, for example, the midpoint of the second branch.

Further, of the (m−1) conversion branches, the 2z-th conversion branch has one end connected to the connection node between the 2z-th switch and the (2z+1)th switch of the m switches, and the other end connected to the midpoint of one of the first class of the n branches, where z is an integer, and 1≤z≤(m−1)/2. For example, when z=1, of the (m−1) conversion branches, the second (i.e., 2z) conversion branch (the conversion branch $208_2$ in FIG. 21C) has one end connected to the connection node between the second (i.e., 2z) switch (the switch S2 in FIG. 21C) and the third (i.e., 2z+1) switch (the switch S3 in FIG. 21C), and the other end connected to the midpoint of one of the first class of the n branches, for example, a midpoint of the third branch.

In addition, the circuit 200″ further includes a primary winding Np of the transformer Tr, and the primary winding Np is connected in series with one of the (m−1) conversion branches. For example, FIG. 21C illustrates that the primary winding Np and the conversion branch $208_1$ are connected in series, but the invention is not limited thereto. The primary winding Np also can be connected in series with any of the conversion branches $208_2, \ldots,$ and $208_{m-1}$ The circuit of FIG. 21C may realize a voltage conversion ratio of Vin/Vo=2(Np+m).

Figure 21D:
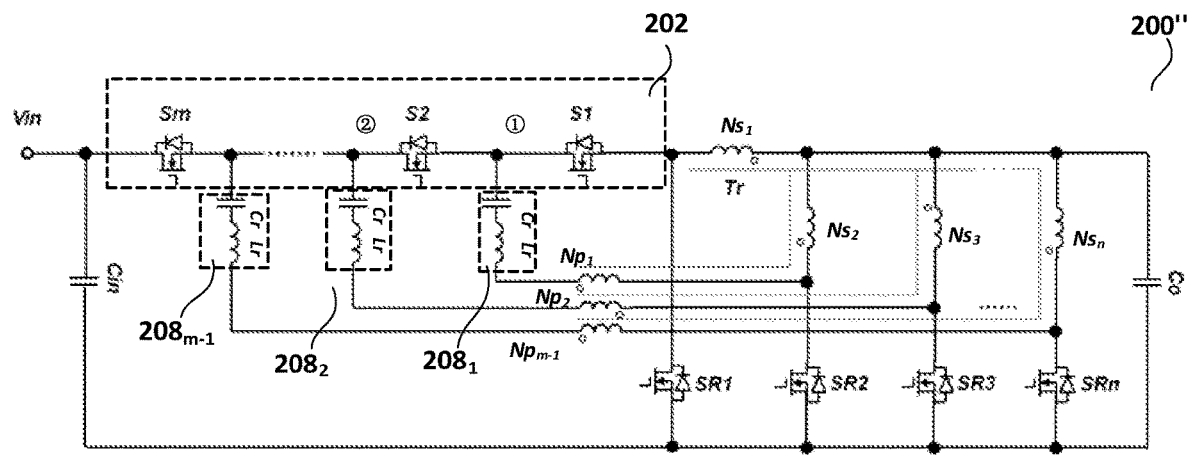

Although FIG. 21C illustrates one primary winding Np connected in series with any of the (m−1) conversion branches, the invention is not limited thereto, and also may include a plurality of primary windings Np connected in series with multiple of the (m−1) conversion branches. For example, as shown in FIG. 21D, the circuit 200″ may include (m−1) primary windings Np ($Np_1, Np_2, \ldots,$ and $Np_{m-1}$) having the same number as the (m−1) conversion branches, and each of the (m−1) primary windings Np is connected in series with the corresponding conversion branch of the (m−1) conversion branches. When a turn ratio of the primary windings Np in FIG. 21D is 1:1: . . . :1, a voltage conversion ratio of Vin/Vo=2($N_1+N_2+\ldots+N_{m-1}$+m) can be realized, wherein $N_1, N_2, \ldots,$ and $N_{m-1}$ are the number of turns of the primary windings $Np_1, Np_2, \ldots,$ and $Np_{m-1}$, respectively.

Although the plurality of conversion branches 208 in FIGS. 21C and 21D are resonant units, some of the plurality of conversion branches 208 also can be formed of non-resonant unit. For example, the non-resonant unit can be a unit composed of only one capacitor, or composed of a capacitor and an inductance having a resonant frequency much smaller or much larger than the switching frequency of the circuit (less than ⅓ of the switching frequency or greater than 3 times the switching frequency). When the plurality of conversion branches 208 include conversion branches formed of non-resonant unit, the conversion branches adjacent to the conversion branches formed of non-resonant unit shall be all resonant units. In other words, if the i-th conversion branch of the (m−1) conversion branches 208 includes non-resonant unit, the (i−1)th conversion branch and the (i+1)th conversion branch of the (m−1) conversion branches 208 are all resonant units, where m≥4, i≤m−2, and i is an integer.

Figure 22:
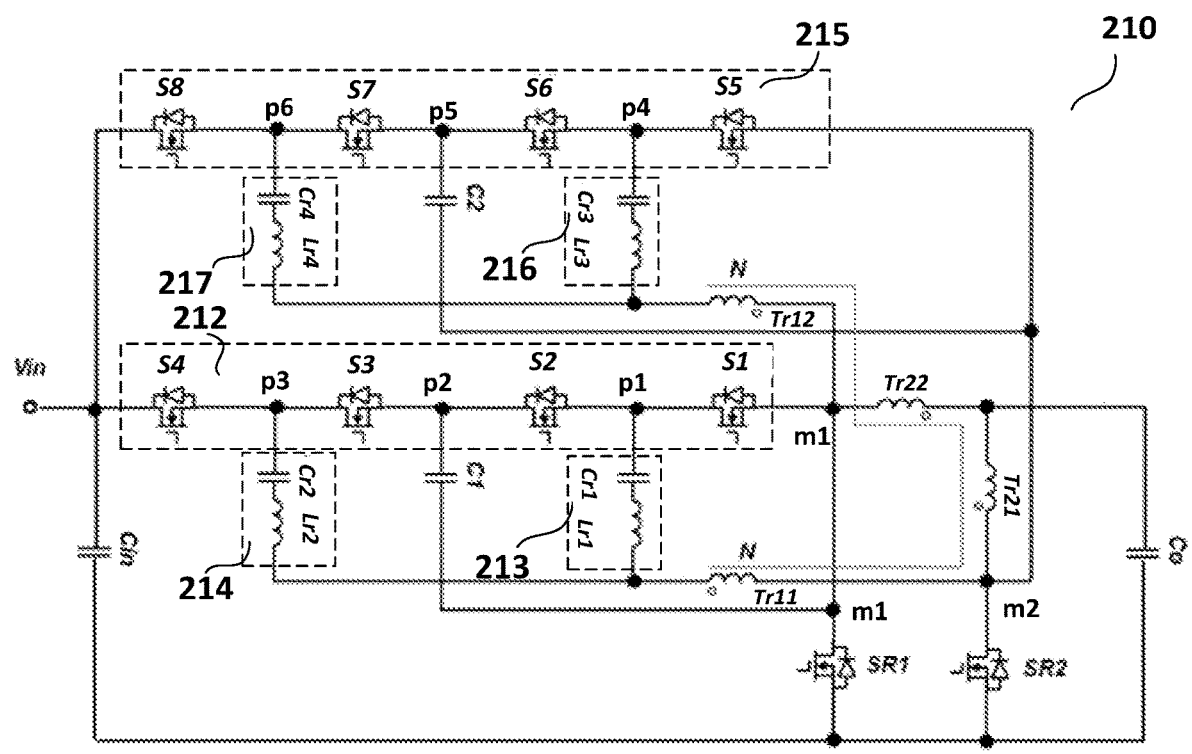
FIG. 22 illustrates a modification of the circuit of FIG. 13A.

FIG. 22 illustrates a modification of the circuit 120 of FIG. 13A. In a circuit 210 of FIG. 22, the full-wave rectifier circuit has a first branch including a switch SR1 and a secondary winding Tr22 of a transformer, and a second branch including a switch SR2 and a secondary winding Tr21 of the transformer. The switch SR1 and the secondary winding Tr22 of the transformer are connected in series to form a first midpoint m1, and the switch SR2 and the secondary winding Tr21 of the transformer are connected in series to form a midpoint m2.

The circuit 210 has two switch branches 212 and 215, the switch branch 212 is connected between the first end of the input voltage and the first midpoint m1, and the switch branch 215 is connected between the first end of the input voltage and the second midpoint m2. The switch branch 212 has four switches S1-S4 connected in series, and the switch branch 215 has four switches S5-S8 connected in series. The circuit 210 has four resonant units 213, 214, 216 and 217, two blocking capacitors C1 and C2, and primary windings Tr11 and Tr12 of the transformer. A turn ratio of the primary winding Tr11, the primary winding Tr12, the secondary winding Tr12 and the secondary winding Tr22 of the transformer is N:N:1:1.

The resonant unit 213 is connected between a connection node p1 of the switches S1, S2 and the primary winding Tr11. The resonant unit 214 is connected between a connection node p3 of the switches S3, S4 and the primary winding Tr11. The resonant unit 216 is connected between a connection node p4 of the switches S5, S6 and the primary winding Tr12. The resonant unit 217 is connected between a connection node p6 of the switches S7, S8 and the primary winding Tr12. The blocking capacitor C1 is connected between a connection node p2 of the switches S2, S3 and the first midpoint m1. The blocking capacitor C2 is connected between a connection node p5 of the switches S6, S7 and the second midpoint m2.

In one operating period of the circuit 210, during the first half period, the switches S4, S2, S7, S5 and SR1 are turned on, while the switches S3, S1, S8, S6 and SR2 are turned off; during the second half period, the switches S4, S2, S7, S5 and SR1 are turned off, while the switches S3, S1, S8, S6 and SR2 are turned on. The circuit 210 also realizes a conversion ratio of (4N+8). As compared to the circuit 120 of FIG. 13A, current stress of the switches S1-S8 of the switch branch in the circuit 210 may be reduced by half, and currents of the switches SR1 and SR2 are more balanced.

Third Embodiment

Figure 23:
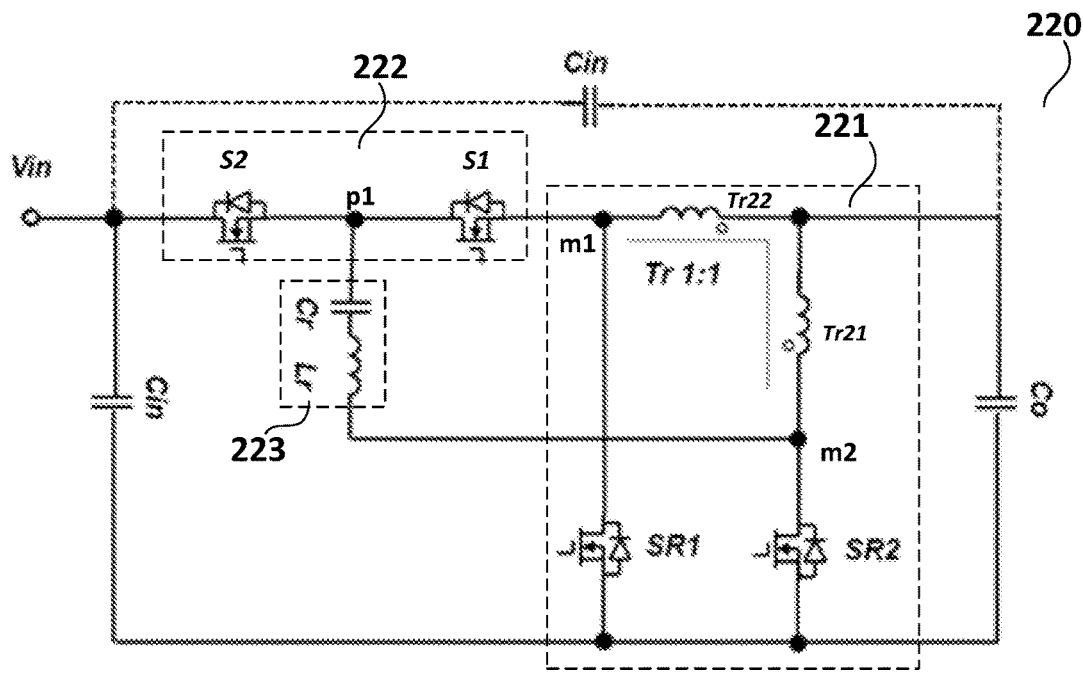
FIG. 23 illustrates an exemplary circuit of a conversion circuit according to a third embodiment of the invention.

FIG. 23 illustrates a circuit example of a conversion circuit 220 according to a third embodiment of the invention.

As shown in FIG. 23, the circuit 220 receives an input voltage Vin, converts the input voltage, and outputs the converted voltage.

The circuit 220 includes a full-wave rectifier circuit 221, a switch branch 222 and a resonant unit 223.

Each of the input voltage and the output voltage has a first end and a second end, and the second end of the input voltage is connected to the second end of the output voltage. The full-wave rectifier circuit 221 has a first branch including a switch SR1 and a first winding Tr22 of a transformer Tr, and a second branch including a switch SR2 and a second winding Tr21 of the transformer Tr. The switch SR1 and the first winding Tr22 of the transformer Tr are connected in series to form a first midpoint m1, and the switch SR2 and the second winding Tr21 of the transformer Tr are connected in series to form a second midpoint m2.

In one example of the circuit 220, the circuit 220 may include an output capacitor Co for filtering, and the output capacitor Co is connected between the first end and the second end of the output voltage, and connected in parallel to the first branch and the second branch of the full-bridge rectifier circuit 221. Additionally, the circuit 220 may further include an input capacitor Cin for filtering, and the input capacitor Cin may be connected between the first end and the second end of the input voltage, or may be connected between the first end of the input voltage and the first end of the output voltage, such as the input capacitor Cin connected by a dashed line in FIG. 23.

The switch branch 222 is connected between the first end of the input voltage and the first midpoint m1, and includes two switches S1 and S2 connected in series to form a connection node p1. The resonant unit 223 is not connected in series to any winding of the transformer Tr.

The resonant unit 223 has a resonant capacitor Cr and a resonant inductor Lr. Although FIG. 23 illustrates a resonant unit including a resonant capacitor and a resonant inductor connected in series, the invention is not limited thereto, and the resonant unit also can be formed of the resonant capacitor and the resonant inductor connected in parallel.

The resonant unit 223 has one end connected to the connection node p1, and the other end connected to the second midpoint m2. The resonant unit is not connected in series to any winding of the transformer A turn ratio of the first winding Tr22 and the second winding Tr21 of the transformer Tr is 1:1. In one operating period of the circuit 220, the switches S2, SR1 and the switches S1, SR2 are complementarily turned on, and thus a duty cycle is approximately 0.5. In the first half of operating period, the switches S2, SR1 are turned on, while the switches S1, SR2 are turned off. At this time, current supplies energy to the output terminal through a first resonant path formed of the switch S2, the resonant capacitor Cr, the resonant inductor Lr and the second winding Tr21, and a resonant frequency is $fr=1/(2\pi \times \sqrt{Lr_1 \times Cr_1})$. Meanwhile, the first winding Tr22 of the transformer induces a resonant current of the second winding Tr21, and supplies energy to the output terminal through a second path formed of the switch SR1 and the first winding Tr22. In a duration where the first half period is converted to the second half period, parasitic capacitance of the switches S2 and SR1 are charged by excitation induced current, and parasitic capacitance of the switches S1 and SR2 are discharged, thereby realizing soft switching of the device. In the duration of the second half of operating period, the switches S1 and SR2 are turned on, while the switches S2 and SR1 are turned off. Similarly with the first half period, current flows to the output terminal through a resonant path formed of the switch SR2, the resonant inductor Lr, the resonant capacitor Cr, the switch S1 and the first winding Tr22. Meanwhile, the secondary winding Tr21 induces a current of the first winding Tr22 flowing to the output terminal through another resonant path formed of the switch SR2 and the winding Tr21.

Assuming that a current of the input terminal is i, in one operating period of the circuit 220, a current of the resonant unit is 2i, and the current directly flows to an output terminal through one winding of the transformer Tr. Since an actual turn ratio of the transformer Tr is 1:1, an induced current of another winding of the transformer Tr is also 2i, so a total current flowing to the output terminal is 4i. For the input terminal, since current only flows through the switch S2 for half resonance period, a current on an input side is half of the current of the resonant unit 213, i.e., i. Therefore, a voltage conversion ratio of the circuit is 4:1

Modifications of Third Embodiment

Similarly with the second embodiment and its modification described in the invention, the third embodiment of the invention also can have various modifications. Hereinafter various modifications of the full-wave rectifier conversion circuit 220 is described, and only differences between the various modifications and the conversion circuit 220 are described, so the same parts are not described here.

Figure 24:
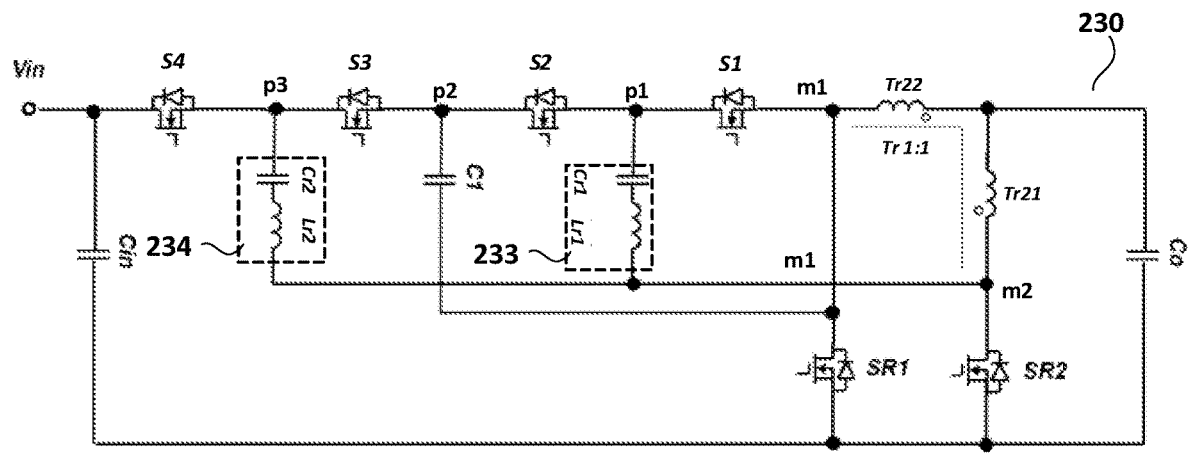
FIG. 24 illustrates a modification of the circuit of FIG. 23.

FIG. 24 illustrates a schematic diagram of a conversion circuit 230 according to the third embodiment of the invention.

As compared to the circuit 220 of FIG. 23, the switch branch in the circuit 230 of FIG. 24 is expanded with two switches S3 and S4 connected in series, such that the switch branch includes four switches S1-S4 connected in series. The switches S1 and S2 are connected in series to form a connection node p1, the switches S2 and S3 are connected in series to form a connection node p2, and the switches S3 and S4 are connected in series to form a connection node p3.

The circuit 230 is further expanded with a blocking capacitor C1 and another resonant unit 234 including a resonant capacitor Cr2 and a resonant inductor Lr2. The blocking capacitor C1 has one end connected to the connection node p2, and the other end connected to a first midpoint m1. The resonant unit 234 has one end connected to the connection node p3, and the other end connected to a second midpoint m2.

Since in one operating period of the circuit 230, the first winding Tr21 and the second winding Tr22 of the transformer Tr connected in series are induced with each other in the first half and the second half of one operating period, a voltage conversion ratio of the circuit 230 is 8:1.

Figure 25:
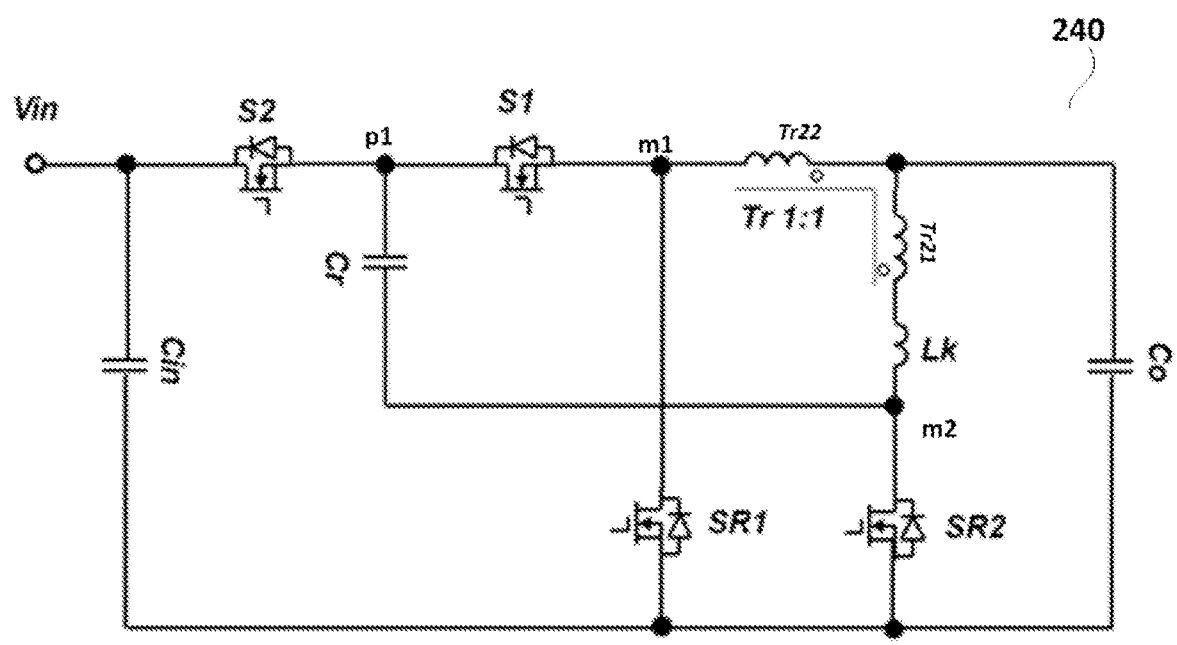
FIG. 25 illustrates a modification of the circuit of FIG. 23.

A circuit 240 in FIG. 25 illustrates another modification of the circuit 220 of FIG. 23. Although the resonant unit shown in FIG. 23 includes the resonant capacitor Cr and the resonant inductor Lr, leakage inductance of the transformer Tr having the second winding Tr21 and the first winding Tr22 can function as resonant inductors of the resonant units. Therefore, in the circuit 240 of FIG. 25, leakage inductance Lk of the transformer Tr functions as the resonant inductor to produce resonance with the resonant capacitor Cr. The circuit 240 also can achieve the effect of the circuit 220 of FIG. 23, and simplifies circuit configuration.

Figure 26:
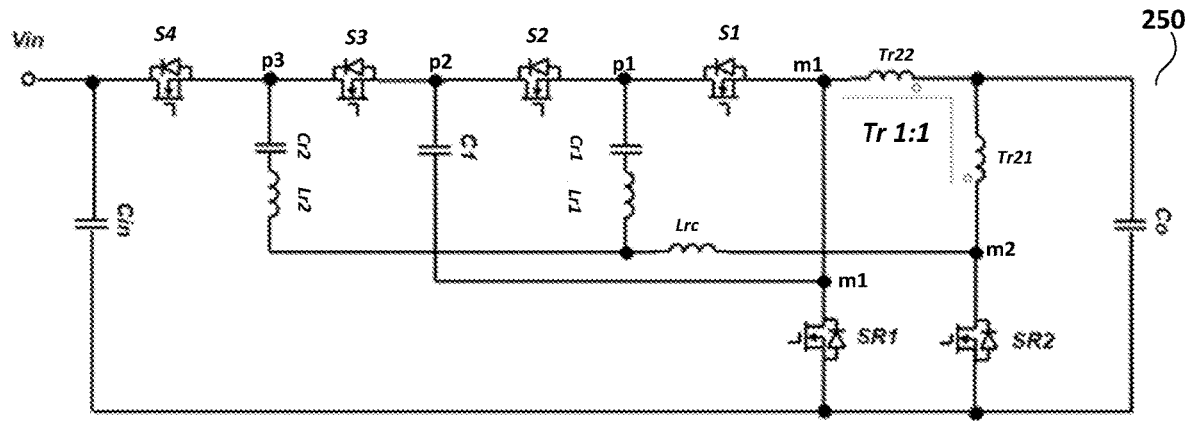
FIG. 26 illustrates a modification of the circuit of FIG. 23.

A circuit 250 in FIG. 26 illustrates a further modification of the circuit 230 of FIG. 24. In the circuit 250, a part of each of the resonant inductors Lr1 and Lr2 is combined to a common inductor Lrc shared by two resonant units. At this time, a resonant frequency is:

$$fr=1/(2\pi \times \sqrt{((Lr_1+2 \times Lr_c) \times Cr_1)})=1/(2\pi \times \sqrt{((Lr_2+2 \times Lr_c) \times Cr_2)}).$$

The benefit is to reduce a desired inductance of the resonant inductor using leakage inductance of the transformer, thereby achieving the effect of reducing use of devices, and volume of the transformer.

Figure 27:
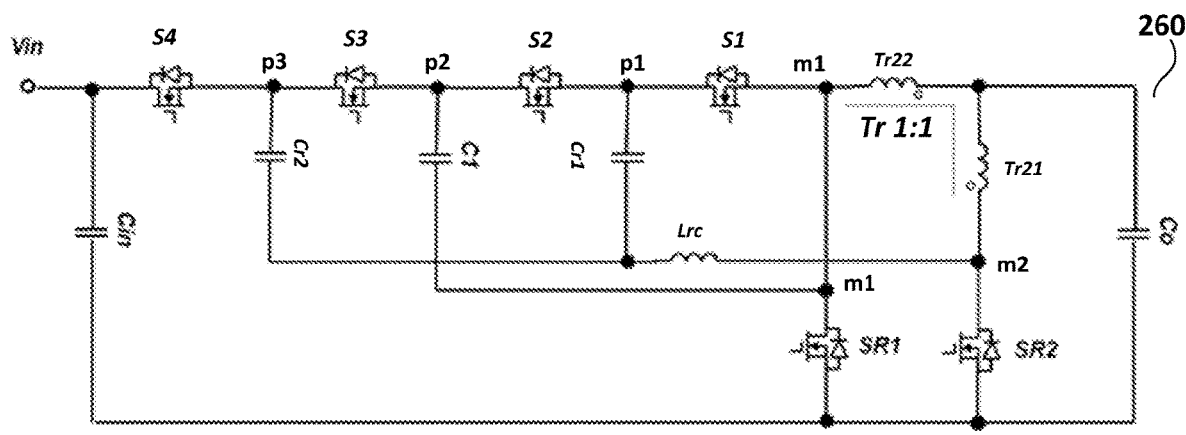
FIG. 27 illustrates a modification of the circuit of FIG. 23.

A circuit 260 in FIG. 27 is a further modification of the circuit 230 of FIG. 24. In the circuit 260, when parameters of the two resonant units are the same, the resonant inductors of the two resonant units are combined to a common inductor Lrc shared by the two resonant units. At this time, a resonant frequency is fr=$1/(2\pi \times \sqrt{(2 \times Lr_c \times Cr_1)})$. Capacitances of the resonant capacitors Cr1 and Cr2 are the same. The circuit 260 works in a DC transformer mode, and is operated in a fixed operating frequency, so a required value of a leakage inductance is quite small, and the leakage inductance of the transformer can directly function as the common resonant inductor Lrc, thereby reducing use number and volume of devices.

Figure 28:
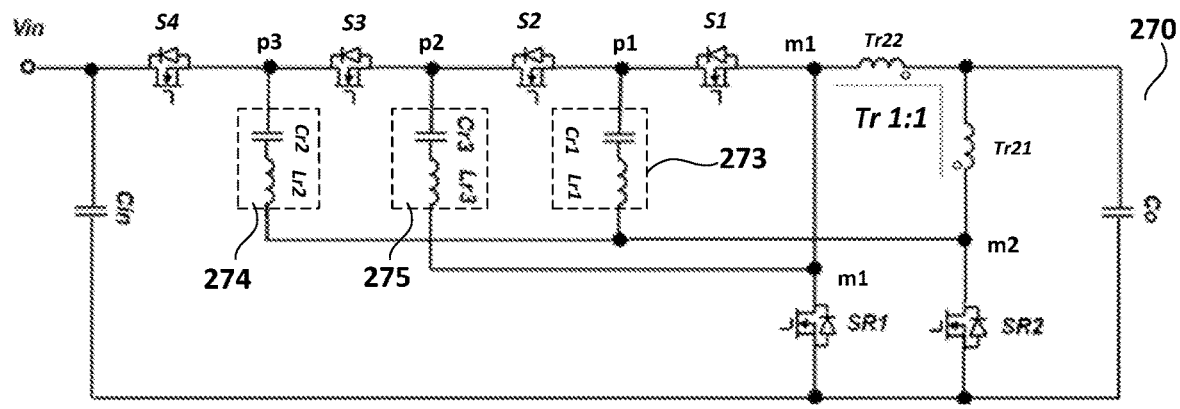
FIG. 28 illustrates a modification of the circuit of FIG. 23.

A circuit 270 in FIG. 28 is a further modification of the circuit 230 of FIG. 24. In the circuit 270, when the resonant capacitor Cr1 and the resonant inductor Lr1 in a resonant unit 273 and the resonant capacitor Cr2 and the resonant inductor Lr2 in a resonant unit 274 have the same parameters, a resonant capacitor Cr3 and a resonant inductor Lr3 having the same parameters as the resonant units 273 and 274 can replace the original single blocking capacitor connected to a connection node p2 between the switches S2 and S3, thereby forming a resonant unit 275. The resonant capacitor Cr3 functions as the blocking capacitor, and also participates together with the resonant inductor Lr3 in circuit resonance.

Figure 29:
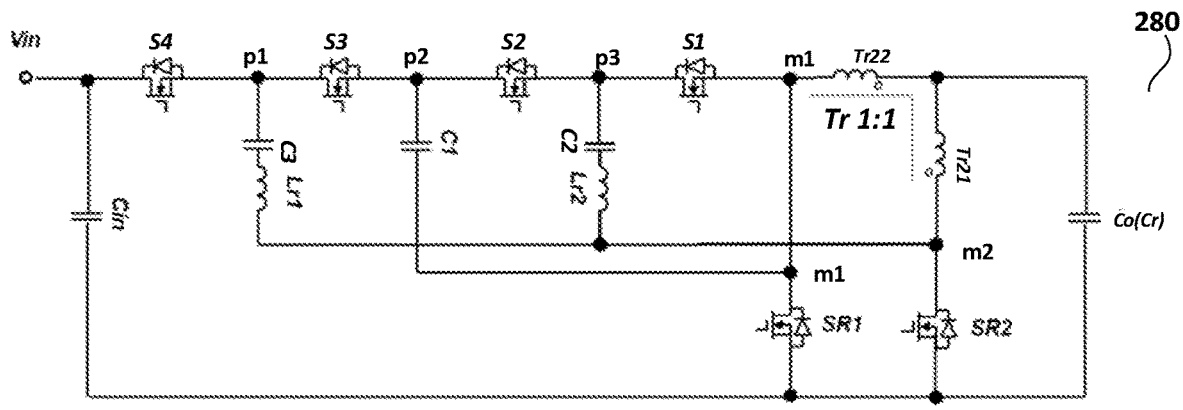
FIG. 29 illustrates a modification of the circuit of FIG. 23.

A circuit 280 in FIG. 29 is a further modification of the circuit 230 of FIG. 24. In the circuit 280, an output capacitor Co connected in parallel to the first branch and the second branch of the full-bridge rectifier circuit in the circuit 280 can function as a resonant capacitor Cr shared by the two resonant units. Therefore, in the circuit 280, the resonant capacitor Cr is shared by the resonant inductors Lr1 and Lr2, the resonant capacitor Cr and the resonant inductor Lr1 resonate as one resonant unit, and the resonant capacitor Cr and the resonant inductor Lr2 resonate as another resonant unit. Moreover, the resonant unit connected to the connection node of the switch branch can only have resonant inductors. The circuit 280 simplifies circuit configuration. Although the resonant inductor Lr2 is connected in series with a capacitor C2, and the resonant inductor Lr1 is connected in series with a capacitor C3 in the circuit 280, the capacitors C2 and C3 mainly function as blocking capacitors, and the capacitors C2 and C3 can be omitted.

Figure 30:
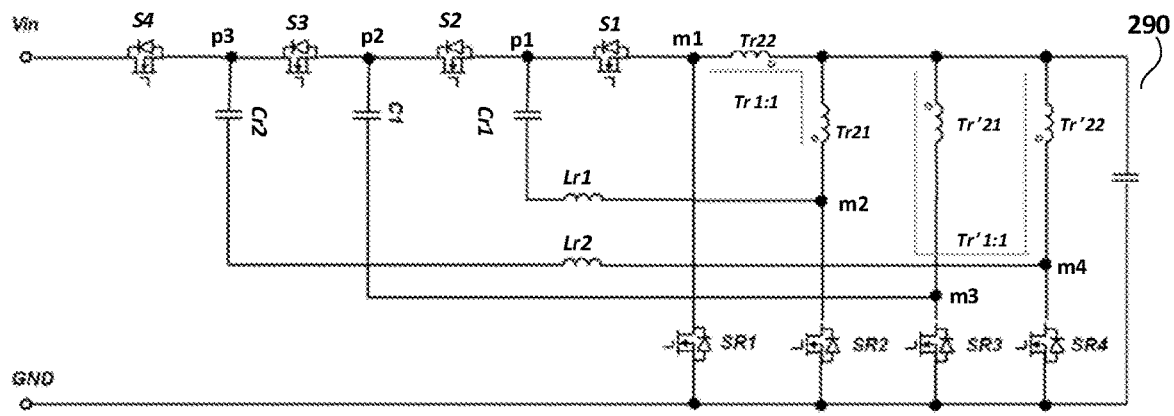
FIG. 30 illustrates a modification of the circuit of FIG. 23.

A circuit 290 in FIG. 30 is a further modification of the circuit 230 of FIG. 24. In the circuit 290, the full-wave rectifier circuit may further include a third branch and a fourth branch connected in parallel to the first branch and the second branch. The third branch includes a switch SR3 and a first winding Tr'21 of a transformer Tr' connected in series to form a connection node, which is a third midpoint m3. The fourth branch includes a switch SR4 and a second winding Tr'22 of a transformer Tr' connected in series to form a connection node, which is a fourth midpoint m4.

The resonant unit including the resonant capacitor Cr1 and the resonant inductor Lr1 has one end connected to a connection node p1 between the switches S1 and S2, and the other end connected to a second midpoint m2. Another resonant unit including the resonant capacitor Cr2 and the resonant inductor Lr2 has one end connected to a connection node p3 between the switches S3 and S4, and the other end connected to the fourth midpoint m4. A turn ratio of the first winding Tr21 and the second winding Tr22 of the transformer Tr is 1:1. A turn ratio of the first winding Tr'21 and the second winding Tr'22 of the transformer Tr' is 1:1.

The blocking capacitor C1 has one end connected to a connection node p2 between the switches S2 and S3, and the other end connected to the third midpoint m3.

The benefit of the circuit 290 can reduce current stresses of the single transformer and the single rectifier, or increase through-current capability of the transformer and the switch SR when using the same elements, thereby increasing an output power of the converter.

Figure 31:
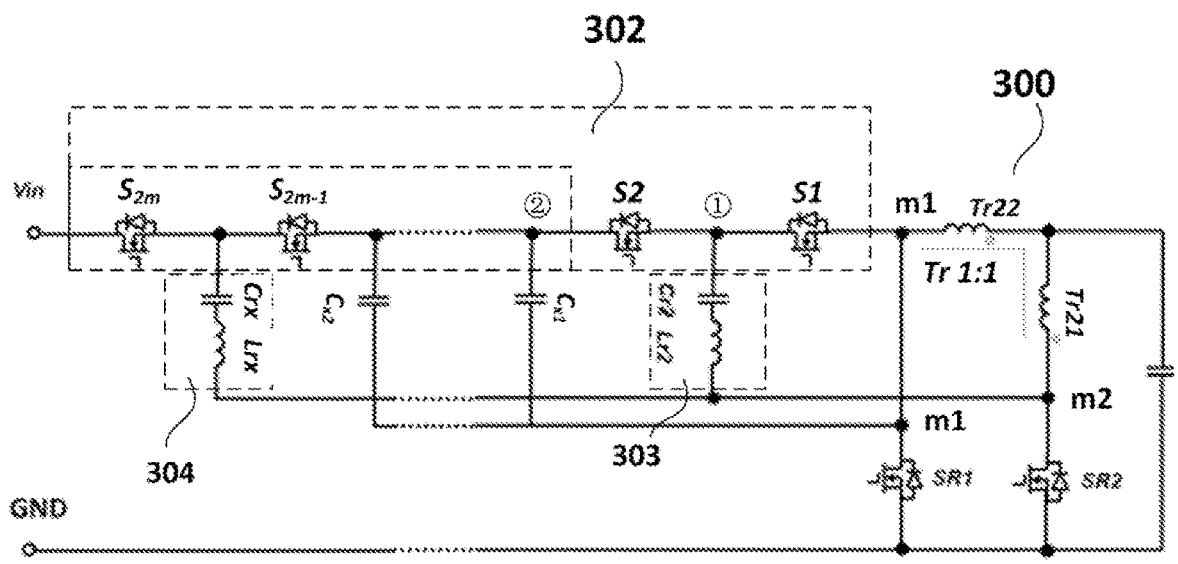
FIG. 31 illustrates a modification of the circuit of FIG. 23.

Similarly, the circuit 220 of FIG. 23 also can be further expanded to change the voltage conversion ratio. FIG. 31 illustrates an expansion form. In a circuit 300 of FIG. 31, a switch branch 302 includes the original two switches S1-S2, and is further expanded with (2m−2) switches (S3, S4, ... $S_{2m-1}$ and $S_{2m}$). The expanded (2m−2) switches (S3, S4, ... $S_{2m-1}$ and $S_{2m}$) are connected in series with the original two switches S1 and S2, such that the switch branch 302 includes 2m switches connected in series, where m is an integer, and m≥2.

The circuit 300 further includes (m−1) blocking capacitors Cx ($C_{x1}$ and $C_{x2}$) and (m−1) resonant units 304. The (m−1) resonant units 304 and an original resonant unit 303 allow the circuit 300 to have m resonant units. The resonant units 304 each includes a resonant capacitor Crx and a resonant inductor Lrx.

Therefore, the conversion circuit like the circuit 300 of FIG. 31 can be described as follows: the switch branch 302 has 2m switches connected in series, where m is an integer, and m≥2. Adjacent two switches of the 2m switches are connected to form connection nodes, so the switch branch 302 has (2m−1) connection nodes.

A connection node close to the output terminal of the circuit 300 is referred as the first connection node, so the switch branch 302 has the first, second, third, ..., (2m−2)th, and (2m−1)th connection nodes from the output terminal to the input terminal. For example, as shown in FIG. 31, the connection node between the switches S1 and S2 is closest to the output terminal, so the connection node between the switches S1 and S2 is the first connection node (sign "①" in FIG. 31), the connection node between the switch S2 and the next switch adjacent to the switch S2 is the second connection node (sign "②" in FIG. 31), and so on. The connection node between the switches $S_{2m-1}$ and $S_{2m}$ is the (2m−1)th connection node.

Each of the m resonant units is connected between the odd-numbered connection node and the second midpoint m2, and each of the (m−1) blocking capacitors Cx is connected between the even-numbered connection node and a first midpoint m1.

Of the m resonant units, one end of the x-th resonant unit is connected to the connection node between the (2x−1)th switch and the 2x-th switch of the 2m switches, where x is an integer, m≥3, and 1≤x≤m. For example, when x=1, as for the first (i.e., x) resonant unit (the resonant unit 303 in FIG. 31) of the m resonant units, one end is connected to the connection node between the first (i.e., 2x−1) switch (the switch S1 in FIG. 31) and the second (i.e., 2x) switch (the switch S2 in FIG. 31), and the other end is connected to the second midpoint m2. For another example, when x=m, as for the m-th (i.e., x) resonant unit (the resonant unit 304 in FIG. 31) of the m resonant units, one end is connected to the connection node between the (2m−1)th (i.e., 2x−1) switch (the switch $S_{2m-1}$ in FIG. 31) and the 2m-th (i.e., 2x) switch (the switch $S_{2m}$ in FIG. 31), and the other end is connected to the second midpoint m2.

Of the (m−1) blocking capacitors Cx, one end of the k-th blocking capacitor is connected to the connection node between the 2k-th switch and the (2k+1)th switch of the 2m switches, and the other end is connected to the midpoint m2 of the second bridge arm, where k is an integer, and 1≤k≤m−1. For example, when k=1, one end of the first (i.e., k) blocking capacitor (the capacitor $C_{x1}$ in FIG. 31) is connected to the connection node between the second (i.e., 2k) switch (the switch S2 in FIG. 31) and the third switch (the next switch adjacent to the switch S2 in FIG. 31, not shown), and the other end is connected to the first midpoint m1. For another example, when k=(m−1), one end of the (m−1)th (i.e., k) blocking capacitor (the blocking capacitor $C_{x2}$ in FIG. 31) is connected to the connection node between the (2m−2)th (i.e., 2k) switch (the previous switch adjacent to the switch $S_{2m-1}$ in FIG. 31, not shown) and the (2m−1)th (i.e., 2k+1) switch (the switch $S_{2m-1}$ in FIG. 31), and the other end is connected to the first midpoint m1.

Therefore, as for the circuit 300 of FIG. 31, a conversion ratio is 4m:1, thereby expanding the conversion ratio of the conversion circuit. As can be seen, as for the circuit 230 of FIG. 24, it can be referred as a circuit after expanding the circuit 220 of FIG. 23 with a pair of switches, one blocking capacitor and one resonant unit.

Figure 32:
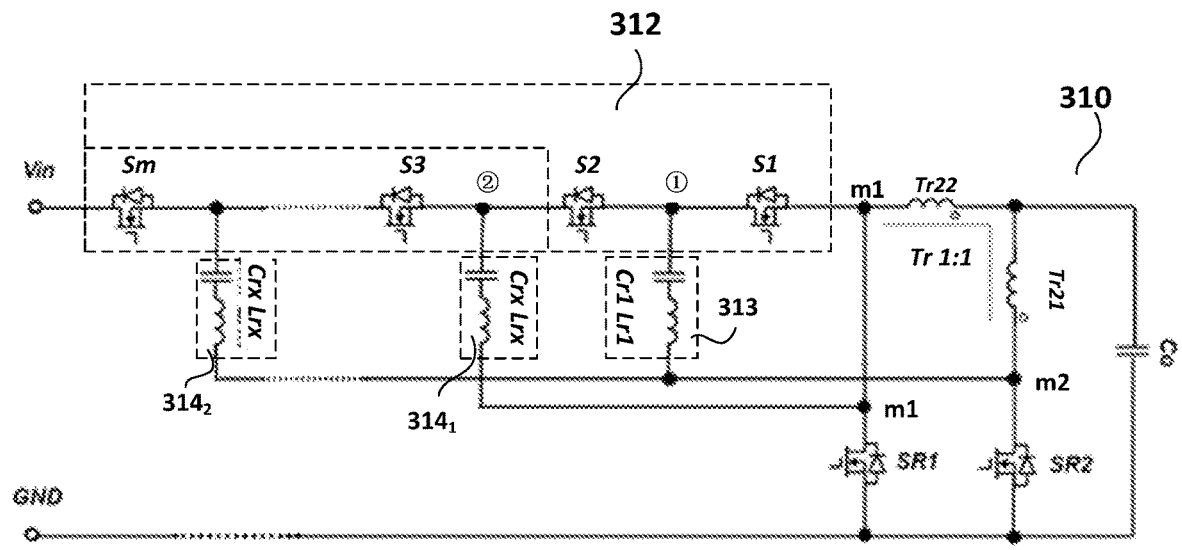
FIG. 32 illustrates a modification of the circuit of FIG. 23.

FIG. 32 illustrates another expansion form. A circuit 331 of FIG. 32 is another expansion of the circuit 220 of FIG. 23. A switch branch 312 of the circuit 310 includes the original two switches S1-S2, and is further expanded with (m−2) switches (S3, . . . , Sm). The expanded (m−2) switches (S3, . . . , Sm) are connected in series with the original two switches S1-S2, such that the switch branch 312 includes m switches connected in series, where m is an integer, and m≥3. The circuit 310 further includes (m−2) resonant units 314 ($314_1$, $314_2$). Therefore, the (m−2) resonant units 314 and a resonant unit 313 together form (m−1) resonant units. The resonant units 314 include resonant capacitors Crx and resonant inductors Lrx. The respective resonant units (the resonant unit 313 and the resonant units 314) in the circuit 310 have the same resonance parameters.

Specifically, the conversion circuit like the circuit 310 of FIG. 32 can be described as follows: the switch branch 312 has m switches connected in series, where m is an integer, and m≥3. Adjacent two switches of the m switches are connected to form connection nodes, so the switch branch 312 has (m−1) connection nodes. A connection node close to the output terminal of the circuit 310 is referred as the first connection node, so the switch branch 312 has the first, second, third, . . . , and (m−1)th connection nodes from the output terminal to the input terminal. For example, as shown in FIG. 32, the connection node between the switches S1 and S2 is closest to the output terminal, so the connection node between the switches S1 and S2 is the first connection node (sign "①" in FIG. 32), the connection node between the switches S2 and S3 is the second connection node (sign "②" in FIG. 32), and so on. The connection node between the switch $S_m$ and one switch (not shown) before the switch $S_m$ is the (m−1)th connection node.

Each of the (m−1) resonant units (313, 314) in the circuit 310 has one end connected to the corresponding connection node, and the other end connected to the first midpoint m1 or the second midpoint m2. As for the resonant unit having one end connected to the odd-numbered connection node, the other end is connected to the second midpoint m2. As for the resonant unit having one end connected to the even-numbered connection node, the other end is connected to the first midpoint m1.

Of the (m−1) resonant units, one end of the (2y−1)th resonant unit is connected to the connection node between the (2y−1)th switch and the 2y-th switch of the m switches, and the other end is connected to the primary winding Tr1 of the transformer, where y is an integer, and 1≤y≤m/2. For example, when y=1, of the (m−1) resonant units, one end of the first (i.e., 2y−1) resonant unit (the resonant unit 313 in FIG. 32) is connected to the connection node between the first (i.e., 2y−1) switch (the switch S1 in FIG. 32) and the second (i.e., 2y) switch (the switch S2 in FIG. 32), and the other end is connected to the second midpoint m2.

Of the (m−1) resonant units, one end of the 2z-th resonant unit is connected to the connection node between the 2z-th switch and the (2z+1)th switch of the m switches, and the other end is connected to the first midpoint m1, where z is an integer, and 1≤z≤(m−1)/2. For example, when z=1, of the (m−1) resonant units, one end of the second (i.e., 2z) resonant unit (the resonant unit $314_1$ in FIG. 32) is connected to the connection node between the second (i.e., 2z) switch (the switch S2 in FIG. 32) and the third (i.e., 2z+1) switch (the switch S3 in FIG. 32), and the other end is connected to the first midpoint m1. As for a conversion ratio of the circuit 310, it is still m:1.

Figure 33:
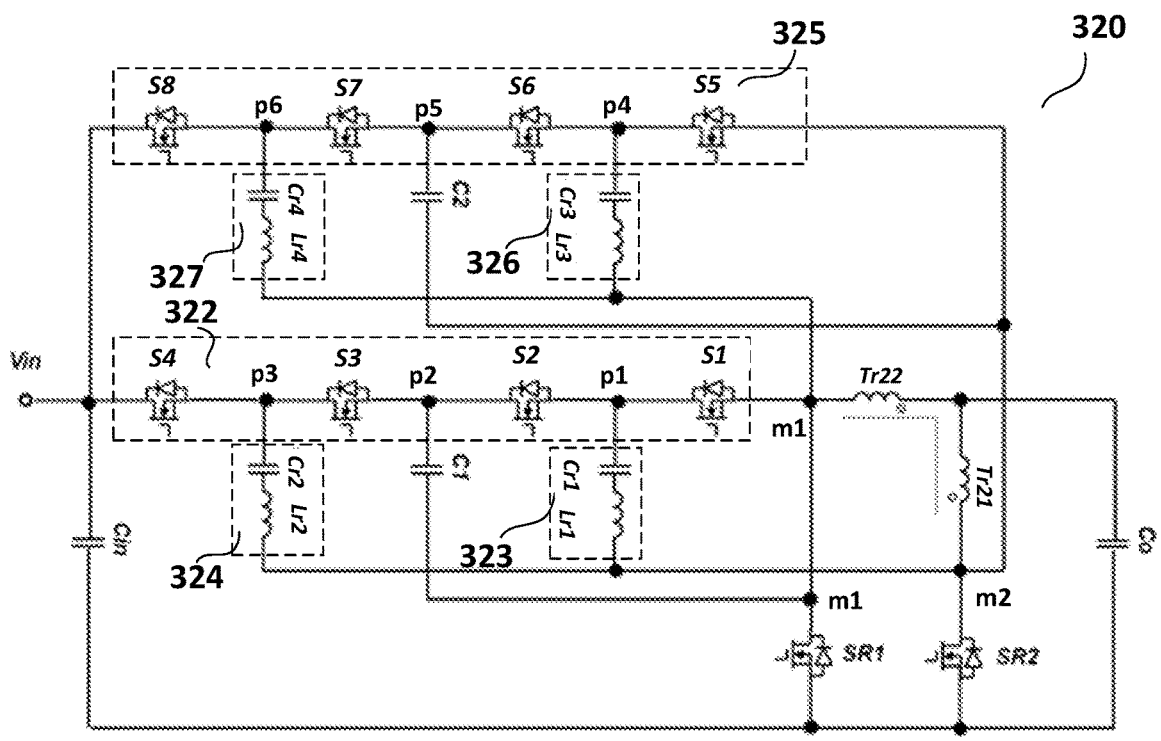
FIG. 33 illustrates a modification of the circuit of FIG. 23.

FIG. 33 illustrates a modification of the circuit 230 of FIG. 24. In a circuit 320 of FIG. 33, the full-wave rectifier circuit has a first branch including a switch SR1 and a first winding Tr22, and a second branch including a switch SR2 and a second winding Tr21. The switch SR1 and the first winding Tr22 are connected in series to form a first midpoint m1, and the switch SR2 and the second winding Tr21 are connected in series to form a midpoint m2.

The circuit 320 has two switch branches 322 and 325, the switch branch 322 is connected between the first end of the input voltage and the first midpoint m1, and the switch branch 325 is connected between the first end of the input voltage and the second midpoint m2. The switch branch 322 has four switches S1-S4 connected in series, and the switch branch 325 has four switches S5-S8 connected in series. The circuit 320 has four resonant units 323, 324, 326 and 327, and two blocking capacitors C1 and C2. A turn ratio of the second winding Tr12 and the first winding Tr22 is 1:1.

The resonant unit 323 is connected between a connection node p1 of the switches S1, S2 and the second midpoint m2. The resonant unit 324 is connected between a connection node p3 of the switches S3, S4 and the second midpoint m2. The resonant unit 326 is connected between a connection node p4 of the switches S5, S6 and the first midpoint m1. The resonant unit 327 is connected between a connection node p6 of the switches S7, S8 and the first midpoint m1. The blocking capacitor C1 is connected between a connection node p2 of the switches S2, S3 and the first midpoint m1. The blocking capacitor C2 is connected between a connection node p5 of the switches S6, S7 and the second midpoint m2.

In one operating period of the circuit 320, during the first half period, the switches S4, S2, S7, S5 and SR1 are turned on, while the switches S3, S1, S8, S6 and SR2 are turned off; during the second half period, the switches S4, S2, S7, S5 and SR1 are turned off, while the switches S3, S1, S8, S6 and SR2 are turned on. The circuit 320 also realizes a conversion ratio of 8:1. As compared to the circuit 230 of FIG. 24, current stress of the switches S1-S8 of the switch branch in the circuit 320 may be reduced by half, and currents of the switches SR1 and SR2 are more balanced.

Figure 34A:
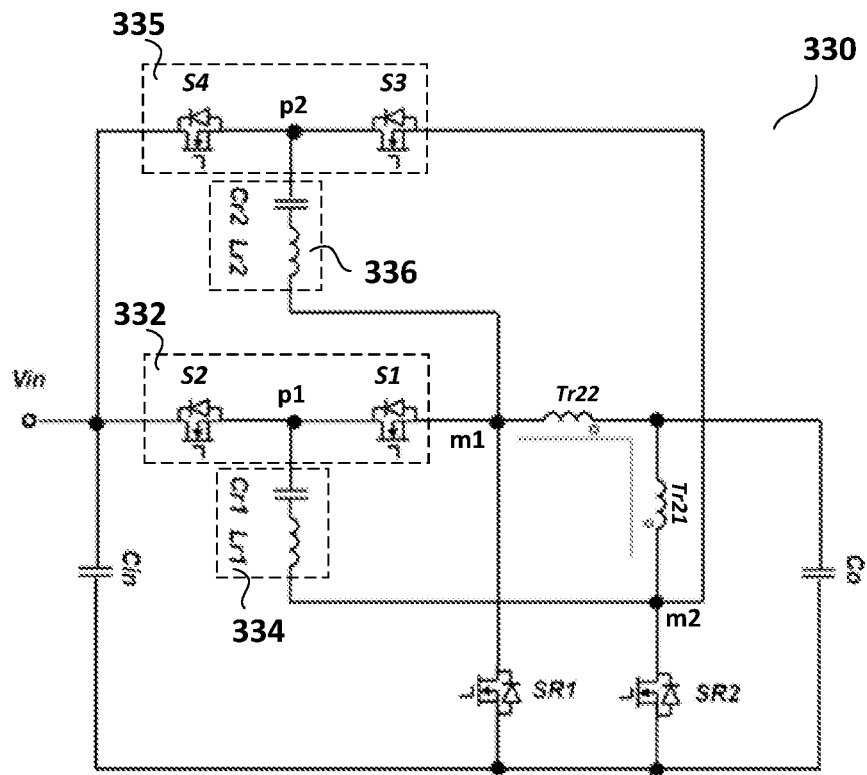
FIGS. 34A and 34B illustrate a modification of the circuit of FIG. 23.

FIG. 34A illustrates a modification of the circuit 220 of FIG. 23. In the circuit 330 of FIG. 34A, the full-wave rectifier circuit has a first branch including a switch SR1 and a first winding Tr22, and a second branch including a switch SR2 and a second winding Tr21. The switch SR1 and the first winding Tr22 are connected in series to form a first midpoint m1, and the switch SR2 and the second winding Tr21 of the transformer are connected in series to form a midpoint m2.

The circuit 330 has two switch branches 332 and 335, the switch branch 332 is connected between the first end of the input voltage and the first midpoint m1, and the switch branch 335 is connected between the first end of the input voltage and the second midpoint m2. The switch branch 332 has switches S1 and S2 connected in series, and the switch branch 335 has switches S3 and S4 connected in series. The circuit 330 further has resonant units 334 and 336. A turn ratio of the second winding Tr12 and the first winding Tr22 is 1:1.

The resonant unit 334 is connected between a connection node p1 of the switches S1 and S2 and the second midpoint m2. The resonant unit 336 is connected between a connection node p2 of the switches S3 and S4 and the first midpoint m1.

For example, when the circuit 330 works, the switches S2, S3 and SR1 are turned on or turned off simultaneously, the switches S1, S4 and SR2 are turned on or turned off simultaneously, and the group of switches S2, S3 and SR1 and the group of switches S1, S4 and SR2 are complementarily turned on. The circuit 330 also realizes a conversion ratio of 4:1. As compared to the circuit 220 of FIG. 23, current stress of the switches S1-S4 of the switch branch in the circuit 330 may be reduced by half, and currents of the switches SR1 and SR2 are more balanced.

Similarly with those described in FIG. 25, leakage inductance of the transformer Tr having the second winding Tr21 and the first winding Tr22 can function as at least a part of resonant inductors of the resonant units. For example, in the circuit 330' of FIG. 34B, the leakage inductance Lk of the transformer Tr functions as the resonant inductor for producing resonance with the resonant capacitors Cr1 and Cr2, respectively. The circuit 330' also can achieve the effect of the circuit 330 in FIG. 34A, and simplifies circuit configuration.

Figure 34B:
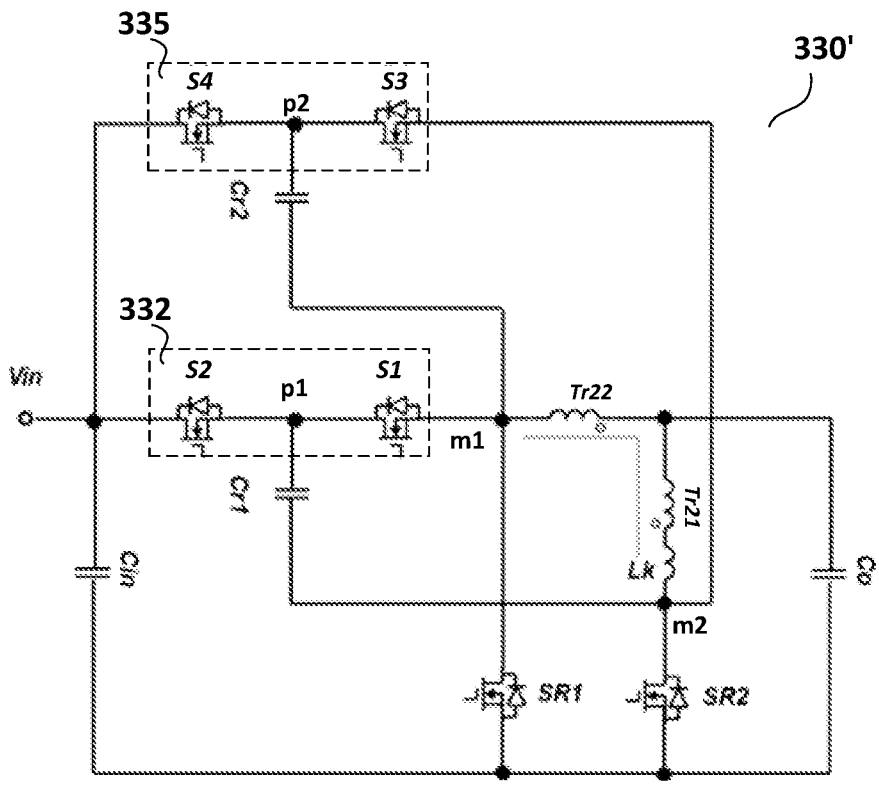
Figure 35:
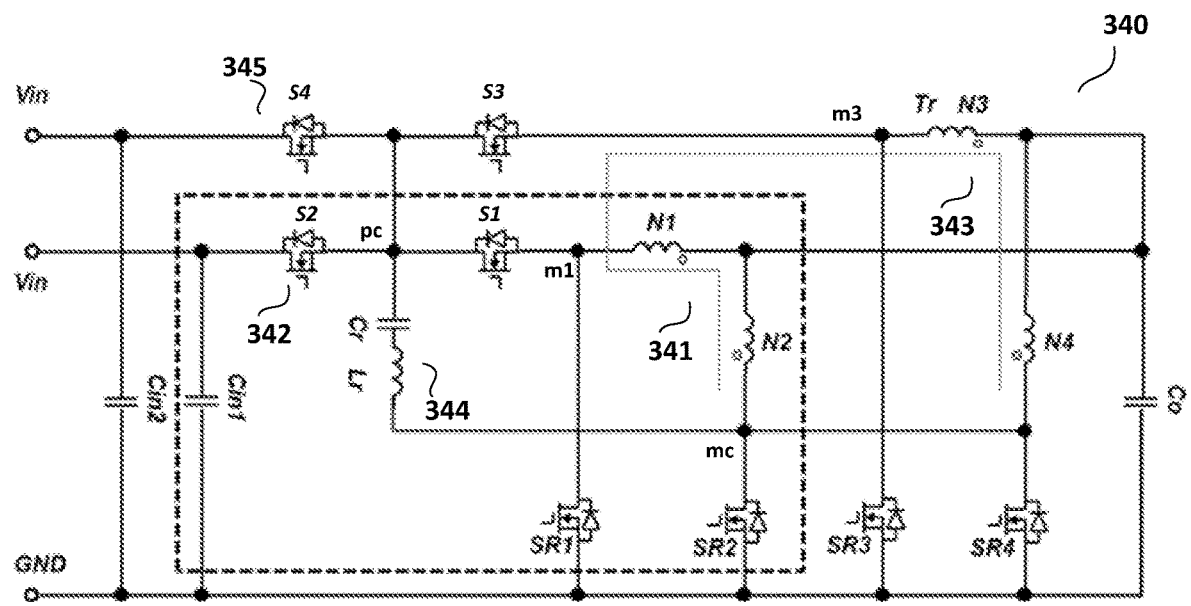
FIG. 35 illustrates a modification of the circuit of FIG. 23.

The case where two groups of switch branches and two groups of resonant units share one full-wave rectifier circuit is described with reference to FIGS. 33, 34A and 34B, and in some other embodiments, the two groups of switch branches and the full-wave rectifier circuit can share the same resonant unit. FIG. 35 illustrates a modification of the circuit 220 of FIG. 23.

The circuit 340 illustrates that two groups of circuits work in parallel. One path circuit is in a dashed box of FIG. 35, and another group of circuits is outside the dashed box.

One path circuit in the dashed box has a full-wave rectifier circuit 341 and a switch branch 342. The full-wave rectifier circuit 341 has a first branch including a switch SR1 and a winding N1 of the transformer, and a second branch including a switch SR2 and a winding N2 of the transformer. The switch branch 342 is connected between the first end of the input voltage and the midpoint m1 of the first branch, and the switch branch 342 has the switches S1 and S2 connected in series. Another group of circuits outside the dashed box has a full-wave rectifier circuit 343 and a switch branch 345. The full-wave rectifier circuit 343 has a third branch including a switch SR3 and a winding N3 of the transformer, and a fourth branch including a switch SR4 and a winding N4 of the transformer. The switch branch 345 is connected between the first end of the input voltage and a midpoint m3 of the third branch, and the switch branch 342 has the switches S3 and S4 connected in series. The connection node formed by the switches S1 and S2 connected in series and the connection node formed by the switches S3 and S4 connected in series is common connection node pc, and the midpoint of the second branch and a midpoint of the fourth branch is common midpoint mc.

The circuit 340 further includes a resonant unit 344 having one end connected to the common connection node pc, and the other end connected to the common midpoint mc. Therefore, the resonant unit 344 is shared by the two groups of circuits shown in the circuit 340. The circuit 340 also realizes a conversion ratio of 4:1. Current stress of the switches S1-S4 of the switch branch in the circuit 330 may be reduced by half, and currents of the switches SR1-SR4 are also reduced by half.

Figure 36A:
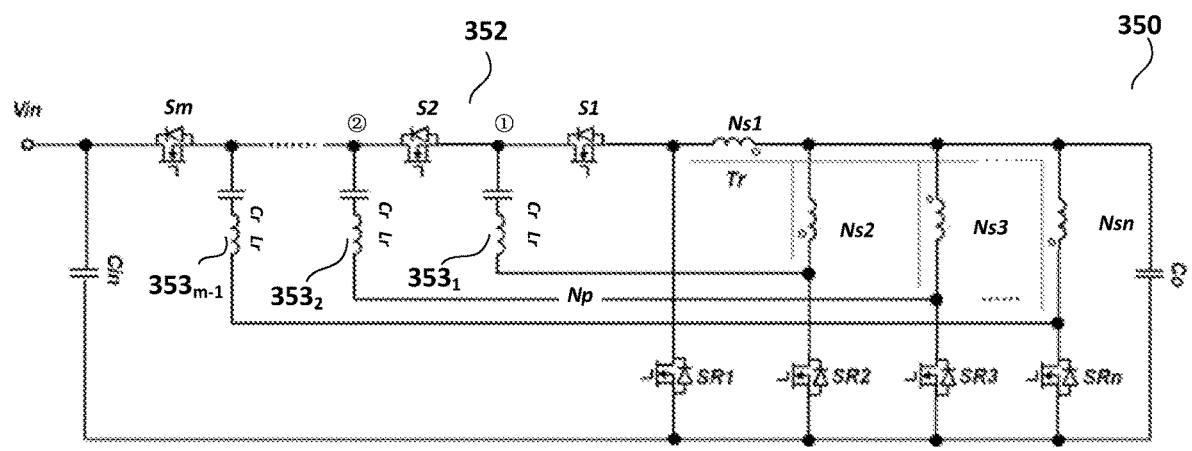
FIGS. 36A-36C illustrate a modification of the circuit of FIG. 36C.

FIG. 36A illustrates another modification of the circuit 220 of FIG. 23. A switch branch 352 of a circuit 350 in FIG. 36A includes m switches, where m is an integer, and m≥3. The circuit 350 further includes (m−1) conversion branches 353 ($353_1$, $353_2$, . . . , $353_{m-1}$), and for example, each conversion branch 353 can be a resonant unit including the resonant capacitor Cr and the resonant inductor Lr. In addition, the full-wave rectifier circuit of the circuit 350 includes n branches. For example, the full-wave rectifier circuit in FIG. 36A includes a first branch including a switch $SR_1$ and a secondary winding $N_{s1}$ of the transformer Tr, a second branch including a switch SR2 and a secondary winding $N_{s2}$ of the transformer Tr, a third branch including a switch SR3 and a secondary winding $N_{s3}$ of the transformer Tr, and a n-th branch including a switch SRn and a secondary winding $N_{sn}$ of the transformer Tr. The switch and the secondary winding in each of the n branches are connected in series to form a midpoint of the corresponding branch. In this embodiment, the number n of branches of the full-wave rectifier circuit is no more than the number m of switches in the switch branch 352, and the number n of branches is at least 2, i.e., in addition to satisfy m≥3, m≥n≥2 also shall be satisfied.

The n branches of the full-wave rectifier circuit include at least one first type branch and at least one second type branch. Dotted terminals of the secondary windings of the first type branches are connected, and undotted terminals of the secondary windings of the first type branched and the secondary windings of the second type branched are connected. For example, as shown in FIG. 36A, the first branch including the switch SR1 and the secondary winding $N_{s1}$ of the transformer Tr and the third branch including the switch SR3 and the secondary winding $N_{s3}$ of the transformer Tr are the first type branched, and the second branch including the switch SR2 and the secondary winding $N_{s2}$ of the transformer Tr and the n-th branch including the switch SRn and the secondary winding $N_{sn}$ of the transformer Tr are the second type branches. Additionally, in the n branches of the full-wave rectifier circuit, the switches in the first type branches are turned on and turned off simultaneously, and the switches in the first type branches and the switches in the second type branches are complementarily turned on.

The switch branch 352 of the circuit 350 in FIG. 36A has m switches connected in series, where m is an integer, and m≥3. Adjacent two switches of the m switches are connected to form connection nodes, so the switch branch 352 has (m−1) connection nodes. A connection node close to the output terminal of the circuit 350 is referred as the first connection node, so the switch branch 352 has the first, second, third . . . , and (m−1)th connection nodes from the output terminal to the input terminal. For example, as shown in FIG. 36A, the connection node between the switches S1 and S2 is closest to the output terminal, so the connection node between the switches S1 and S2 is the first connection node (sign "①" in FIG. 36A), the connection node between the switch S2 and the next switch (not shown) adjacent to the switch S2 is the second connection node (sign "②" in FIG.

36A), and so on. The connection node between the switch $S_m$ and one switch before the switch $S_m$ is the (m−1)th connection node.

Of the (m−1) conversion branches 353 of the circuit 350, as for the conversion branch having one end connected to an odd-numbered connection node of the switch branch 352, the conversion branch is connected between the odd-numbered connection node of the switch branch 352 and a midpoint of one of the second class of the n branches, and as for the conversion branch having one end connected to an even-numbered connection node of the switch branch 352, the conversion branch is connected between the even-numbered connection node of the switch branch 352 and a midpoint of one of the first class of the n branches.

Of the (m−1) conversion branches 353, the (2y−1)th conversion branch has one end connected to the connection node between the (2y−1)th switch and the 2y-th switch of the m switches, and the other end connected to the midpoint of one of the second class of the n branches, and the (2y−1)th switch and the switches in the second type branch are turned on or turned off simultaneously, where y is an integer, and 1≤y≤m/2. For example, when y=1, of the (m−1) conversion branches 353, the first (i.e., 2y−1) conversion branch (the conversion branch $353_1$ in FIG. 36A) has one end connected to the connection node between the first (i.e., 2y−1) switch (the switch S1 in FIG. 36A) and the second (i.e., 2y) switch (the switch S2 in FIG. 36A), and the other end connected to the midpoint of one of the second class of the n branches, for example, the midpoint of the second branch.

Further, of the (m−1) conversion branches, the 2z-th conversion branch has one end connected to the connection node between the 2z-th switch and the (2z+1)th switch of the m switches, and the other end connected to the midpoint of one of the first class of the n branches, and the 2z-th switch and the switches in the first type branch are turned on or turned off simultaneously, where z is an integer, and 1≤z≤(m−1)/2. For example, when z=1, of the (m−1) conversion branches, the second (i.e., 2z) conversion branch (the conversion branch $353_2$ in FIG. 36A) has one end connected to the connection node between the second (i.e., 2z) switch (the switch S2 in FIG. 36A) and the third (i.e., 2z+1) switch (the switch S3 in FIG. 36A), and the other end connected to the midpoint of one of the first class of the n branches, for example, a midpoint of the third branch.

When the number of switches in the switch branch 352 of the circuit 350 is m, a voltage conversion ratio of Vin/Vo=2m can be realized.

Although the plurality of conversion branches 353 in FIG. 36A are resonant units, some of the plurality of conversion branches 353 also can be formed of non-resonant unit. For example, the non-resonant unit can be a unit composed of only one capacitor, or composed of a capacitor and an inductance having a resonant frequency much smaller or much larger than the switching frequency of the circuit (less than ⅓ of the switching frequency or greater than 3 times the switching frequency). When the plurality of conversion branches 353 include conversion branches formed of non-resonant unit, the conversion branches adjacent to the conversion branches formed of non-resonant unit shall be all resonant units. In other words, if the i-th conversion branch of the (m−1) conversion branches 353 includes non-resonant unit, the (i−1)th conversion branch and the (i+1)th conversion branch of the (m−1) conversion branches 353 are all resonant units, where m≥4, i≤m−2, and i is an integer.

For example, in one embodiment, the conversion branch (i.e., the (2y−1)th conversion branch of the (m−1) conversion branches 353) connected between the odd-numbered node and the midpoint of the second type branch may be formed of resonant units, and the conversion branch (i.e., the 2z-th conversion branch of the (m−1) conversion branches 353) connected between the even-numbered node and the midpoint of the first type branch may be formed of capacitors. At this time, the number m of switches in the switch branch shall be an even number, because the last connection node of the switch branch shall be an odd-numbered node connected to the resonant unit, thereby satisfying the condition that the conversion branches adjacent to the conversion branches formed of one capacitor only are all resonant units.

Figure 36B:
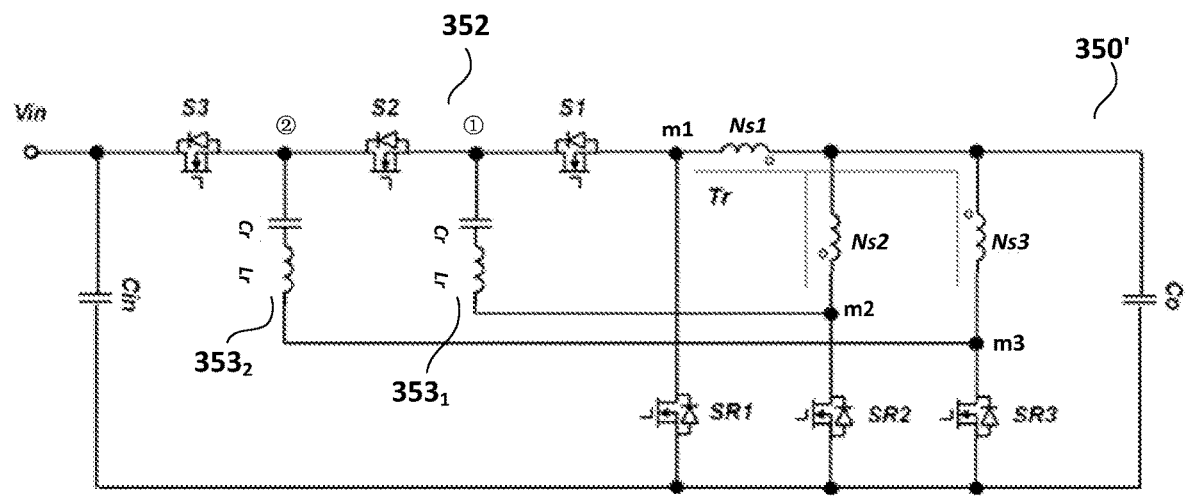

For example, when the number of switches in the switch branch and the number of branches in the full-wave rectifier circuit are both 3 (i.e., m=n=3), a specific conversion circuit can be shown in FIG. 36B.

In a circuit 350' of FIG. 36B, the switch branch 352 includes three switches S1-S3, and the full-wave rectifier circuit includes three branches. The first branch including the switch SR1 and the secondary winding $N_{s1}$ and the third branch including the switch SR3 and the secondary winding $N_{s3}$ are the first type branch, and the second branch including the switch SR2 and the secondary winding $N_{s2}$ is the second type branch.

In the circuit 350', the conversion branch $353_1$ is connected between the connection node of the switches S1 and S2 (the odd-numbered connection node ①) and the midpoint m2 of the second branch that is the second type branch, and the conversion branch $353_2$ is connected between the connection node of the switches S2 and S3 (the even-numbered connection node ②) and the midpoint m3 of the third branch that is the first type branch. It shall be noticed that the conversion branch $353_2$ also can be connected between the connection node of the switches S2 and S3 and the midpoint m1 of the first branch that is the first type branch. Accordingly, the switches S1, S3 and SR2 are turned on or turned off simultaneously, the switches S2, SR1 and SR3 are turned on or turned off simultaneously, and the group of switches S1, S3 and SR2 and the group of switches S2, SR1 and SR3 are complementarily turned on.

Figure 36C:
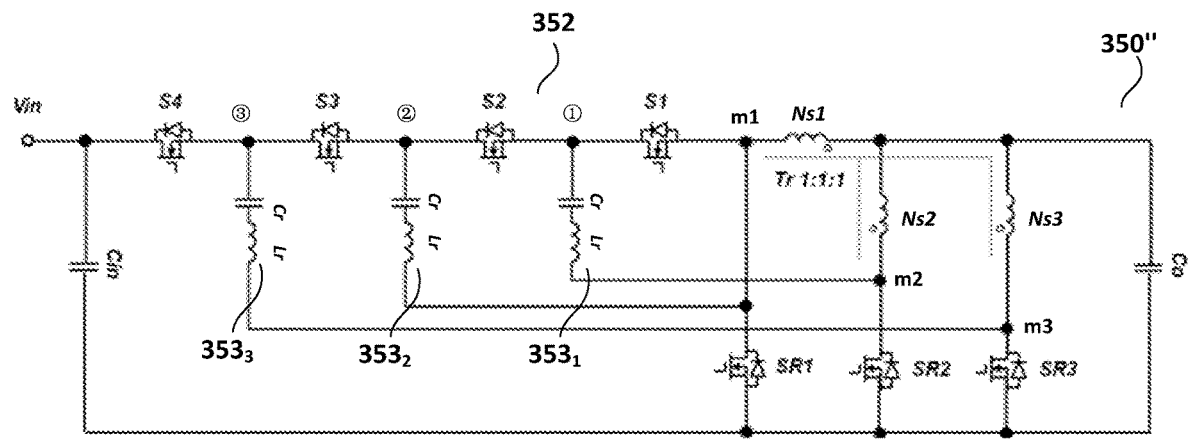

For example, when the number of switches in the switch branch is 4, and the number of branches in the full-wave rectifier circuit is 3 (i.e., m=4, and n=3), a specific conversion circuit can be shown in FIG. 36C.

In a circuit 350" of FIG. 36C, the switch branch 352 includes four switches S1-S4, and the full-wave rectifier circuit includes three branches. The first branch including the switch SR1 and the secondary winding $Ns_1$ is the first type branch, and the second branch including the switch SR2 and the secondary winding $Ns_2$ and the third branch including the switch SR3 and the secondary winding $Ns_3$ are the second type branches.

In the circuit 350", the conversion branch $353_1$ is connected between the connection node of the switches S1 and S2 (the odd-numbered connection node ①) and the midpoint m2 of the second branch that is the second type branch, the conversion branch $353_2$ is connected between the connection node of the switches S2 and S3 (the even-numbered connection node ②) and the midpoint m3 of the third branch that is the first type branch, and the conversion branch $353_3$ is connected between the connection node of the switches S3 and S4 (the even-numbered connection node ③) and the midpoint m3 of the third branch that is the second type branch. It shall be noticed that the conversion branch $353_2$ and the conversion branch $353_3$ also can be connected to the midpoint m2 or the midpoint m3 of the second branch and the third branch that is the second type branch. At this time, the switches S1, S3, SR2 and SR3 are turned on or turned off simultaneously, the switches S2, S4 and SR1 are turned on or turned off simultaneously, and the group of switches S1, S3, SR2 and SR3 and the group of switches S2, S4 and SR1 are complementarily turned on.

The switches, such as, the first switch and the second switch, mentioned in the embodiments can be formed by a plurality of switches connected in parallel. Similarly, the windings also can be formed by a plurality of windings connected in parallel.

Figure 37:
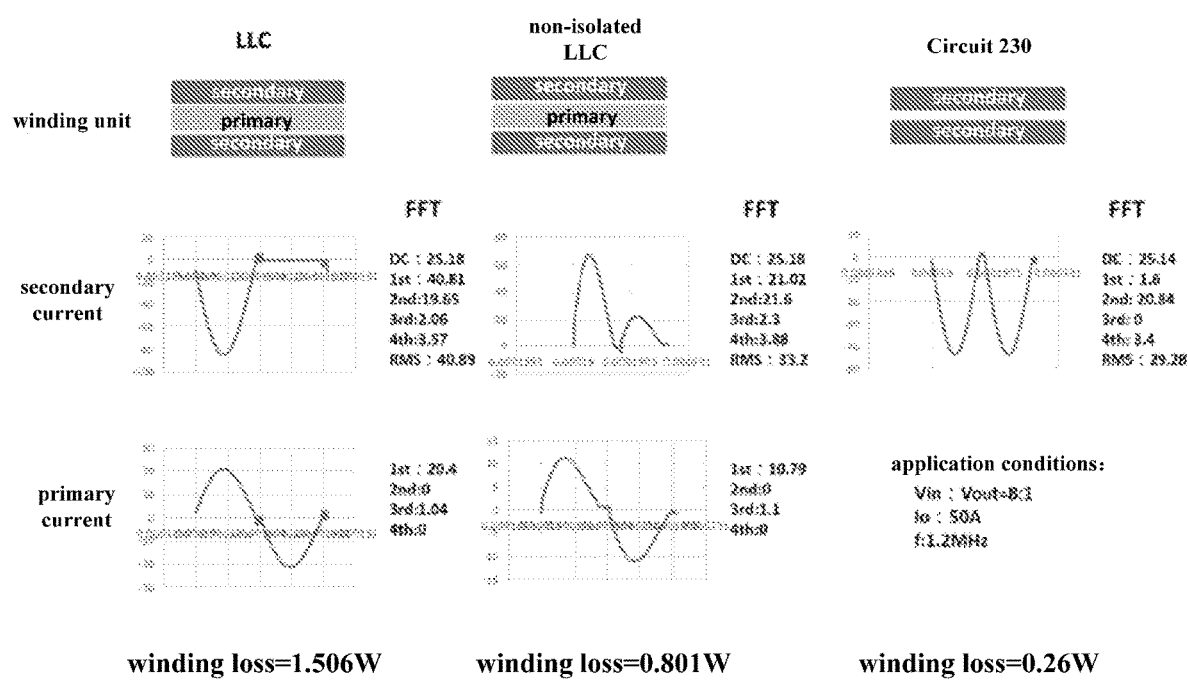
FIG. 37 illustrates comparisons in winding losses between the conversion circuits according to the embodiments of the invention and the conventional conversion circuits.

FIG. 37 illustrates comparisons of losses between the conversion circuits discussed in the invention and the traditional LLC transformer and non-isolated LLC transformer.

In FIG. 37, the inventors calculate losses of the conversion circuit of FIG. 24 using the voltage conversion ratio of 8:1 and the LLC transformer and the non-isolated LLC transformer having the same voltage conversion ratio of 8:1.

In FIG. 37, working conditions of the circuit are as follows: an input voltage Vin=48V, an output voltage Vout=4.8V, an operating frequency f=1.2 MHz, and an output current Io=50A. In the figure, current of the primary winding and the secondary winding is decomposed, and since the circuit 230 of FIG. 24 has only two windings in the full-wave rectifier circuit without a primary winding in the LLC (or the non-isolated LLC), the circuit 230 does not have loss of this part of winding. As for Fourier decomposition (FFT) of the winding current in the full-wave rectification, since the output currents are the same, DC (DC) components of the secondary current in the three circuits are the same. Moreover, since winding utilization is high, the circuit 230 has substantially the same current in the first and second half periods, so a first harmonic current (shown by 1st) is only 1.6 A. However, the windings in the traditional LLC full-wave rectification only work in a half period, so the first harmonic current is maximum, and reaches 40.8 A. Other harmonics (such as, second harmonic 2nd, third harmonic 3rd, and fourth harmonic 4th in the figure) of the three circuits are approximate. When reflected to a Root Mean Square of the winding current, it can be seen that a Root Mean Square (RMS) of the secondary current in the LLC is 40.89 A, and 33.2 A in the non-isolated LLC, while RMS of the winding current in the circuit 220 is minimum, and only 29.28 A. In addition, since the LLC and the non-isolated LLC both need a primary winding, the common secondary-primary-secondary (SPS) winding structure is used in calculation, while the circuit 230 only needs two windings.

Assuming that a twelve-layered PCB is also used as the winding of the transformer, the LLC and the non-isolated LLC have only four winding units, while the circuit 230 has six winding units, so in the case of the same amount of copper, the winding of the circuit 230 has a minimum impedance. With reference to the RMS of current and the impedance of winding, a total winding loss can be calculated under the conditions. As can be seen, as for the conversion circuit 230 of FIG. 24, the winding loss is about 0.26 W, while the winding loss of the LLC transformer having the same conversion ratio is about 1.506 W, and the winding loss of the non-isolated LLC transformer having the same conversion ratio is about 0.801 W. As can be seen, loss of the transformer on the conversion circuit discussed in the invention is greatly reduced to be about 20% of the original LLC circuit.

Therefore, the conversion circuit discussed in the invention has an improved conversion ratio as compared to the STC conversion circuit having the same number of switches, and in the case of the same conversion ratio, the winding loss of the conversion circuit discussed in the invention is significantly reduced as compared to the traditional LLC transformer and non-isolated LLC transformer.

Although the disclosures are directed to the embodiments of the invention, other and further embodiments of the invention also can be designed without departing from substantial scope of the invention, and the scope of the invention is determined by the appended claims.

What is claimed is:

1. A conversion circuit for supplying an output voltage after converting an input voltage, wherein the input voltage and the output voltage both comprise a first end and a second end, and the second end of the input voltage is connected to the second end of the output voltage, the conversion circuit comprising:
   a full-bridge circuit comprising a first bridge arm and a second bridge arm connected in parallel and electrically connected between the first end and the second end of the output voltage;
   a first switch branch electrically connected between the first end of the input voltage and the first end of the output voltage, and comprising a first switch and a second switch connected in series to form a first connection node;
   a first resonant unit electrically connected between the first connection point and a midpoint of the first bridge arm; and
   a first transformer, comprising:
      a first primary winding connected in series with the first resonant unit; and
      a first secondary winding connected between the midpoint of the first bridge arm and a midpoint of the second bridge arm.

2. The conversion circuit according to claim 1, wherein the first primary winding has one end connected to the midpoint of the first bridge arm, and the other end connected to one end of the first resonant unit, and the other end of the first resonant unit is connected to the first connection node.

3. The conversion circuit according to claim 1, wherein,
   the first switch branch further comprises a third switch and a fourth switch connected in series with the first switch and the second switch, the second switch and the third switch are connected to form a second connection node, and the third switch and the fourth switch are connected to form a third connection node; and
   the conversion circuit further comprises:
      a first capacitor electrically connected between the second connection node and the midpoint of the second bridge arm; and
      a second resonant unit electrically connected between the third connection node and the midpoint of the first bridge arm.

4. The conversion circuit according to claim 3, wherein the first transformer further comprises a second primary winding connected in series with the second resonant unit.

5. The conversion circuit according to claim 4, wherein the first primary winding and the second primary winding are the same winding.

6. The conversion circuit according to claim 3, further comprising a second switch branch, a third resonant unit, a fourth resonant unit and a second capacitor, wherein,
   the second switch branch is connected in parallel to the first switch branch, and comprises a fifth switch, a sixth switch, a seventh switch and an eighth switch connected in series to form a fourth connection node, a fifth connection node and a sixth connection node sequentially;

the third resonant unit is electrically connected between the fourth connection node and the midpoint of the second bridge arm;

the second capacitor is electrically connected between the fifth connection node and the midpoint of the first bridge arm; and the fourth resonant unit is electrically connected between the sixth connection node and the midpoint of the second bridge arm.

7. The conversion circuit according to claim 6, wherein the first transformer further comprises a third primary winding connected in series with the third resonant unit, and a fourth primary winding connected in series with the fourth resonant unit.

8. The conversion circuit according to claim 1, wherein,
the first switch branch further comprises a third switch and a fourth switch connected in series with the first switch and the second switch, the second switch and the third switch are connected to form a second connection node, and the third switch and the fourth switch are connected to form a third connection node; and
the conversion circuit further comprises:
a third bridge arm connected in parallel to the first bridge arm and the second bridge arm;
a fifth resonant unit electrically connected between the third connection node and a midpoint of the third bridge arm;
a second transformer, comprising:
a fifth primary winding connected in series with the fifth resonant unit;
a second secondary winding connected between the midpoint of the second bridge arm and the midpoint of the third bridge arm; and
a third capacitor connected between the second connection node and the midpoint of the second bridge arm.

9. The conversion circuit according to claim 1, wherein,
the first switch branch further comprises (2m−2) switches connected in series with the first switch and the second switch, such that the first switch branch comprises 2m switches connected in series, wherein adjacent switches of the 2m switches are connected to form connection nodes;
the conversion circuit further comprises:
(m−1) resonant units, the (m−1) resonant units and the first resonant unit forming m resonant units, the x-th resonant unit of the m resonant units electrically connected between the connection node of the (2x−1)th switch and the 2x-th switch of the 2m switches and the midpoint of the first bridge arm; and
(m−1) capacitors, the k-th capacitor of the (m−1) capacitors electrically connected between the connection node of the 2k-th switch and the (2k+1)th switch of the 2m switches and the midpoint of the second bridge arm,
wherein m, x and k are integers, m≥2, 1≤x≤m, and 1≤k≤(m−1).

10. The conversion circuit according to claim 9, wherein resonant inductors of the m resonant units are the same resonant inductor.

11. The conversion circuit according to claim 9, wherein capacitances of resonant capacitors in the m resonant units are the same.

12. The conversion circuit according to claim 9, wherein the first primary winding comprises m sub-windings, and the x-th resonant unit of the m resonant units is connected to the midpoint of the first bridge arm via the x-th sub-winding of the m sub-windings.

13. The conversion circuit according to claim 12, wherein the m sub-windings are the same sub-winding.

14. The conversion circuit according to claim 1, wherein,
the first switch branch further comprises (2m−2) switches connected in series with the first switch and the second switch, such that the first switch branch comprises 2m switches connected in series, wherein adjacent switches of the 2m switches are connected to form connection nodes;
the first primary winding comprises m sub-windings, wherein the x-th sub-winding of the m sub-windings and the first resonant unit are electrically connected between the connection node of the (2x−1)th switch and the 2x-th switch of the 2m switches and the midpoint of the first bridge arm after being connected in series, and
the conversion circuit further comprises (m−1) capacitors, the k-th capacitor of the (m−1) capacitors electrically connected between the connection node of the 2k-th switch and the (2k+1)th switch of the 2m switches and the midpoint of the second bridge arm,
wherein m, x and k are integers, m≥2, and 1≤k≤(m−1).

15. The conversion circuit according to claim 1, wherein,
the first switch branch further comprises (m−2) switches connected in series with the first switch and the second switch, such that the first switch branch comprises m switches connected in series, wherein adjacent switches of the m switches are connected to form connection nodes,
the conversion circuit further comprises (m−2) resonant units, the (m−2) resonant units and the first resonant unit forming (m−1) resonant units,
the (2y−1)th resonant unit of the (m−1) resonant units and the first primary winding are electrically connected between the connection node of the (2y−1)th switch and the 2y-th switch of the m switches and the midpoint of the first bridge arm after being connected in series; and
the 2z-th resonant unit of the (m−1) resonant units is electrically connected between the connection node of the 2z-th switch and the (2z+1)th switch of the m switches and the midpoint of the second bridge arm,
wherein m, y and z are integers, m≥3, 1≤y≤m/2, and 1≤z≤(m−1)/2.

16. The conversion circuit according to claim 15, wherein the first primary winding comprises a plurality of sub-windings, and the (2y−1)th resonant unit of the (m−1) resonant units is connected to the midpoint of the first bridge arm via the corresponding sub-winding of the plurality of sub-windings.

17. The conversion circuit according to claim 16, wherein the plurality of sub-windings are the same sub-winding.

18. The conversion circuit according to claim 1, wherein,
the first switch branch further comprises (m−2) switches connected in series with the first switch and the second switch, such that the first switch branch comprises m switches connected in series, wherein adjacent switches of the m switches are connected to form connection nodes,
the first primary winding comprises a plurality of sub-windings, the connection node between the (2y−1)th switch and the 2y-th switch of the m switches is connected to one end of the first resonant unit via one of the plurality of sub-windings, and the other end of the first resonant unit is connected to the midpoint of the first bridge arm;

the conversion circuit further comprises a plurality of resonant units, the connection node between the 2z-th switch and the (2z+1)th switch of the m switches is connected to the midpoint of the second bridge arm via one of the plurality of resonant units, wherein m, y and z are integers, m≥3, 1≤y≤m/2, and 1≤z≤(m−1)/2.

19. The conversion circuit according to claim 1, further comprising an output capacitor connected in parallel to the first bridge arm.

20. The conversion circuit according to claim 19, further comprising an input capacitor, wherein, the input capacitor is electrically connected between the first end of the input voltage and the second end of the input voltage, or the input capacitor is electrically connected between the first end of the input voltage and the first end of the output voltage.

21. The conversion circuit according to claim 1, wherein all resonant units comprise an inductor and a capacitor connected in series or in parallel.

22. The conversion circuit according to claim 1, wherein the first resonant unit only comprises a resonant inductor, the conversion circuit further comprises a resonant capacitor connected in parallel to the first bridge arm, and the resonant capacitor and the resonant inductor cooperate together.

* * * * *